US009251243B2

(12) United States Patent
Stec

(10) Patent No.: US 9,251,243 B2
(45) Date of Patent: Feb. 2, 2016

(54) COMPUTERIZED METHOD FOR ANALYZING INNOVATION INTERRELATIONSHIPS WITHIN AND BETWEEN LARGE PATENT PORTFOLIOS

(71) Applicant: John M. Stec, Northfield, IL (US)

(72) Inventor: John M. Stec, Northfield, IL (US)

( * ) Notice: Subject to any disclaimer, the term of this patent is extended or adjusted under 35 U.S.C. 154(b) by 0 days.

(21) Appl. No.: 14/280,039

(22) Filed: May 16, 2014

(65) Prior Publication Data

US 2014/0351252 A1 Nov. 27, 2014

Related U.S. Application Data

(63) Continuation of application No. 12/882,175, filed on Sep. 14, 2010, now abandoned.

(60) Provisional application No. 61/276,759, filed on Sep. 16, 2009.

(51) Int. Cl.
*G06F 17/30* (2006.01)

(52) U.S. Cl.
CPC .... *G06F 17/30595* (2013.01); *G06F 17/30716* (2013.01)

(58) Field of Classification Search
CPC ............... G06F 17/30595; G06F 17/30598; G06F 17/30528; G06F 3/0481; G06F 3/0482; G06F 17/30289; G06F 17/30716; G06Q 10/107; G06Q 10/10; G06Q 50/01; G06Q 10/06; G06Q 30/02; G06Q 50/18; G06Q 30/0601; G06Q 30/08
USPC .................. 707/776, 736, 741, E17.002, 734; 709/223
See application file for complete search history.

(56) References Cited

U.S. PATENT DOCUMENTS

| 5,524,240 | A | * | 6/1996 | Barbara et al. ................ 707/741 |
| 5,528,566 | A | * | 6/1996 | McGee et al. ............. 369/30.86 |
| 6,879,990 | B1 | * | 4/2005 | Boyer et al. .................. 707/749 |
| 7,590,618 | B2 | * | 9/2009 | Abraham ........... H04L 41/0853 709/224 |
| 7,630,930 | B2 | * | 12/2009 | Almgren ................ G06Q 40/06 705/36 R |
| 7,870,138 | B2 | * | 1/2011 | Van Voorhis .................. 707/741 |
| 8,639,695 | B1 | * | 1/2014 | Spielthenner ................. 707/737 |
| 8,898,239 | B2 | * | 11/2014 | Appelman et al. ............ 709/206 |
| 2003/0093348 | A1 | * | 5/2003 | Finn ....................... G06Q 20/10 705/35 |
| 2006/0074867 | A1 | * | 4/2006 | Breitzman ........................ 707/3 |

(Continued)

OTHER PUBLICATIONS

Jenkins, D.M., 2004. The Industrial Application of Patent Analysis: An Empirical Study. Poole, England: Bournemouth University ; pp. 1-84.*

(Continued)

*Primary Examiner* — Anh Ly
(74) *Attorney, Agent, or Firm* — John G. Tolomei

(57) ABSTRACT

The method of the present invention provides a labor and time saving ability to determine interrelationships within patents determined by searching, via a computer system, through patent fields to see if one or more particular pieces of alpha-numeric data are common to any of the patents in the database in which the field indicia are located. Such commonality is searchable in backward or forward direction, or both, from, for example, one patent of particular interest. The method allows for presentation of families of interrelated patents within minutes rather than hours, weeks or longer by utilizing computer based technology. Further, the methodology allows for determinations of interrelationships within desired degrees of separation by manipulation of the indicative data to be searched.

21 Claims, 67 Drawing Sheets

(56) References Cited

U.S. PATENT DOCUMENTS

| | | | |
|---|---|---|---|
| 2006/0190371 A1* | 8/2006 | Almgren | G06Q 40/00 705/35 |
| 2006/0200395 A1* | 9/2006 | Masuyama et al. | 705/35 |
| 2006/0218068 A1* | 9/2006 | Loeper | G06Q 40/00 705/35 |
| 2006/0248055 A1* | 11/2006 | Haslam et al. | 707/3 |
| 2006/0248094 A1* | 11/2006 | Andrews et al. | 707/100 |
| 2007/0073748 A1* | 3/2007 | Barney | 707/101 |
| 2008/0249957 A1* | 10/2008 | Masuyama | G06Q 40/00 705/36 R |
| 2009/0037342 A1* | 2/2009 | Kennedy | G06Q 40/06 705/36 R |
| 2009/0254572 A1* | 10/2009 | Redlich et al. | 707/10 |
| 2010/0241507 A1* | 9/2010 | Quinn et al. | 705/14.42 |
| 2010/0250497 A1* | 9/2010 | Redlich et al. | 707/661 |
| 2011/0191417 A1* | 8/2011 | Rathod | 709/204 |
| 2013/0268538 A1* | 10/2013 | Nelson | 707/741 |

OTHER PUBLICATIONS

Ronald J. Manna and Thomas W. Sagerb—"Patents, venture capital, and software start-ups" Research Policy vol. 36, Issue 2, Mar. 2007, pp. 193-208.*

* cited by examiner

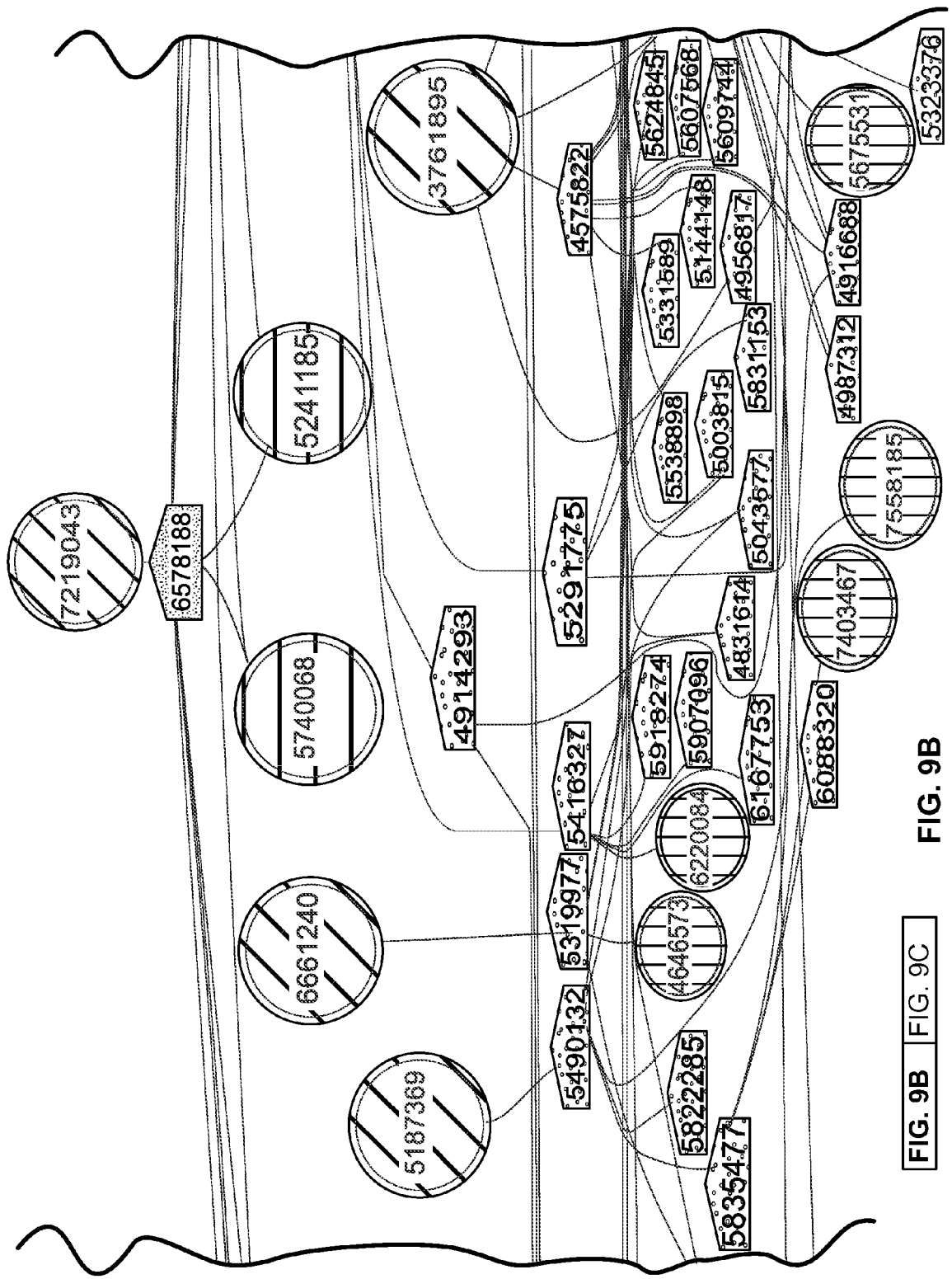

LOCATION BASED SYSTEMS & LOGISTICS

LOT 38

SELLER
Millennium Marketing Group, Ltd.

TITLE
Interactive multimedia geographic information system

FEATURED PATENT NUMBER
6,526,351

LOT SUMMARY
The patent in this Lot relates to a portable, interactive, electronic tour guide that includes packaged tours and uses context-aware computing in a multimedia format to become a user's personal tour guide. The invention provides the user with directions and useful information about a selected tour that is part of a Geographic Information System (GIS) database, and controlled by the Global Positioning Satellite (GPS) system. The user interface of the invention includes voice recognition and speech synthesis to provide audible directions and prompts and to respond to voiced commands. The invention can be sold as software to be downloaded into any portable computing device such as laptops, PDAs, a multi-function cell phone, a car's navigation system, or a purpose-built device manufactured exclusively for the invention.

Sightseeing has become an abiding pastime for many people who are eager to see and learn about new things. To take advantage of this, many tour books authors and publishers have generated a vast amount of information to assist travelers. Most big cities have tour buses with tour guides that provide a running commentary on notable buildings and events as the tour bus passes through various sections of the city. Sometimes it is possible to hire a knowledgeable taxi cab driver to provide a more personal tour of a city. However, once outside the city, the tourist is more or less left to his or her own devices and guided only by one or more of the many tour books available on the market. This can pose a problem as such books usually contain too much or too little information and it is difficult to find just the information needed for a particular tour.

The present invention provides all the benefits of a personal tour guide to users, without putting theirs day and their schedule in the hands of someone else and thereby increasing convenience and flexibility. Owning this Lot would increase value and profitability for various industries including mobile phone providers and manufacturers, GPS device manufacturers, and electronic device developers and manufacturers.

SAMPLE FORWARD CITATION ANALYSIS
- CandleDragon, Inc.
- Garmin Ltd.
- Hewlett-Packard Company
- Intel Corporation
- Kyocera Corporation
- Mitsport Technologies, Inc.
- Nokia Corporation
- Robert Bosch GmbH
- Timekeeping Systems, Inc.

FIG. 13A

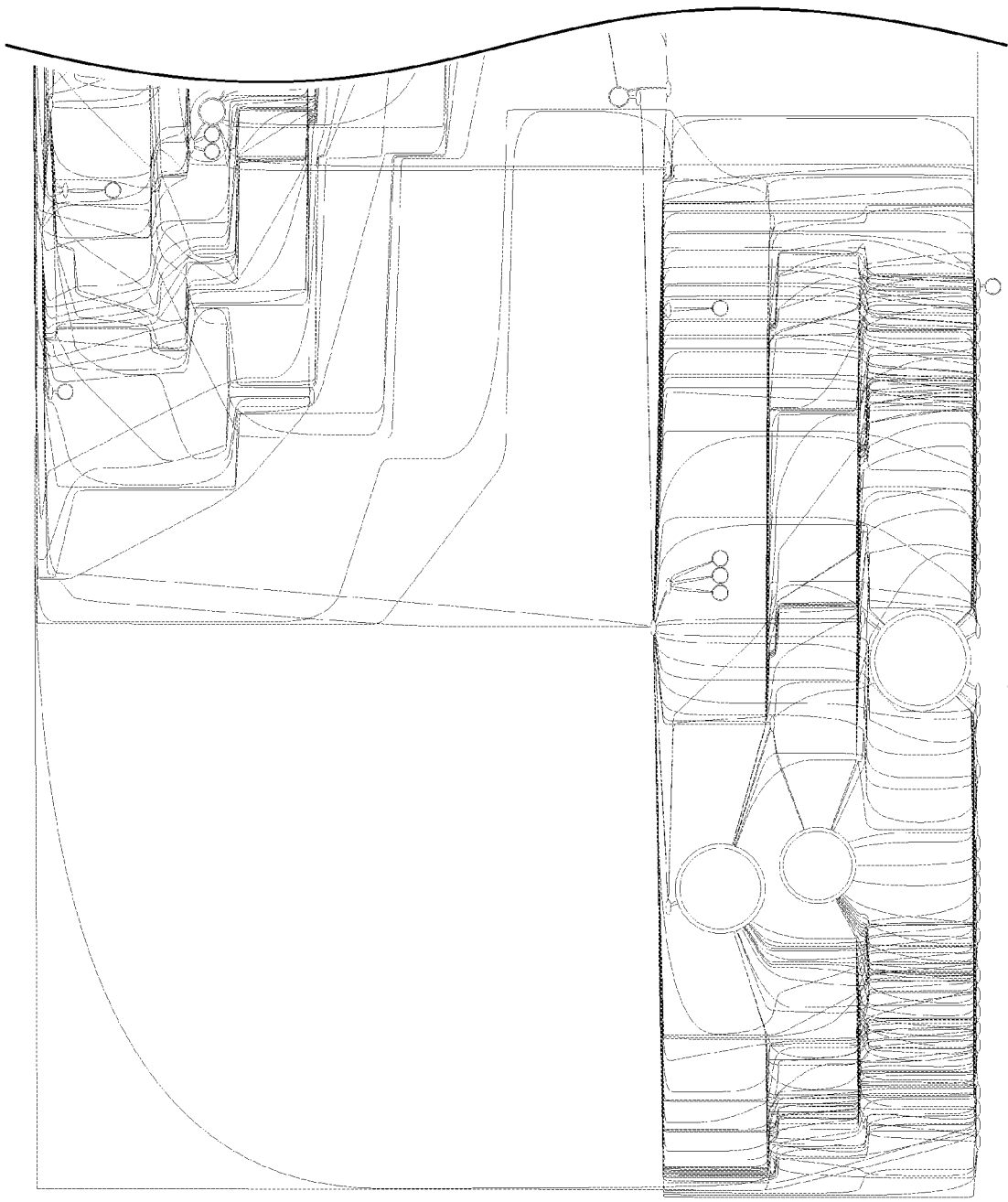

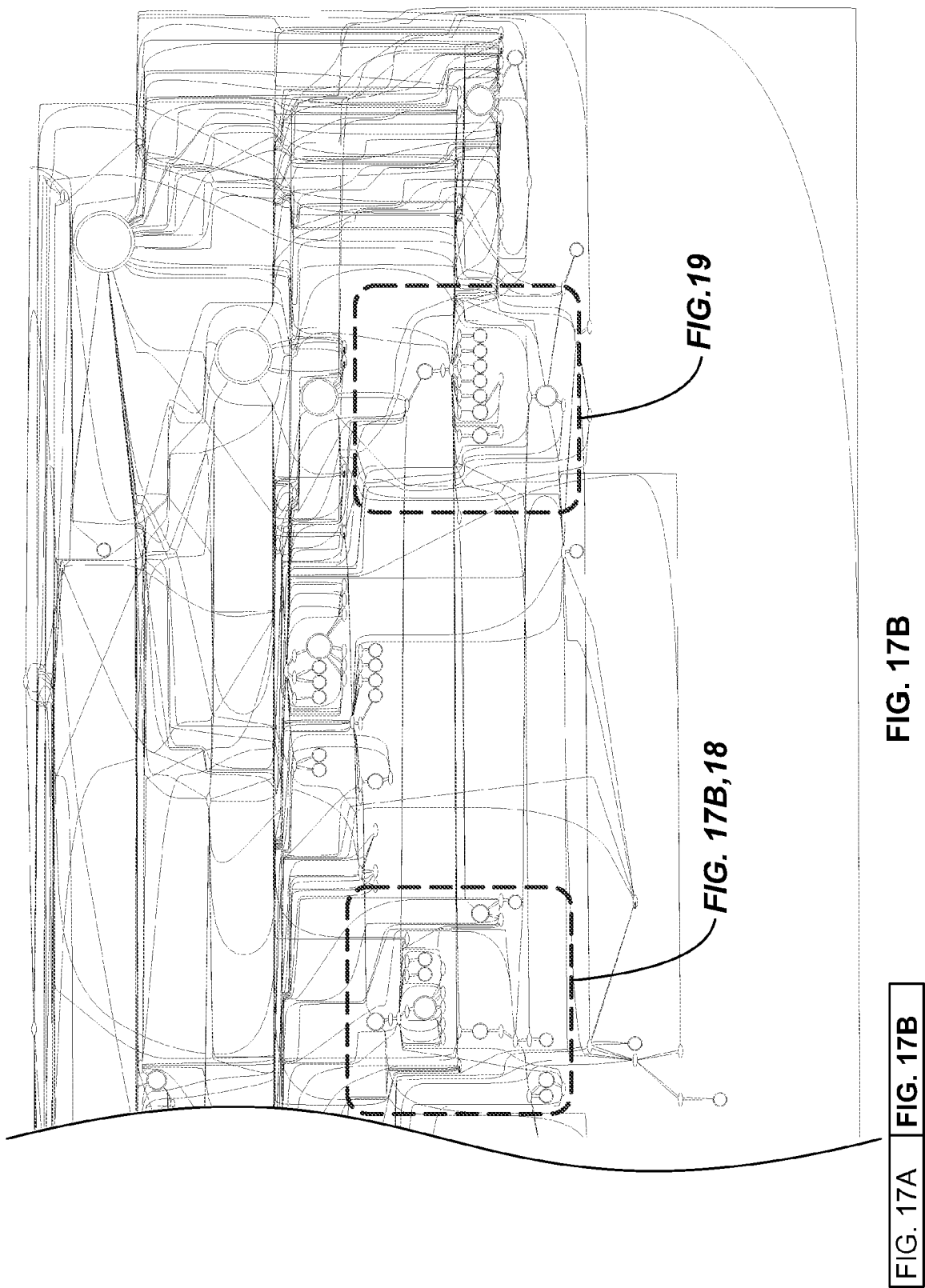

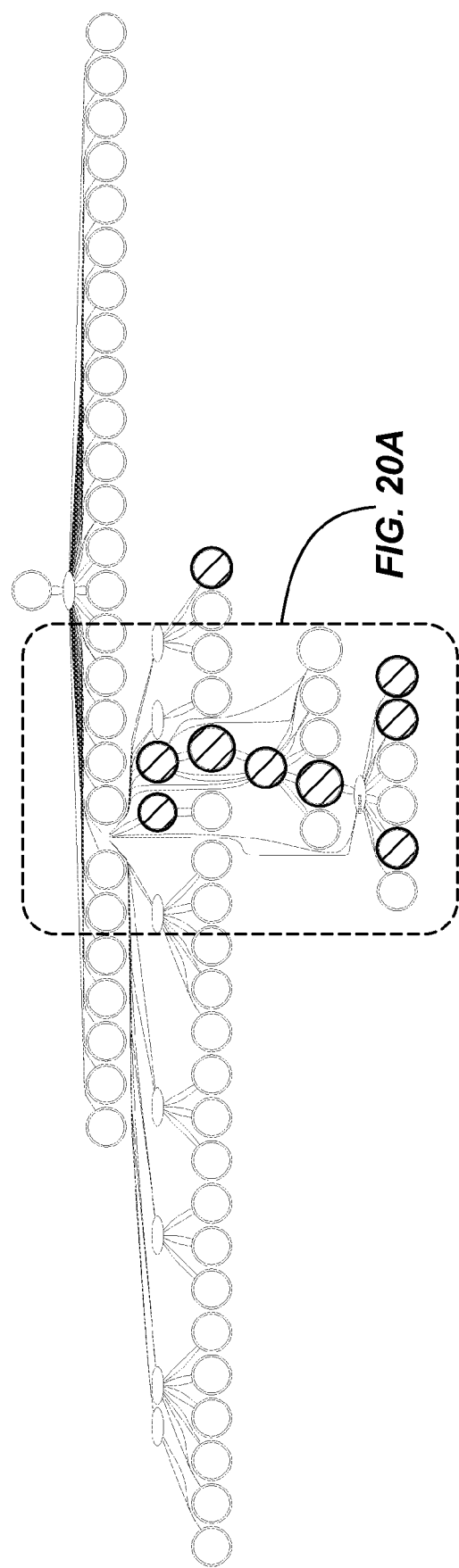

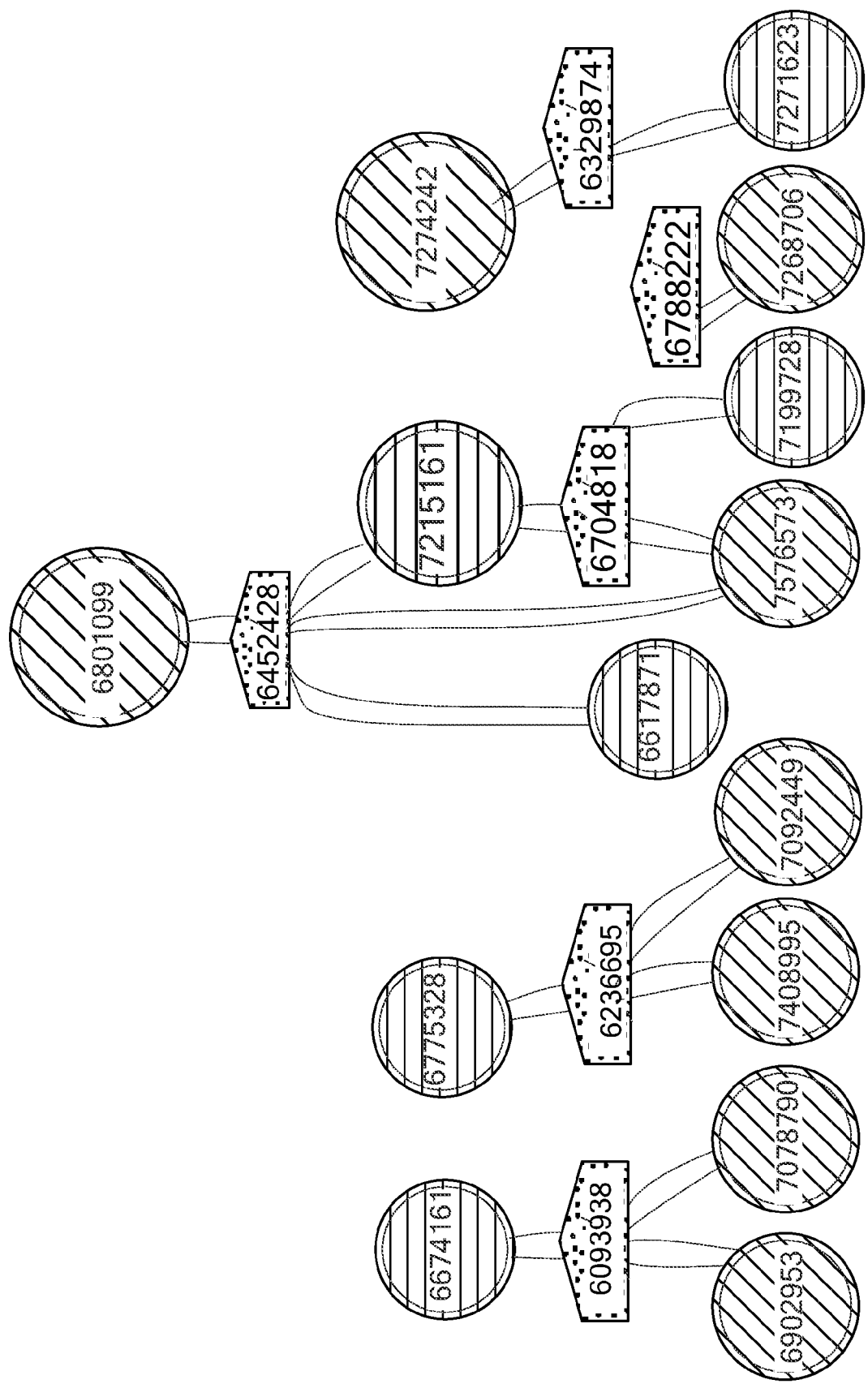

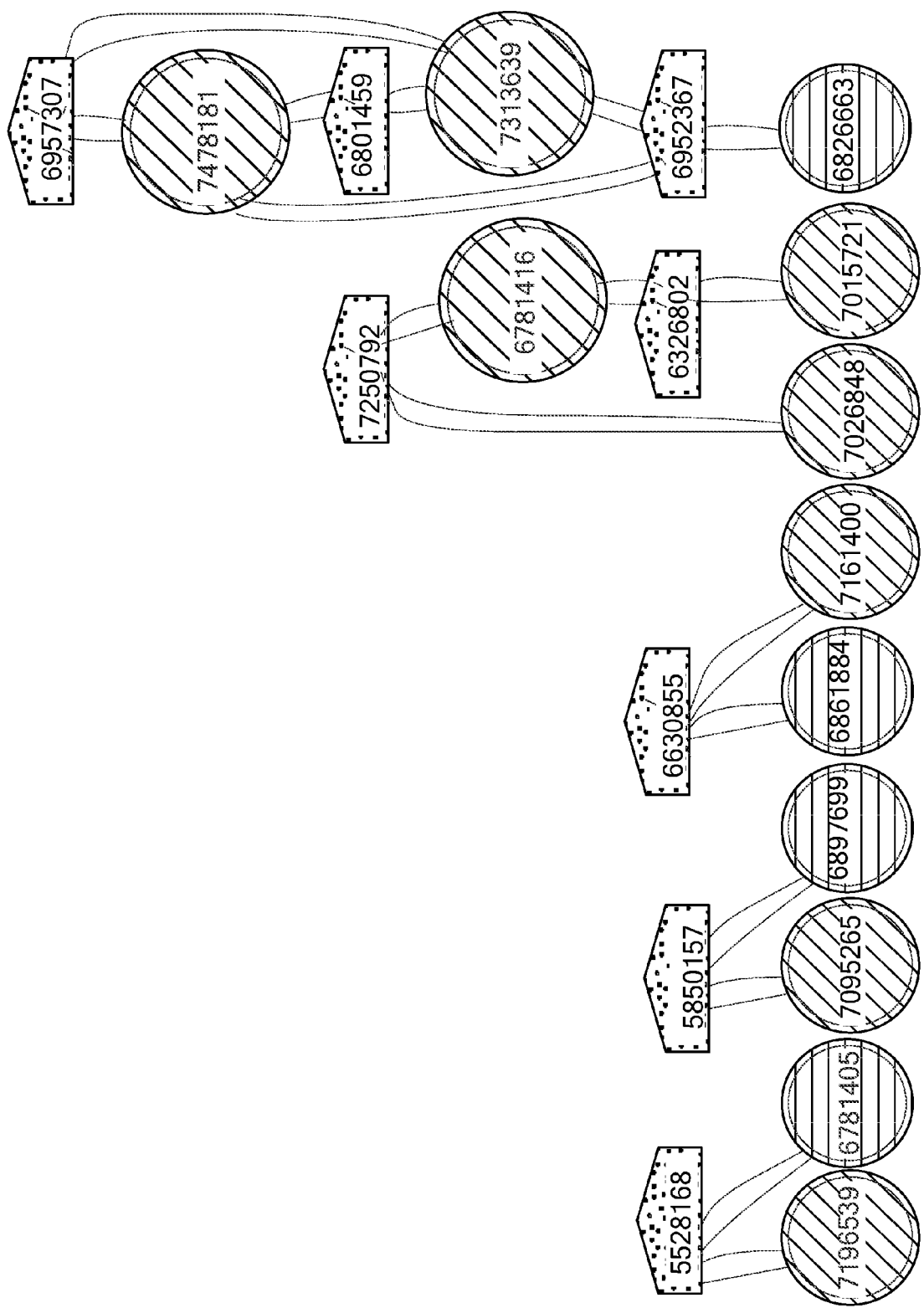

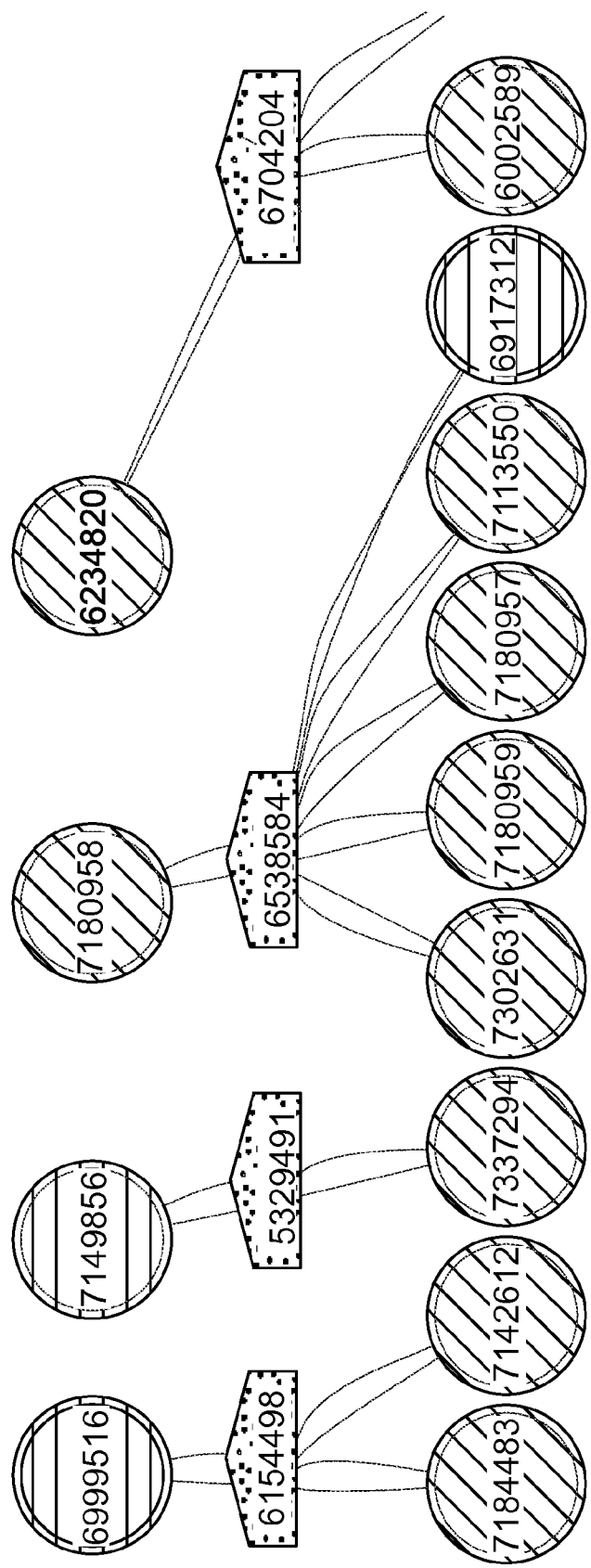

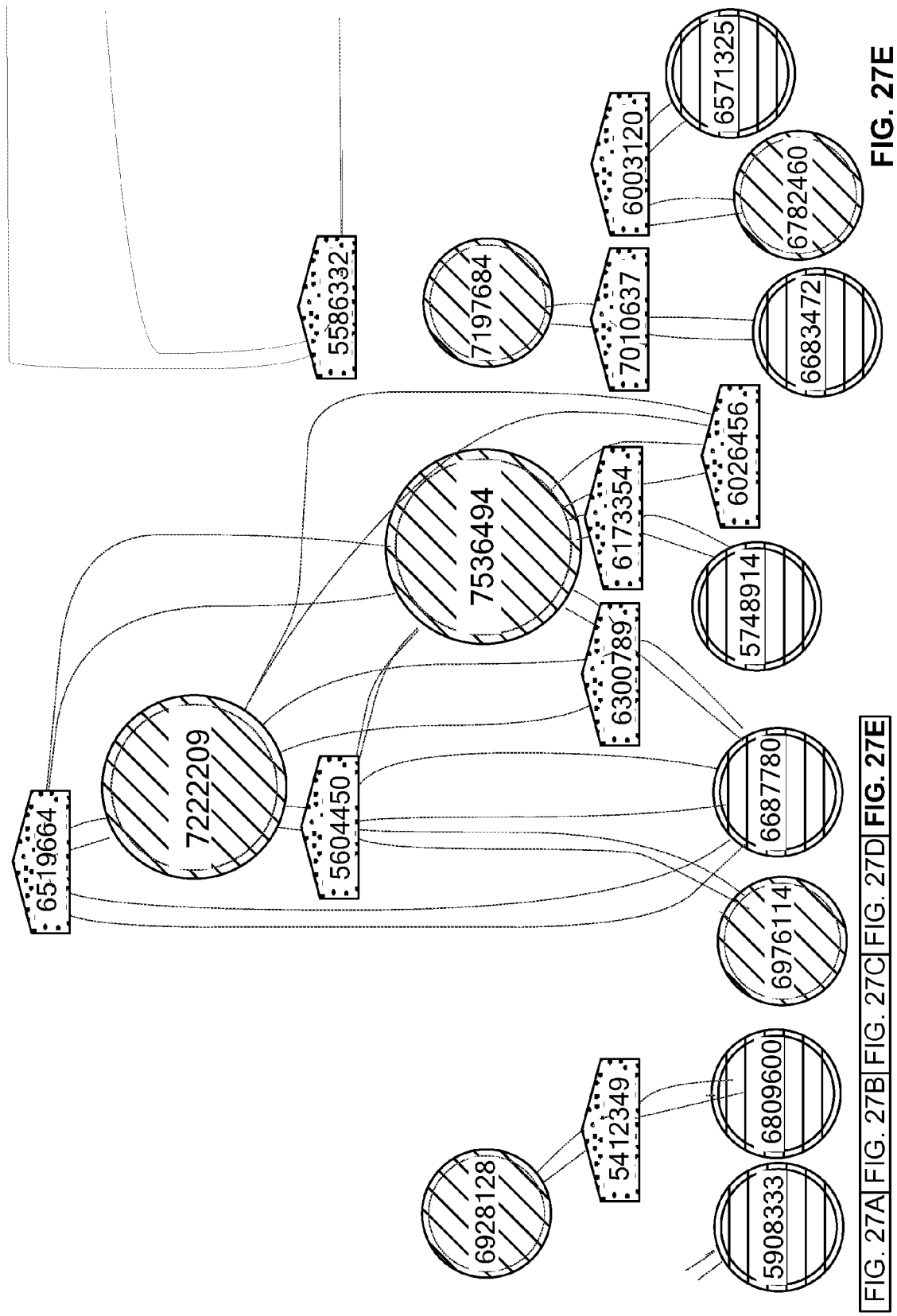

| FIG. 31A | B | C | D | E | F | G | H | I | J | K | L | M | N | O | P | Q | R | S | T | U | V | W | FIG. 31X |

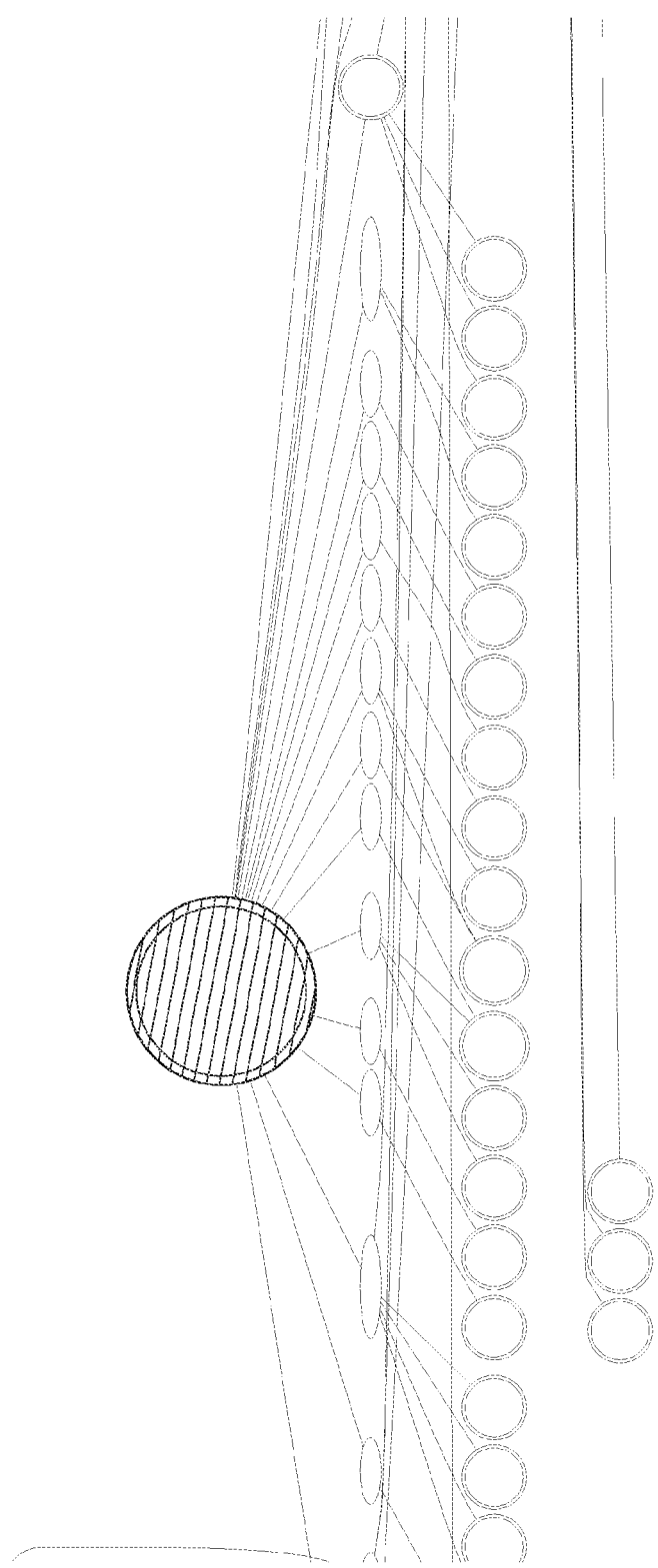

| FIG. 31A | B | C | D | E | F | G | H | I | J | K | L | M | N | O | P | Q | R | S | T | U | V | W | FIG. 31X |

| FIG. 31A | B | C | D | E | F | G | H | I | J | K | L | M | N | O | P | Q | R | S | T | U | V | W | FIG. 31X |

| FIG. 31A | B | C | D | E | F | G | H | FIG. 31I | J | K | L | M | N | O | P | Q | R | S | T | U | V | W | FIG. 31X |

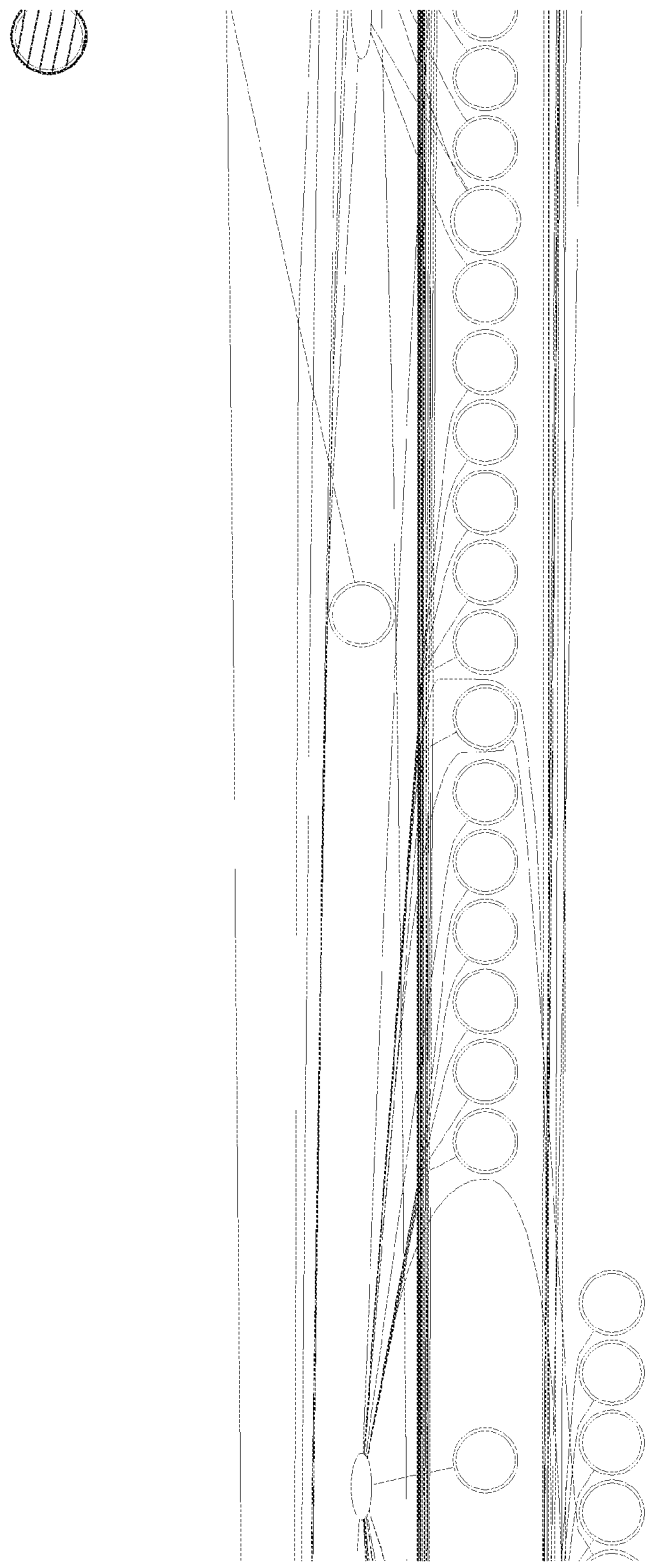

| FIG. 31A | B | C | D | E | F | G | H | I | J | K | L | M | N | O | P | Q | R | S | T | U | V | W | FIG. 31X |

| FIG. 31A | B | C | D | E | F | G | H | I | J | K | L | M | N | O | P | Q | R | S | T | U | V | W | FIG. 31X |

| FIG. 31A | B | C | D | E | F | G | H | I | J | K | L | M | N | O | P | Q | R | S | T | U | V | W | FIG. 31X |

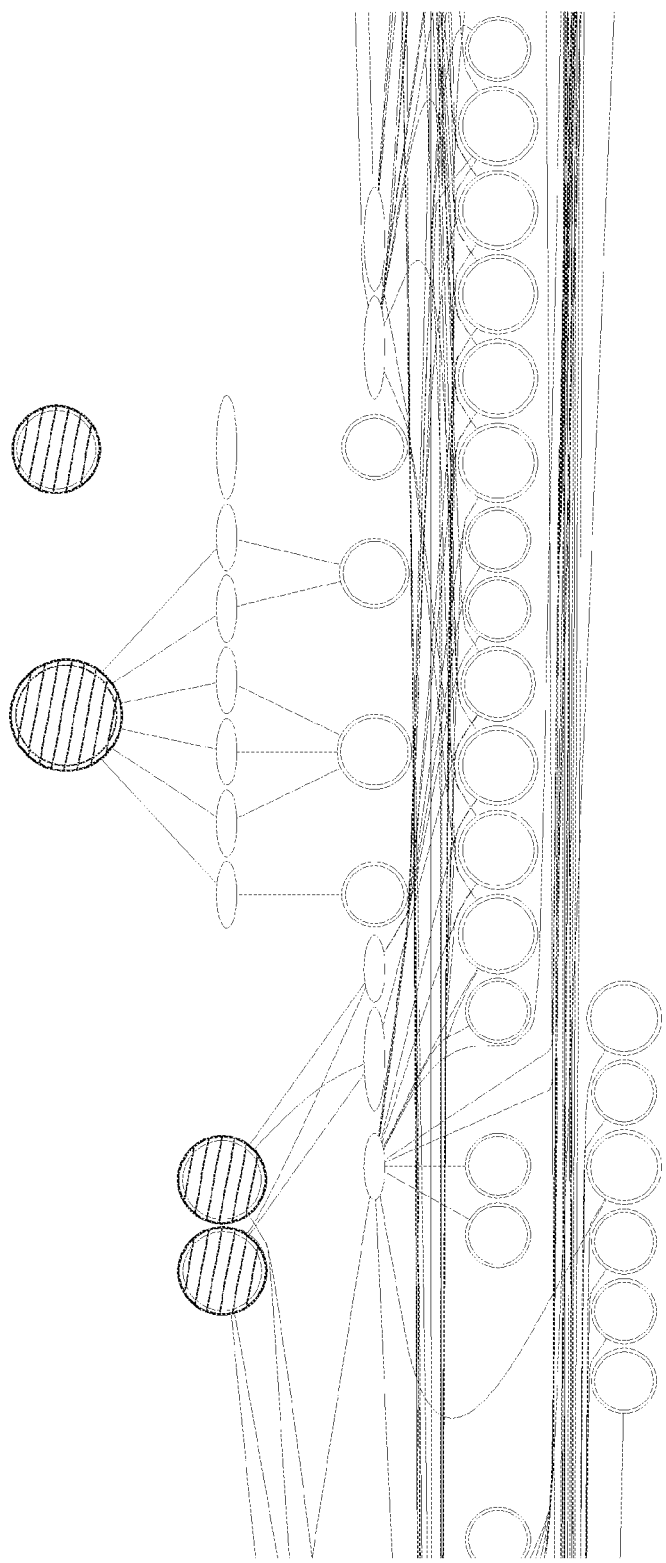

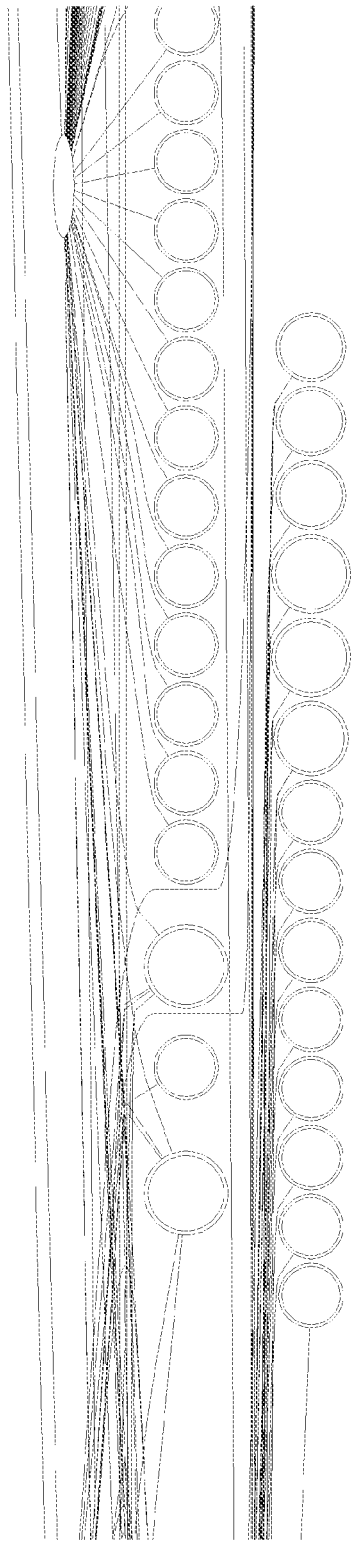

| FIG. 31A | B | C | D | E | F | G | H | I | J | K | L | M | N | O | P | Q | R | S | T | U | V | W | FIG. 31X |

| FIG. 31A | B | C | D | E | F | G | H | I | J | K | L | M | N | O | P | Q | R | S | T | U | V | W | FIG. 31X |

| FIG. 31A | B | C | D | E | F | G | H | I | J | K | L | M | N | O | P | Q | R | S | T | U | V | W | FIG. 31X |

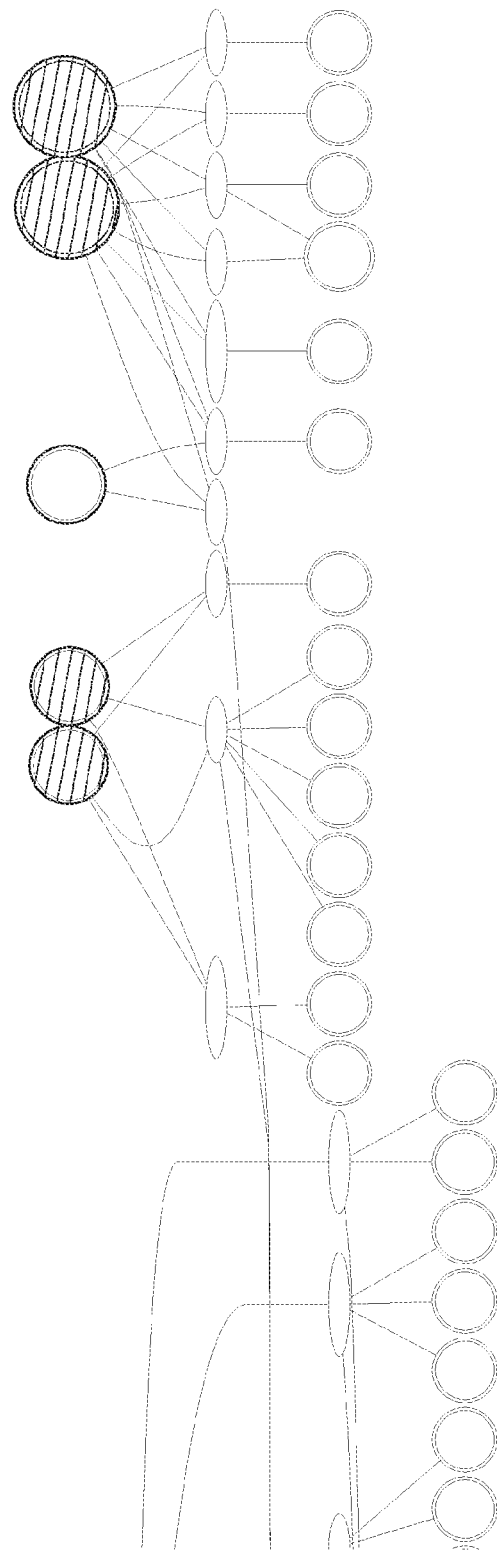

COMPUTERIZED METHOD FOR ANALYZING INNOVATION INTERRELATIONSHIPS WITHIN AND BETWEEN LARGE PATENT PORTFOLIOS

The present patent application is a continuation of U.S. Ser. No. 12/882,175 filed Sep. 14, 2010. U.S. Ser. No. 12/882,175 claims the benefit under 35 U.S.C. 119(e) of U.S. Provisional Patent Application Ser. No. 61/276,759 filed Sep. 16, 2009. All of the above are incorporated herein by reference in its entirety and made a part hereof.

BACKGROUND OF THE INVENTION

Field of the Invention

The present invention relates to a computerized method for analyzing desired relationships between patents using information obtained from a patent database. The information is derived from the fields presented in the database of the Patent Office in publishing the patents and applications. The present invention also provides for a preferred method for presenting the analyzed results in a concise visual format in order to facilitate the expeditious and sufficient understanding of the relationships between the patents studied; specifically to provide a basis for valuation of the patents studied; and to facilitate the strategic use, maintenance, licensing and disposition of the patents studied.

One of the intended purposes of the U.S. Patent System, and patent laws generally elsewhere, is to facilitate innovation by providing an incentive for the inventor to disclose inventions to the public. In return for the disclosure of an invention, said invention in the U.S. Patent Office must meet the statutory guidelines of being new, useful and non-obvious. A sovereign government grants the inventor a time limited monopoly on the making, using, selling or offering for sale, any new, useful, and non-obvious composition of matter, process, article, plant, or design comprising a patented invention. It is well established how economically valuable a patent can be. Since innovation is a process facilitated by public disclosure of an invention claimed by a patent; it is also well known how fleeting such a value can be due to subsequent innovation.

For example, an invention disclosed in a given patent can be quickly superseded by subsequent innovations of others with respect to the same process, device, composition, or other patentable subject matter. Such subsequent innovation is obtained from other persons based upon a combination of their disclosures with information in the public domain or information in the possession of such other persons who may share a similar expertise. More specifically, innovation frequently occurs when the reader of a published disclosure or patent, incorporates or eliminates one or more of the element(s) of the invention. The inventive technology can be determined either by substitution with, or in combination with (i) one or more elements provided in an existing patent or disclosure(s); (ii) with information present in the public domain; or (iii) information already in the reader's possession. In an ideal world, the disclosed technological innovation, the invention, and the ideas upon which the invention(s) is based are, in turn, disclosed, and the innovation cycle repeats, ad infinitum. Historically there have been numerous cases where a company's business has been detrimentally impacted by the new discoveries and inventions of competitors. For example the transistor's impact on the vacuum tube industry in the $20^{th}$ Century, or more currently the impact of the Internet and world-wide-web on the postal service, newspaper distributors, and other retail industries in the $21^{st}$ Century. As the underlying technology matures, during the life of the patent in which it was taught, keeping current awareness of the technology encompassed in the intellectual property relating to it is important, if not critical to the survival of an entity. Thus, ignoring new technologies in one's business environment, and how the technology affects a business owning technology is a significant risk.

To mitigate this risk, an organization may often believe it needs to amass technology by constantly innovating or acquiring new technology. An ever expanding and broad portfolio of intellectual property relating to not only new ideas encompassed in the technology but further improvements and developments to its existing technology is vital. As useful, as such portfolio growth may be to maintaining control of the underlying technology in its business, the sheer size of the portfolio makes it increasingly difficult for the portfolio owner to monitor. Monitoring, in this context comprises not only the current basis, breadth and extent of its own intellectual property, but also the resultant ever-growing relationship(s) of the technology included in the intellectual property of others especially competitors.

It is rather ironic that, as innovation accelerates, as may be gauged by the increasing numbers of issued patents and patent application filings (the growth of USPTO filings is shown at http://www.uspto.gov/go/taf/h_counts.htm), further innovation itself is often stymied by the prior art. For example, the mere possession of knowledge does not guarantee proper utilization of it. The late, great author and philosopher, Arthur C. Clarke is reputed to have said, "Cave dwellers froze to death on beds of coal. It was all around them, but they could not see it or use it. Today, we are in danger of making the same mistakes."

In the context of the present invention, the problem (of the shear magnitude of innovation and the consequential information overload in trying to assimilate and utilize the information) can be more concretely expressed in two ways:

Issue No. 1—On the one hand, this overload problem has been characterized as the "If we only knew what THEY know" problem (also known as "other peoples' inventions").

For example, given the sheer volume of patents issued and applications published, the patent system often fails in its essential purpose, by making it more difficult and expensive to review relevant prior art of one's known and unknown competitors in a timely and practical manner. This information overload problem is overpowering. According to the USPTO website, there were 157,283 (utility) patents issued and approximately 456,157 applications filed at the USPTO in calendar year 2007. For comparison, there were 157,494 (90,365) (utility) patents issued and approximately 295,926 (164,558) applications filed at the USPTO in calendar year 2000.

Review of each of these disclosures for general relevancy, let alone for specific content, is difficult if not impossible given the volume of the prior art. If relevant prior art is not reviewable in a timely manner, further innovation is stifled. If the prior art cannot be assimilated by the specific inventors WHO could and know how to use it, since it is just as important WHEN they could use it, and the review of the information may become impractical or deferred to a time too late to assist them in their inventive endeavors.

Issue No. 2—This overload problem also has been characterized as "If we only knew, what WE know" problem (also known as "our own inventions").

Organizations often compile portfolios of hundreds or thousands of active patents and pending applications for both offensive and defensive purposes in litigation. The inventor is usually a good, if not the best source of knowledge about the utilization of the invention contained in the inventor's patent. An inventor sometimes lacks the means to advise the rest of the organization, the inventor works in or is associated with, on the most effective utilization of the patent. This may be due to simple time and space logistics (e.g., the inventor is no longer in the organization, or in the role of reviewing the specific technology at issue. Communication or political issues may contribute to the communicative inability (e.g., no one asks for the inventor's input, language issues, or personality conflicts, or the inventor is not able to communicate well with the others, or the information is not communicated in a timely manner) of a organization. Many organizations, including those with the largest patent portfolios, are unable to optimally integrate and utilize the knowledge contained in their patent portfolio for purpose of deriving current revenue, or spawning future innovation. This is especially ironic since the application of common economic theory would seem to imply that the larger organizations are not only the ones who would be expected to be able to fund and provide the best analysis, but the larger organizations would also be the ones who would be expected to profit most from such analysis.

A large entity may not be able to efficiently discover, or visualize non-obvious relationships between its own patents, using the current prior art methods and tools employed. On the opposite end, a small entity owning or controlling only a single patent or a relatively small number of patents is confronted with the problem of reviewing a competitor's large patent portfolio. The small entity may need to review not only the patents of each of the entities controlling larger patent portfolios, but an entire patent database.

To succinctly illustrate the problem, and the present invention's value of providing a solution to it the following quotes from CEO illustrate such issues. The chief executives of two well known technology companies, Hewlett Packard, and Texas Instruments, (each company having a very large patent portfolio), come to mind. The former CEO of Texas Instruments states: "If only TI knew what TI knows", Jerry Junkins, former Chairman, President, and CEO of Texas Instruments. "If HP knew what HP knows, it would be three times more profitable!" said Lewis Platt, Former CEO, Hewlett Packard (as reported by O'Dell & Grayson, 1998, at p. 3, ISBN-10 0684844745).

In the case of what are sometimes referred to as "patent thickets" in the literature (Reference is made to the following, "Navigating the Patent Thicket: Cross Licenses, Patent Pools, and Standard-Setting", Carl Shapiro, University of California at Berkeley March 2001), the following has been noted. The patent thickets are described as "an overlapping set of patent rights, the scope of which makes it impractical, using the tools of the prior art, to specifically identify, categorize, understand and unwind such rights requiring that those seeking to commercialize new technology obtain licenses from multiple patentees".

Two distinct issues emerge, namely:

External Thickets—The problem of not knowing the technology and information of others.

Most common, when a given entity owns or controls a very large number of patents (in some cases, hundreds or thousands of patents), it is possible that such entity itself cannot efficiently discover or visualize non-obvious relationships of its own patent portfolio or between its own patents and the patents of others, given the limitations of present prior art search methods and tools. In such cases a risk exists, competitors will discover such relationships, and exploit the opportunity to circumvent the existing patents or prevent further innovation on the part of the patent holder.

Internal Thickets—The problem of not knowing one's own knowledge.

Surprisingly, even in the case of a small entity owning or controlling only one patent or a relatively small number of patents, the problem of reviewing large patent portfolios presents itself, since such small entity needs to review not only the patents of its larger competitors, but entities controlling larger portfolios in the same or related technology, which may include an entire patent database. It is not uncommon for the patentee of a single patent or small set of patents to belatedly discover to its detriment, one or more non-obvious relationships between one or more of its own patent(s, or the patents of others, using the current prior art methods and tools. The converse is also true, it is not uncommon for the patentee of a large portfolio of patents to belatedly discover to its detriment, one or more non-obvious relationships between one or more of its own patent(s) and the single patent or small set of patents of a competitor or other entity using the current prior art methods and tools. In either case, there is a problem of the analysis of the patents of others, and the analysis of the interrelationships within and between the patents residing in large sets owned by the same entity.

An organization often tries to understand and analyze the scope of the technology contained in the intellectual property of its competitors, and to establish R&D program, or an acquisition strategy based on the results of such limited analysis, which is often inefficiently, and costly. However, many excellent (but costly) patent analysis tools have been developed over the years, the size of patent portfolios continue to grow, and such analysis requires significant time and human resources to carry out the detailed analysis.

Another related problem is that often the size and scope of a patent portfolio increases to a point where the patent owner no longer can determine a commercially viable use for one or more of the patents contained therein and places the patent(s) in question up for sale, through private sale or auction lot. One well-known venue, for such auction sales is a company called Ocean Tomo LLC. Such off-loading of patents via auction or private sale brings its own set of issues, and risks for the seller. Among the risks for the SELLER, is how to value the patent to set a reasonable RESERVE price, and to whom the auction lot should be promoted. In the case of the auction or private sale, the BUYER risks are commensurate. The Buyer needs to know how to value the patent to ascertain a reasonable high BID price, and learn who its likely competitors for the patent may be. An additional consideration or issue for the Buyer, and perhaps, the most important issue is will the acquisition of the patent in satisfy the strategic objectives the purchase of the patent is intended to achieve. In each case, whether auction or private sale, the patents being sold do not exist in a vacuum, rather the patent is part and parcel of a web of patents in which the patent resides, it is important to analyze the patent in such a context, which necessarily involves analyzing the patent in a thicket of other patents.

Therefore, there is a need for improved tools, methods, and strategies to analyze patent portfolios. More specifically, there is a need for tools, methods and strategies to analyze patent portfolios comprising a very large numbers of patents. In addition, there is a crucial need for tools, methods, and strategies to analyze the relationship(s) among a given patent or patents, other patents in the same or related technology.

One well known prior art method of patent analysis is the graphical organization of patented inventions based upon so-called "citation trees" of the patents of such inventions.

In the "citation tree analysis" method, the cited prior art patents, of a patent under study [i.e., such patents are presented ("cited") on the face of the patent under study] is used as a basis of relating or "linking" the patent at issue to prior patents, typically portrayed generationally, in chronological order. In this context, a first prior generation of a given patent would be the set of all patents cited on the face of such given patent as its prior art. The second generation (again, looking backwards in time) would be the set of all patents cited on the faces of each of the first prior generation of patents as their respective prior art references. This analysis can be carried on through many generations. Off-the-shelf commercial embodiments of this prior art citation tree analysis method are marketed by various companies. One specific offering is that offered by Thompson Reuters® and further described on the internet at http://www.delphion.com/help/citelink_help.

In one embodiment of the citation tree analysis method, the data is examined in reverse, thus, a forward citation tree is constructed examining the patents issued subsequent to the patent under study which list the patent under study as cited prior art. In this context, a first generation of a given patent would be the set of all patents wherein there is cited on the face of such subsequent patents, the patent under study as the prior art of the subsequent patents. The second generation of a forward citation tree would be the set of all patents issued subsequent to the first generation of the patents citing one of the first generation patents as prior art, and so forth.

As the prior art teaches, in order to create a (forward or backward prior art) citation tree, all one needs to do is If compile or otherwise obtain access to a database of patens that correlating s every patent of interest and the cited references to those patents by subsequent patents. Preferably, the filing date and issuance date of the patent or patent application are correlated. Said data is readily available from the USPTO or commercial database providers. Once one has access to such cited references in a database, preferably a relational database, one can choose to examine the data from different perspectives. A user can look forward or backward in time relative to the issuance date in combination with or without the filing date of given patent. As long as all respective referential data are available in a chronological direction(s) of interest such analysis can be made.

The described citation tree prior art method of examining a given patent's ancestors (looking backward in time, one or more generations) or its descendants (looking forward in time, one or more generations), as the case may be, is straight forward, and is well-known in the prior art and is a practicable method with existing tools. All that is required for such an analysis is an examination of information contained on the face of each of the patents or patent application in question and a visual means to represent the interconnections said patent or patent application. This presentation is typically illustrated graphically. A pictorial node diagram representation of the data connections of the patent or patent application of interest is portrayed. The patents are the nodes, and the interconnections, are the lines linking the patents in question, to the referential data analyzed.

One major problem with citation tree analysis is it is useful only, when the citations are all known. In the case of published applications, no explicit citations are listed on the face of the published application. The lack of explicit citation information is problematic using the prior art citation methods to ascertain the context of the patent application vis-a-vis the universe of all other patents, patent applications, or any subset thereof. The instant invention presents a method of avoiding this pitfall in the case of a patent application. The present invention approximates a relevant citation list from information available prior to issuance of the application as a registered patent, enabling the use of citation tree analysis if desired. Further, the present invention can be utilized n a large subset of published applications that have not matured into issued patents.

For some purposes, most notably litigation, and patent prosecution, it is not necessary that a published but later abandoned patent application mature into an issued patent. The publication of the application may bear upon the novelty of an invention, and the novelty of other subsequently claimed inventions.

Shortcomings in the Prior Art Methods

The patent analysis tools and methods disclosed in the prior art have a number of shortcomings, namely:

The prior art methods and tools do not provide a means of efficiently assembling, analyzing, and utilizing the prior art.

The current methods for analyzing the prior and latter patent references are limited in defining the context to other patents in a given database.

The prior art methods and tools do not provide a means of ascertaining the relationships between and among the patent(s) and pending patent applications until such time when the pending patent applications mature into issued patents. The prior art methods and tools do not provide a means to ascertain the possibility of infringement competitors' patent or patents.

The prior art methods and tools do not provide an efficient and effective means of analyzing the costs and benefits of paying maintenance fees to keep a patent in force to the patent office.

The prior art methods and tools do not provide as efficient and effective resource for further innovation and the current monetization of the patents contained in the intellectual property Portfolio of a given entity.

The prior art methods and tools do not provide an efficient and effective means of obtaining the identities of inventors who may be useful in improving the inventions covered in the patents under study.

The prior art methods and tools do not provide an efficient and effective means of facilitating the establishment of a social network of inventors for innovation within a particular technological domain, whether or not the members of such group of inventors are known to each other or not.

The prior art methods and tools do not provide a means to efficiently ascertain a valuation of a given patent being sold at auction or private sale by a seller (to assist in the setting of a minimum or "reserve" price) or a buyer (to assist in the setting of a maximum bid price) of the patent in question.

The prior art methods and tools do not provide a means for a seller of a given patent being sold at auction or private sale to efficiently ascertain beforehand the context of the web of patents the offered patent resides. The current methods of analysis do not provide for the analysis in a given context especially where an analysis of a thicket patents is involved. All of the foregoing factors bear upon the price, the audience targeted, and the determination of the potential monies to be received from the sale outweigh the risks involved in no longer maintaining the defensive protections of the patent being offered for sale, if sold.

The prior art methods and tools do not provide a means for a buyer of a given patent to efficiently ascertain in the context of said patent being sold at auction or private sale to ascertain its likely competitors for the patent, and if the purchase of the patent in question will satisfy the strategic objectives the purchased patent is intended to achieve.

The prior art methods and tools do not provide a means for a seller or potential buyer of a given patent being sold at auction to adequately correlate the value of past patent sales to the prospective value of the patent under study.

The prior art methods and tools do not provide a means for university technology managers to ascertain the scope and context of their patent portfolios. The managers cannot effectively manage their patent portfolio(s) containing the various inventions, and do not help provide direction for their inventors.

The prior art methods and tools do not provide sufficient information for university technology managers to monetize their patent portfolios. The previous methods and tools do not identify prospective licensees or buyers of any or all of their patents.

The prior art methods and tools do not provide sufficient information for patent plaintiff litigators to efficiently ascertain potential prior art references that reinforces the documentary evidence of infringement.

The prior art methods and tools do not provide sufficient information for patent defense litigators to ascertain prior art references that rebut the evidence of infringement and shows non-obviousness.

The prior art methods and tools do not provide sufficient information for patent investors to explore, discover, review, and target acquisition targets from the myriad universe of patent portfolios that may be available to acquire, said portfolios having synergies with the patents held by the investors in their own patent portfolios.

The prior art methods and tools do not provide a sufficient information for patent investors to efficiently explore, discover, and learn of from the myriad universe of patents those patents that may be infringed, or those patents that are infringing patents held in their own portfolio.

The prior art methods and tools do not provide a sufficient information to aid corporate technology officers to efficiently perform and discharge their due diligence activities in connection with a proposed acquisition of an entity owning one or a plurality of patents as part of a merger or otherwise.

The prior art does not provide sufficient information for human resource professionals to efficiently discover, learn, and determine if new technology professionals or staff whether temporary (project) or permanent should be retained.

The prior art methods and tools do not provide sufficient information for patent owners to efficiently ascertain from an economic perspective the merits of paying a pending maintenance fee of a U.S. Patent registered with the USPTO or allowing the patent to be abandoned.

The prior art methods and tools do not provide sufficient information for efficiently assembling, analyzing, and utilizing the pertinent patent references for a specific patent in the context of other patents to which it has a technological relationship, irrespective of whether the patent under study is directly cited chronologically by the other patents in question or vice versa (i.e., undirected citation searches).

It is an object of the present invention to provide sufficient information in the context of directed search, to allow for the presentation of graphical information of the direct citation relationships between the two patents.

The prior art methods and tools do not provide sufficient information for employing citation analysis on published (but unissued) patent applications, and for which there are no explicit patent or other citation data furnished on the face of the application in question at the time of publication, or no Information Disclosure Statement(s) was filed with the patent application, or no Office Action has issued at the date of interest.

The USPTO sponsored a Peer to Patent project described at http://www.peertopatent.org/. The Peer to Patent project does provide certain prior art as a first approximation of citable art. The Peer to Patent project did not address the consequential problem of published applications cited in an IDS. The Peer to Patent project did not provide anything more than a mechanism to obtain prior art and contribute prior art references amongst its community members. No means of automating the process to obtain information of on the prior art of the so-called "community patent review" project(s) was made available The prior art methods and tools do not provide an efficient and effective means of discovery of latent or otherwise unobvious relationships within and between individual patents or individual patents residing within a large database of patents, either under the ownership or control of a single entity, or under the ownership or control of two or more entities, such groups of patents referred to as "patent thickets."

The prior art methods and tools do not provide patent litigators or patent examiners at various patent offices, such as the USPTO, an efficient and effective means to obtain information to discover latent or non-obvious relationships between patents, or a patent application and a patent, or published and later abandoned patent applications (applications that do not mature into issued patents with citations). The prior art methods and tools do not provide patent law firms with an efficient and effective means of obtaining information identifying potential conflicts of interest regarding the patent prosecution of a particular application.

The prior art methods and tools do not provide a means to obtain the information to ascertain how valuable the large patent portfolio of an entity and its competitors may be.

The prior art methods and tools do not provide a means to ascertain information on how likely an entity's product is to infringe on a competitors' patent or patents.

The prior art methods and tools do not provide a means to ascertain sufficient information on whether acquisition of a patent, patents, or patent application may be used to avoid or correct an infringement situation.

The prior art methods and tools do not provide a means to ascertain the information to determine the results of a proposed merger of two or more competitors wherein one or more of such competitors owns or controls a large portfolio of patents.

Thus, there is a need for a better method for patent analysis to obtain information with respect to any two patents contained within any two large patent portfolios with respect to their technology similarities if any. There is a need for a method and tool to allow for the systematic and efficient analysis of information with respect to any two patents or a patent and a patent application contained in a large patent portfolio or portfolios sometimes referred to as "patent thickets". There is a need for a better method of patent analysis to obtain information With respect to a patent database of the technological basis that is contained within a portfolio of patents for determining a patent thicket.

There is a need to determine and have sufficient information with respect to prior art for published but unissued, or abandoned patent applications, where no such information has been provided by the applicant.

SUMMARY OF THE INVENTION

The instant invention provides a process to obtain sufficient information to determine the nexus between any two patents or a patent and a patent application with respect to its inventors, technological, historical, chronological, ownership, citation history, or other desired connection points.

BRIEF DESCRIPTION OF THE DRAWINGS

FIGS. 13 and 13A represent more specifically represent samples of the prior art forward citation analysis.

DESCRIPTION OF THE PREFERRED EMBODIMENT

The preferred embodiment of the present invention has been described, the details of the present invention may be modified without departing from the invention, which is defined by the claims.

The discussion and examples of the present invention utilize issued U.S. patents, patent publications and U.S. patent references. Other patent classification systems may be utilized. The use of cited references, their classification, keyword, assignee(s), inventor(s), attorney or attorneys, addresses, dates, examiner, foreign references, or other information are obtained from the front page of a US patent or 25 patent application Can be utilized in the present invention to select and determine the appropriate nexus between two patents or a patent and patent application. The USPTO at (http://patft.uspto.gov/netahtml/PTO/search-adv.htm) provides a database of information to select the nexus the user desires to determine. See readily available for (http://appftl.uspto.gov/netahtml/PTO/search-adv.html).

Information Common to all Examples

The examples used herein are presented for solely for purposes of illustration of the present invention, and chosen for purposes of simplicity and ease of understanding, as noted previously the two examples chosen are from the database of the United States Patent Office. The patent or patent applications require is sufficient information to determine or formulate a relationship between at least a plurality of patents or patent applications.

The various embodiments of the present invention are best illustrated by the presentation of examples of as shown below.

EXAMPLE 1

Prior Art Citation Tree Analysis

A. Shortcomings

The following is an example of the use of the most common prior art method of citation analysis.

Typical Problem to be Solved

The prior art method of citation tree analysis is currently used by those skilled in the art to ascertain relationships between a given patent under study to one or more other patents with which the patent studied is either: (a) cited by subsequent patents as prior art or (b) cites previous patents as prior art.

Figure 1:
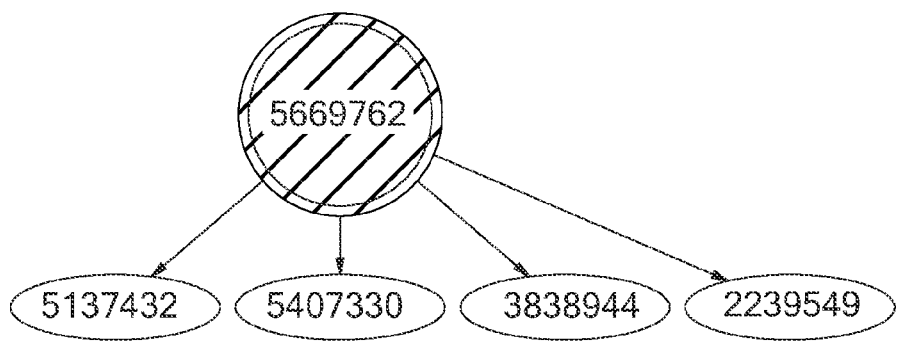
FIG. 1 shows an ancestral citation tree for a single patent, U.S. Pat. No. 5,669,762, looking back two generations.
Figure 2:
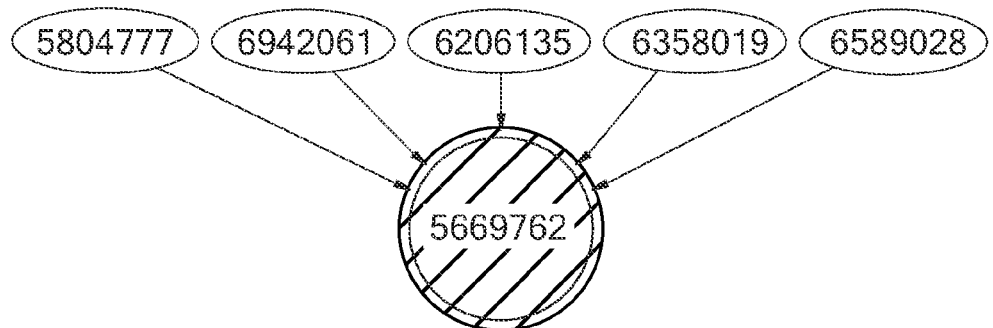
FIG. 2 shows a citation tree of the progeny for U.S. Pat. No. 5,669,762, looking forward two generations

Prior Art Methodology:

Assume U.S. Pat. No. 5,669,762 is under study for further analysis. Utilizing the prior art method of citation analysis, two common citation tree branches at one degree of separation (i.e., a one-generation citation reference) are shown in FIGS. 1 and 2. As shown in the figures, the aggregate number of patents presented is ten, which is nine references plus the patent under study.

A patent searcher would obtain a copy of each of the patents cited and examine each patent in depth to determine the connections if any to the patent under study.

A simple extension of this prior art method and tool is to extend the citational analysis further by further degrees of separation to enlarge the scope of the search to encompass further prior art. Those ordinarily skilled in the art of citation tree analysis will understand how this would be carried out. Reference is made and incorporated herein to with respect to the Thompson® citation products for use with respect to determination of the desired patent database.

Limitations:

This prior art method of simple citation tree analysis, regardless of the number of degrees of separation (i.e., generations) employed, is useful for displaying a connection between a single studied patent and patents directly cited to it or are directly cited by it, its utility is limited as there must be an unbroken chain of citations to graphically to show the chronological relationships, with limited utility for the technological connection between any of the patents cited.

FIGS. 1 & 2 are straight forward in appearance and easy to comprehend for the simple case of a single starting patent and a small number of generations, in this example, one generation forward and one generation back.

This type of analyses can become more complex and problematic to the point of being impractical as an analytical tool. As the number of patents under study increases (and the need to run individual citation trees increases the graphical representation of the nexus of information becomes more difficult to present.

Tree citational complexity results from an increase in the number of patents studied, for example, An increase in the cumulative number of patent references as the number of generations (i.e., degrees of separation) increases as measured from the patent under study;

The simultaneous examination of both "prior art" references (i.e., previous patents) and "innovation" references (i.e., subsequent patents) of the patent under study; or An increase in the cumulative number of patent references as the number of patents at a given degree of separation is compared to a patent database (i.e., patent thickets).

The process of using citation tree analysis is flawed for detailed technological relevance between the patent to be reviewed and a patent database (e.g., U.S. Pat. No. 5,669,762), innovation does not always occur on a one to one patent basis, but rather often is encompassed on a "one-to-many" patent basis, that is a patent may have relationships to other patents which do not directly chronologically cite to each other as prior art, and are not directly cited by each other, but rather have citation or other links through INTERMEDIARY patents.

EXAMPLE 1a

Novel Citation Tree Analysis Method Examples

Examination of the PRIOR ART METHOD of the comparison of two patent portfolios where at least one of the portfolios is a patent thicket, and determining the technological innovation encompassed in a patent is desired since the issuance of the patent at issue.

In example 1 analysis, is commissioned by APEX Medical Corporation of Taiwan, the (original) assignee of the patent at issue, U.S. Pat. No. 5,669,762, it is desired to discover what, if any, innovation has occurred since the issuance of '762 patent, and has been encompassed in any subsequent patents. This objective is a typical goal of citation tree analysis.

Examination of the patents at the USPTO website, as shown by the patents presented in Example 1, FIG. 2, in our analysis, illustrates one specific company owns or controls two of the five citing patents presented by this initial analysis of the patent at issue. The patents reference our owned by LG Electronics Inc. of Korea. Upon further examination of the USPTO website, it is discovered that in excess of 5,000 issued patents are assigned to LG Electronics Inc. ["LGI"]

Our analyst determines and illustrates LGI cites the '762 patent as prior art in greater proportion than other entities, as displayed in FIG. 2. Our analysis, shows a novel form of citation tree analysis for further analysis of the relationships between the '762 patent and the patents owned by LGI.

This initial result of the analysis performed could have been more limited or restricted to directly relevant patents of LGI by further defining selection criteria to limit the desired result; such criteria may be US Class(es), or keyword(s). The resultant analysis determined the technological innovation references indicated in FIG. 2 are relevant.

The one degree of separation between the patents in terms of a chronological link, to the '762 patent in relation o the LGI patents are shown in FIG. 2. A further generational analysis of the relationships between the '762 patent and the LGI database may be desired. One way of doing this would be to create multi-generational (i.e., >=2 degrees of separation) citation trees comparing the links between each of LGI's 5,000+ patents relative to the '762 patent to see what other references may occur. However, the prior art citation tree analysis used in Example 1, would require creating five thousand or more citation trees, to then analyze the results in man-hours would require hundreds if not thousands of hours and be cost prohibitive.

In the case of studies of more than a small number of patents, or in the case of examining the relationships between multiple patents, within or between patent thickets, it is impractical (from the standpoint of man-hours, resources, and costs) to analyze the interconnections between the selected patents.

One embodiment of the present invention can provide selections for limited or predetermined subsets of the desired results of patents containing the information of the technological innovation detailed in the patent or patents.

EXAMPLE 2

The Exploration of Two Sets of Patent Databases Wherein at Least One of Such Sets is a Patent Thicket A user will pre-determine a database of the desired information from the United States Patent and Trademark Office website housing an enormous patent database. The database will comprise at least the following selected data:

The patent numbers of all patents issued by the USPTO; and

These patents and published patent applications listed on the face of the patent at issue.

a. A Portfolio "A" comprising only one patent, the '762 patent, is formed; and a Portfolio "B" comprising all of LGI's issued patents of record, (currently in excess of 5,000 patents), is formed comprising Portfolio "B" otherwise known as (a patent thicket).

Figure 3:
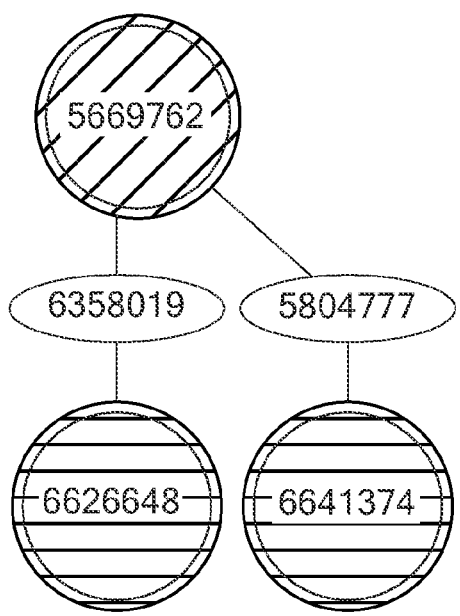
FIG. 3 shows a citation tree for U.S. Pat. No. 5,669,762 directed forward two generations. The Figure shows all interconnections of U.S. Pat. No. 5,669,762 patent to all of LGI's issued US patents, at two degrees of separation through any and all intermediary patents.
Figure 4:
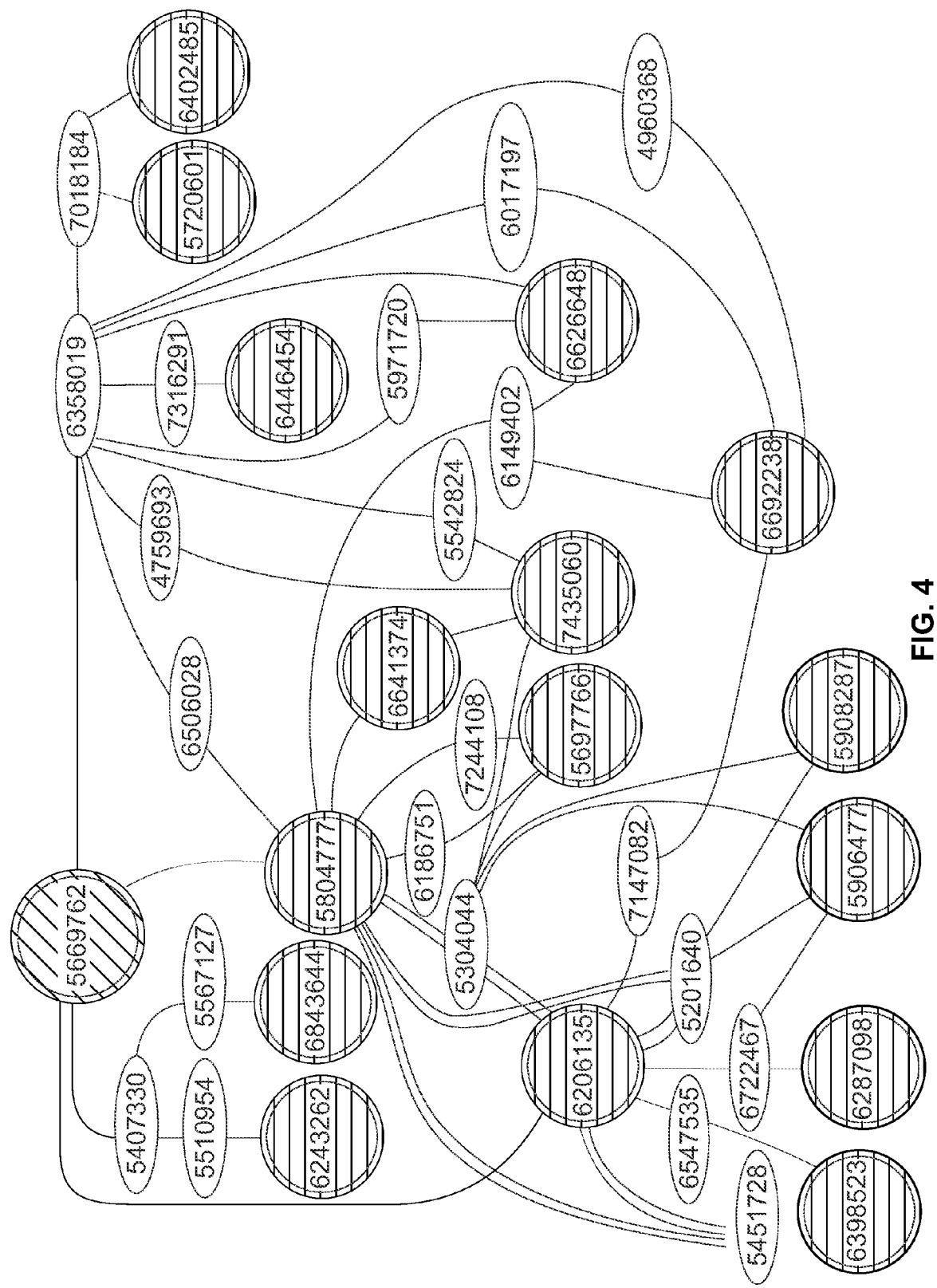
FIGS. 4-7 show 9 unique links between U.S. Pat. No. 5,669,762, the patents of LGI, and a patent thicket comprising the combined patents of Philips Electronics, Sony Corporation and Panasonic Corporation, at four degrees of separation.

The next step in the analysis is to present a "query" or "queries" of the database for the patent citations of all connections between the two patent portfolios "A" and "B" to produce a citation tree analysis as shown in FIG. 3. The citation tree is directed chronologically forward two or three generations (or alternatively as described all interconnections between the '762 patent and all of LGI's issued US patents), or otherwise Portfolios A and B, as created:

The present invention provides a list of any and all intermediary patents, irrespective of to whom the intermediary patents belong; between Portfolios A and B; and This is irrespective of the direction of the links, whether chronologically forward or backward in time.

A representative query required to accomplish this is to first find all patents that lie on the referential citation path (e.g., links between nodes) between the '762 patent (Portfolio "A") and each of the patents owned by LGI (Portfolio "B"). One ordinarily skilled in the art of database programming can employ current off the shelf microcomputers running the Microsoft® Windows operating system and SQL SERVER® relational database software products to program and formulate such a query. The results are displayed using commercially available graphing software such as "Microsoft Automatic Graph Layout, said tool documentation can be found at http://research.microsoft.com/en-us/projects/msagl/ which is incorporated herein by this reference.

The results of this example are presented in FIGS. 3 (the '762 patent plus 4 new Patents) and 4 (the '762 patent plus 37 new Patents. The results are presented for two and three degrees of separation between Portfolios "A" and "B". Each example provides a reasonable number of patents identified for further review by an analyst and can be performed at a reasonable cost. As one can plainly observe this example illustrates that more LGI patents in the citation chain are connected and require examination. The otherwise arduous and impractical task of creating and reviewing thousands of citation trees using prior art methods and tools has been avoided, and the present invention has improved the analysis by presenting a more defined result.

EXAMPLE 3

The Exploration of the Relationships Between Two Identical Patent Thickets, Traversing One or More Specific Patents, to Assess the Value of the Patents This is an example of the comparison of three or more patent portfolios. This example is provided to demonstrate the results of how the present invention can illustrate the synergy between a plurality of the portfolios where at least one of the portfolios is a patent thicket and the analysis requires the discovery of the connection links between the portfolios subject to the constraints pre-determined (a) the links must traverse one or more of the patents of a third portfolio, and (b) a plurality of the patent portfolios are identical.

One procedure to determine the VALUE of the '762 patent with respect TO the LGI patent portfolio is to examine all references between each of LGI's patents contained in its portfolio, as one of the plurality of portfolios to be examined, and the SAME LGI's patents as the second portfolio of a plurality of portfolios, subject to the pre-determined limitation or configuration of the connection to the '762 patent (i.e., the third portfolio.

The rationale used to determine the value of the '762 patent is related in whole or in part to the interrelationships of the '762 patent to the patents of LGI. If the '762 patent is heavily connected to one or more of the LGI patents, LGI may look for an opportunity to license or acquire the '762 patent by LGILGI.

The present invention provides for a method to economically and efficiently determine the chronological relationship history between the '762 patent and the LGI patent portfolio.

Using the same databases as before, where the result to be determined is the relationship between the '762 patent and the two identical database of LGI's patent portfolio, the query to determine the information of the connections in the citation tree analysis are structured such that:
Portfolio "A" comprises all patents owned by LGI.
Portfolio "B" consists of the '762 patent only.
Portfolio "C" also comprises all patents owned by LGI.
Portfolios "A" and "C" are identical.

Figure 5:
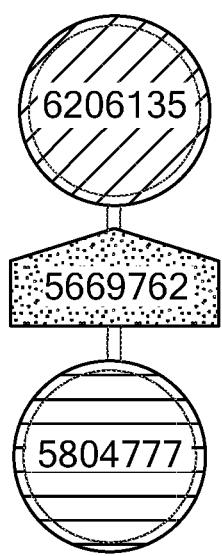

The results of the first query of the database for two degrees of separation between the two (2) LGI database of the patent portfolio and the '762 patent (LGI vs. LGI via '762 @ 2 degrees) yields the surprising result, of only two patents in the LGI portfolio database that are (i.e., U.S. Pat. Nos. 6,206,135 and 5,804,777) interconnected through the '762 patent @ 2 degrees of chronological separation are shown in FIG. 5.

Figure 6:
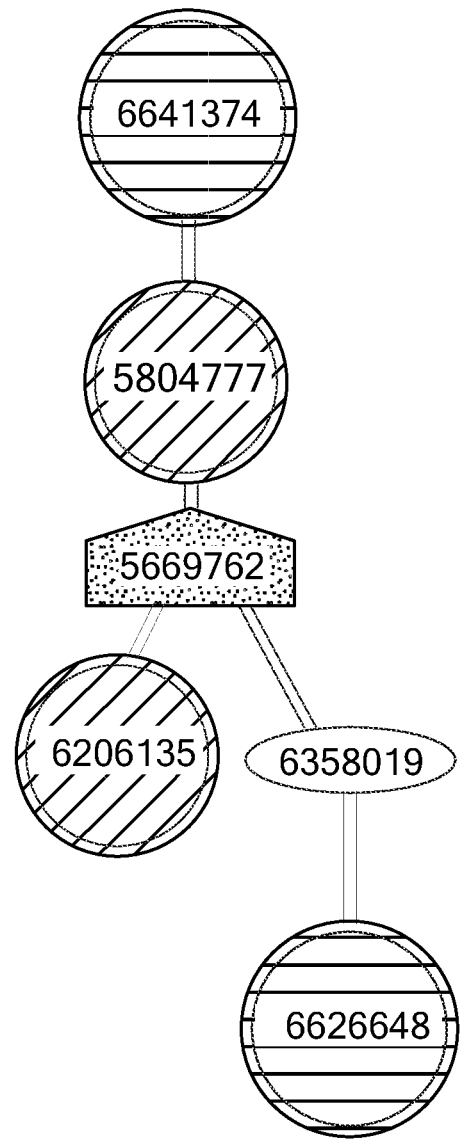

Within the scope of the present invention, the query took only a few seconds to run providing both an economical and efficient result. If it decided to further broaden the analysis to 3 degrees of chronological separation to find if further interconnected relationships exist between the '762 patent and the LGI patent database with the same constraints, the results are shown in FIG. 6. Again, it took a few seconds to obtain and yield four patents of the LGI patent portfolio database and the patent owned by another company, Danfoss Compressors GmbH of Germany. The resultant relationship diagram indicates a highly connected set of relationships between the '762 patent and the LGI portfolio patent database, with a small set of patents to evaluate in more detail with respect to the interconnection with the '762 patent.

Figure 7:
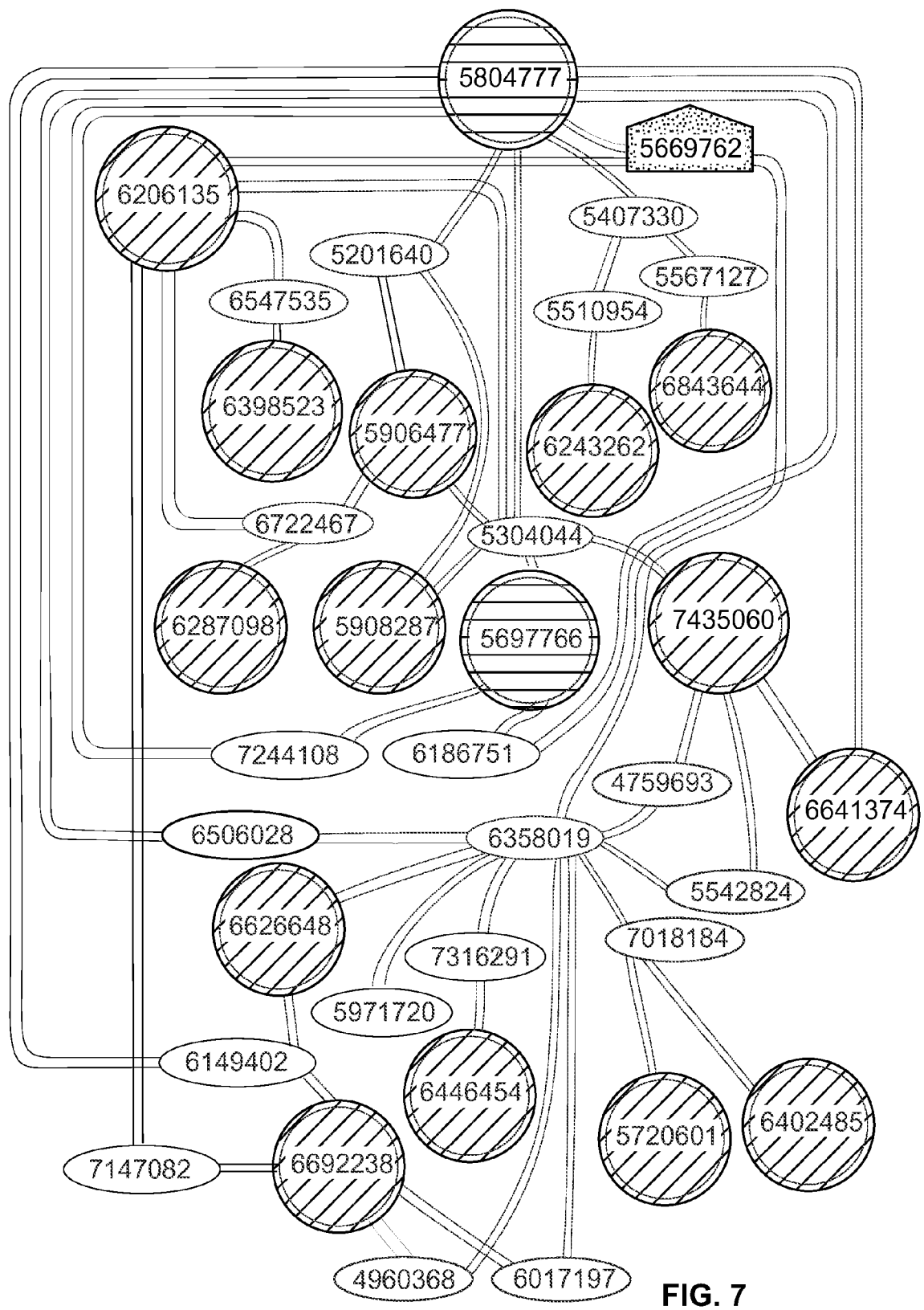

A search query of 4 degrees of chronological separation between the '762 patent and the LGI portfolio patent base are shown in FIG. 7. The results of this query yielded 37 patents of LGI patent database portfolio and the '762 patent. The results as shown in the diagram illustrate a highly connected set of relationships between the '762 patent and the LGI patent portfolio database. The results present what may be termed a "small worlds" of patents as illustrated in the diagram, which may imply sub networks of technology or technologies related to the '762 patent.

EXAMPLE 4

The Exploration of the Relationships Between Two Non-Identical Patent Thickets, Traversing a Third Set of Patents, the Third Set of Patents Comprise One or More Database of Specific Patents to Assess their Value The comparison of three or more patent portfolios where one or more of the portfolios may be a patent thicket and the point of the analysis is to determine the discovery of patents that are linked, i.e., interconnected between the two patent portfolios, where one portfolio comprises the patents owned by one or more specific entities (e.g., assignees), where said patent portfolios are identical, and said patent portfolios are subject to the limitation where an interconnection must traverse at least one patent of a third patent portfolio database.

In contrast to EXAMPLES 2 and 3 provided above, an alternate way to provide this result, which may be a way to evaluate the value of the '762 patent, is to examine any and all patent references between a patent portfolio comprising a specified selection of LGI's competitors' patents in one of the portfolios to be examined, and a second patent portfolio comprising all of LGI's patents where the relationship between the two patent portfolio databases must traverse the '762 patent, which comprises a third patent portfolio database.

The basis of the rationale for this analysis is that the value of the '762 patent is related in whole or in part to:

The licensing or outright sale of the '762 patent to LGI based upon the interconnections of the '762 patent to the patents chronologically linked by the query, which is a subset of the patents of LGI's closest competitors.

The licensing or outright sale of the'762 patent to one or more of LGI's closest competitors based upon the interconnections of the '762 patent to a specific patent or set of patents owned by an LGI competitor or competitors.

The licensing or outright sale of the'762 patent to one or more of LGI's closest competitors based upon the interconnections of the '762 patent to any of the patents of an LGI competitor or LGI's competitors.

The present invention provides a method for said analysis to be done quickly and easily, over the prior art methods.

To determine which competitor or patent database of a competitor an online database such as Hoovers (see http://www.hoovers.com) can be examined for the patent assignment data. Three competitors are readily found, specifically:
Sony Corporation (holding more than 26,000 patents);
Philips Electronics (holding more than 7,000 patents; ☐); an Panasonic Corporation (holding more than 1,700 patents).

Each of these competitors' patent portfolios would constitute a patent thicket. In a combination portfolio, as illustrated in this example, the patent thicket contains in excess of 35,000 patents!

For a first determination, three queries are run on the patent databases using the present invention to assess and compare the number of chronological interconnections @ 2 degrees of separation between LGI and each of the above competitors, the following is found:

There are more than 10,000 unique interconnections or links between the patents of LGI and f Philips Electronics at two degrees of chronological separation;

There are more than 49,000 unique interconnections or links between the patents of LGI and Sony Corporation at two degrees of chronological separation; and There are more than 1,000 unique interconnections or links between the patents of LGI and Panasonic Corporation at two degrees of chronogical separation.

Employing the same database of patent numbers and references as used in the prior examples. The query of the present invention is structured such that:
Portfolio "A" comprises all patents assigned or owned to LGI;
Portfolio "B" holds only the '762 patent; and
Portfolio "C" comprises all patents currently assigned or owned by Philips, Sony and Panasonic.

The results of the analysis @ 2 degrees of chronological separation yields no patents, the query is run @ 3 degrees of chronological separation, and again. The result yields no patents, both of which are believed to be surprising results. The query is run @ 4 degrees of chronological separation, and yields a result of 9 patents that are interconnected or linked.

Figure 8:
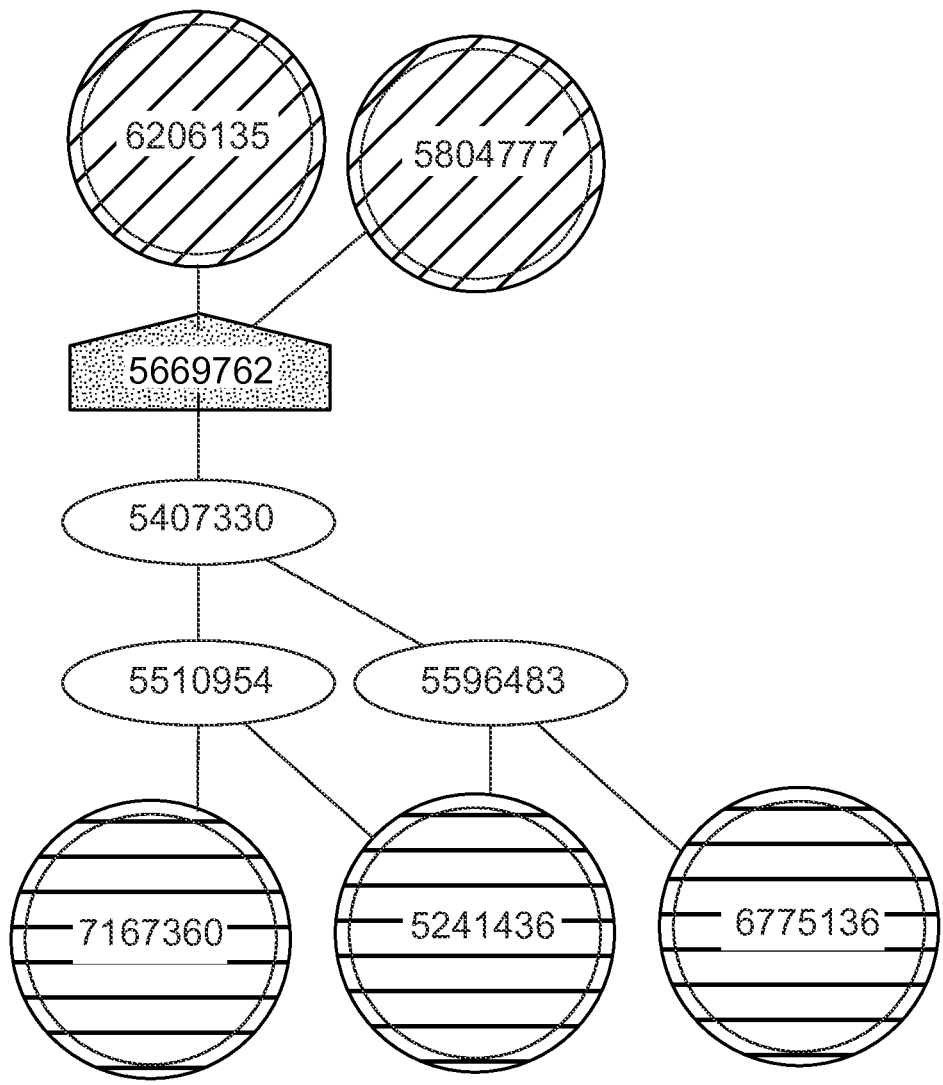
FIGS. 8-9 shows flow charts illustrating the links between the patents of Philips Electronics, Sony Corporation, and Panasonic Corporation.

Only 9 patents having unique links or interconnections between the patents of LGI's portfolio patent database and the patent thicket comprising the combined patent portfolios of Philips Electronics, Sony Corporation, and Panasonic Corporation, at four degrees of chronological separation that pass through the '762 patent exist. The result is shown in FIG. 8.

At this scale of four degrees of chronological separation, the connections to two of the patents of the LGI patent portfolio database terminate in three patents of Sony Corporation patent portfolio database, but traverse the '762 patent and three patents that were in Portfolio C of the patent database but have now been assigned to two new owners, the two new potential licensees (i.e., two patents were assigned to Silent Systems, Inc and one patent was assigned to Mangar International Ltd.). These assignees may be potential competitors, infringers, or companies in related technologies. The present invention has provided for small set of patents in the very large portfolio of the combined patent databases allowing for examination for more specific relevancy. The user of the present invention is now provided with a very manageable number of patents to examine in detail to assess a value for the '762 patent, or possible infringement of the '762 patent, or technological or economic combinations of the patents.

Further, with the information provided by the present invention the user in this hypothetical example can determine whether or not it would be in the best interests of APEX Medical Corp. to acquire the intermediary patents illustrated by the analysis before approaching a potential licensee or buyer of the '762 patent.

As an example here, the present invention has provided information regarding the discovery of potential patent acquisition targets, or potential buyers of its own technology as encompassed in its '762 patent, or patents it may desire to purchase related to the technology in the '762 patent.

The methods of the prior art did not provide sufficient information to make a limiting determination of the patents that should be examined, such as made possible by the present invention. The present invention provides a means to obtain information not economically and efficiently obtainable by the methods and tools of the prior art.

EXAMPLE 5

The Exploration of the Relationships Between Two Patent Thickets Traversing Patent(s) in One or More Us Current Classifications to Assess Patent Value or Licensing Opportunities Thereof This is an example of the comparison of three or more patent portfolios wherein the analysis involves the discovery of links between two of the portfolios subject to the constraint that the links must traverse one or more of the patents of the third portfolio, wherein the third portfolio comprises one or more subclasses of patents, irrespective of by whom the patents of such third portfolio are classified by the USPTO as one or more specific class/subclasses but may be owned or controlled by more than one assignee. (e.g., all nanotechnology patents residing in CLASS 977 including its subclasses).

In this example, the General Electric Company (GE) owns or controls over 30,000 issued US patents and is conducting a study to ascertain which patents of GE may be related to patents residing in one or more subclasses of US Class 977 in an effort to determine the value of the patent, and the licensing potential of any GE's patents related to this Class.

Determine of potential acquisition targets for GE in the nanotechnology space is a desired result of the queries of the present invention, especially where the acquisition targets may be complimentary to the patents of GE, or said patents may interfere with said patents of GE in the nanotechnology space.

A database to determine the patent portfolio databases in the nanotechnology space is chosen. In this example, the source of information for the patent databases is http://www.nanotechcompanies.us/. Patent Portfolios contained within this database include such nanotech companies as IBM Corporation, aggregate, holding over 50,000 issued US patents, not all necessarily relating to nanotechnology. One option which is not feasible using the prior art methods and tools is to examine each of the 30,000+ US patents of GE and the 50,000+ US patents of IBM residing in one or more subclasses of US Class 977, and determining interconnections or links exist between the two patent portfolio databases, then using this information to derive a subset of the patents contained in the Class 977 technology.

Utilizing a query of the present invention for a quick examination of the relationships between the entire GE and IBM patent portfolios yields in excess of 1,600 such interconnections or links between the two patent databases.

The present invention provides a method to expedite this analysis. First, a third patent database portfolio is created comprising a pseudo entity ("Mr. Nano Tech"), the entity for this analysis is deemed to own or control all of the patents residing in US Class 977. Mr. Nano Tech's patent portfolio comprises in excess of 10,000 issued US patents. The present invention now provides the basis for the formulation of this query utilizing the following three portfolios:
GE with 30,000+ patents—Portfolio "A"
Mr. Nano Tech with 5,000+ patents—Portfolio "B"
IBM with 50,000+ patents.—Portfolio "C"

The present invention provides for this analysis to be done in a few minutes on the hardware and software system described above, yielding the following results.

A first approximation query of the patent databases (as shown in the prior examples) determines which patents of GE are linked, irrespective of chronological direction, to the patents of the IBM patent database portfolio subject to the limitation the intermediary patents are classified by the USPTO in the nanotechnology Class of 977. At two degrees of chronological separation (i.e., from GE to IBM via Mr. Nano), there are approximately 1000 relationships between the patent portfolios of GE and IBM that traverse the patent portfolio of Mr. Nano Tech.

Upon further analysis, the results show only 143 patents of Mr. Nano Tech are intermediary to and directly related to the patents of GE and IBM. The specifics of the 143 patents, although not trivial, are small compared to the size of the patent portfolios of GE, IBM and Mr. Nano Tech, individually.

Figure 9A:
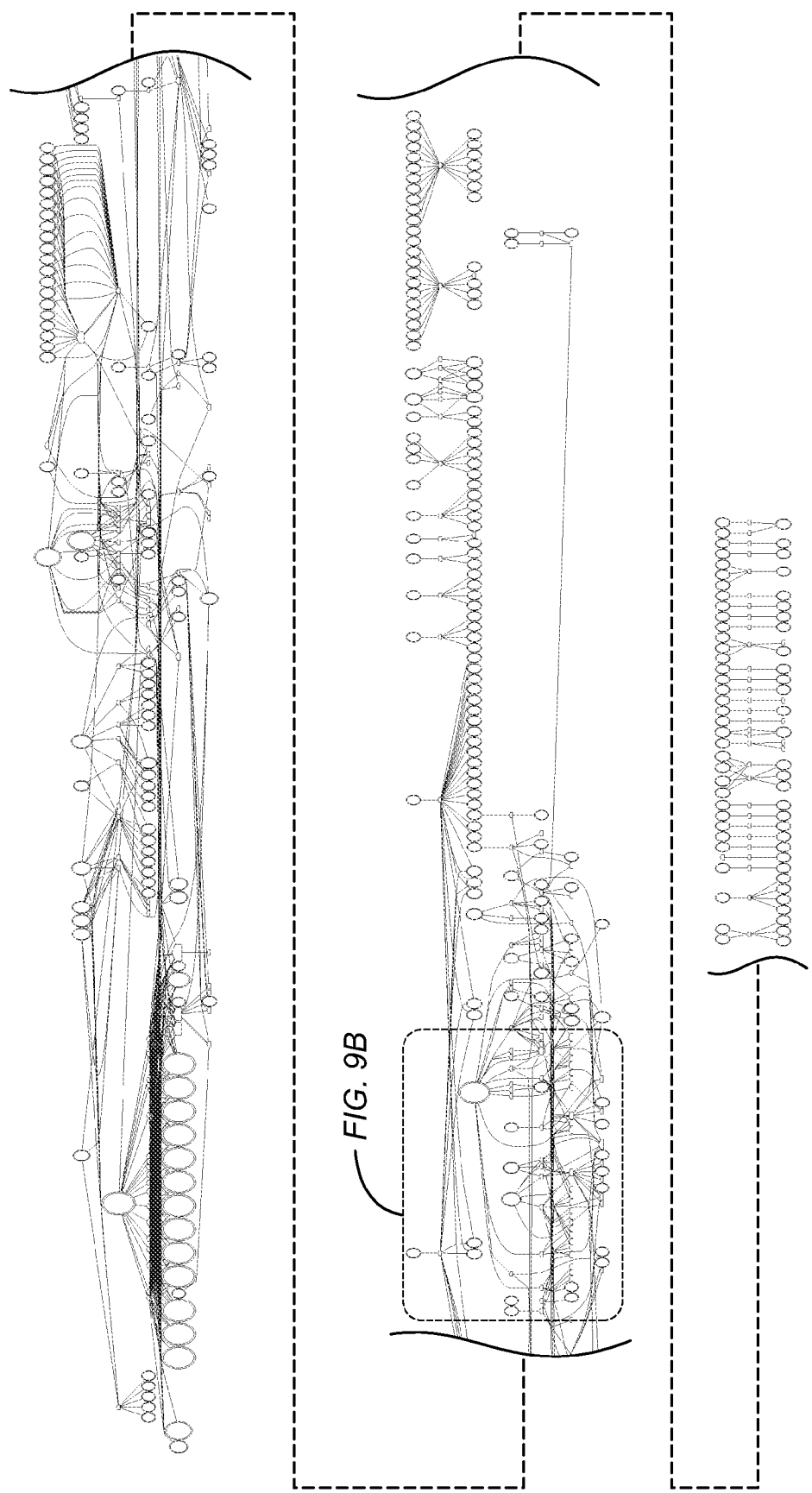
Figure 9C:
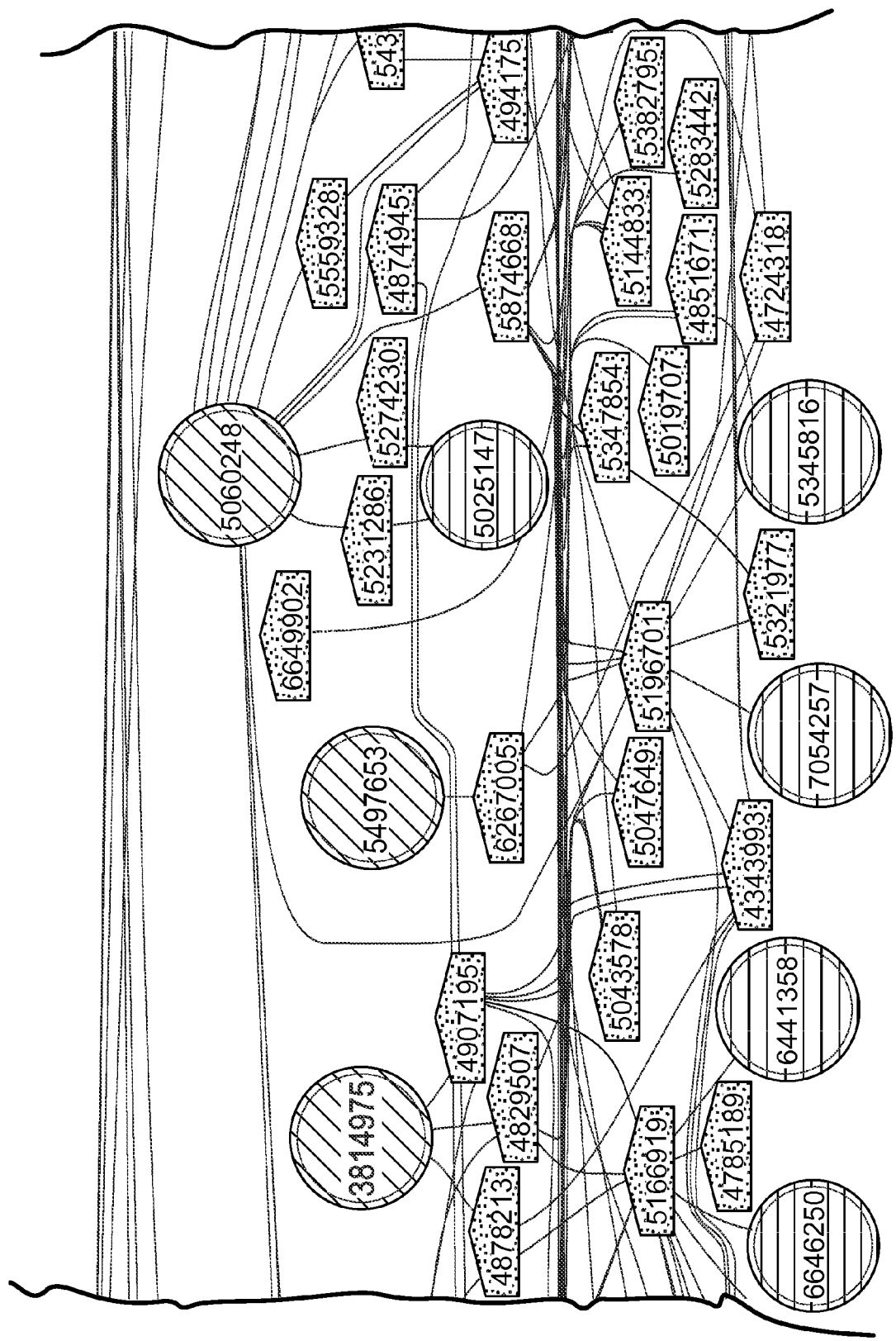

The results are shown in FIGS. 9A and 9B. The connections among the patents are arranged in small subsets or 'worlds.' As part of the review of the patents, an examination to organize the findings in the context of these small worlds, to ascertain any specific relevancy or interconnection of the particular patents to each other is performed.

The intermediary patents in this exercise are determined through the selection of the patents listed by US Current Classification rather than assignee. These results may be further delineated. A further refinement in the example would be to constrain Mr. Nano Tech's portfolio such that the patents in the patent portfolio database cannot be owned or controlled by IBM or GE. The further delineated result is preferred if one were wanting to examine the interconnecting patents solely based on third parties where acquisition is an interest. To constrain the contents of Portfolio "B", the analyst would need to add one field to each of the original database records, namely, assignee name, and direct the query to exclude specified assignees from the output. Such information is readily available from the USPTO website and could be easily integrated into the method.

The instant example is broad in scope in that it also affords the analyst with the opportunity to examine direct relationships between the GE and IBM database of patent portfolios constrained solely by the requirement the interconnection or link be through Class 977.

EXAMPLE 6

The Exploration of the Relationships Between Two Patent Thickets Traversing a Patent Portfolio Comprising Patents Assigned to One or More Specific Assignees to Assess Patent Value or Licensing Opportunities Thereof The comparison of three or more patent portfolios where the analysis involves the discovery of interconnections or links between two of the portfolios subject to the constraint that the links must traverse one or more of the patents of a third patent portfolio where the third portfolio comprises the patents of a single assignee.

In this example, a company, or entity, such as IBM's nano-technology group, is exploring the possibility of licensing technology under the control of the United States of America To do determine, which licensing opportunities make sense, the relationships between the patent portfolios comprising all of IBM's patents (recall from the foregoing that they number 50,000+) and the portfolio of Mr. Nano Tech, above (recall from the foregoing they number 5,000+), but now subject to the constraint that the relationships traverse a third portfolio comprising patents that are owned or controlled by the United States of America ("USA"). The USA patent database portfolio consists of approximately 40,000 patents. This is a massive exercise to perform and virtually impossible to do manually.

Figure 10:
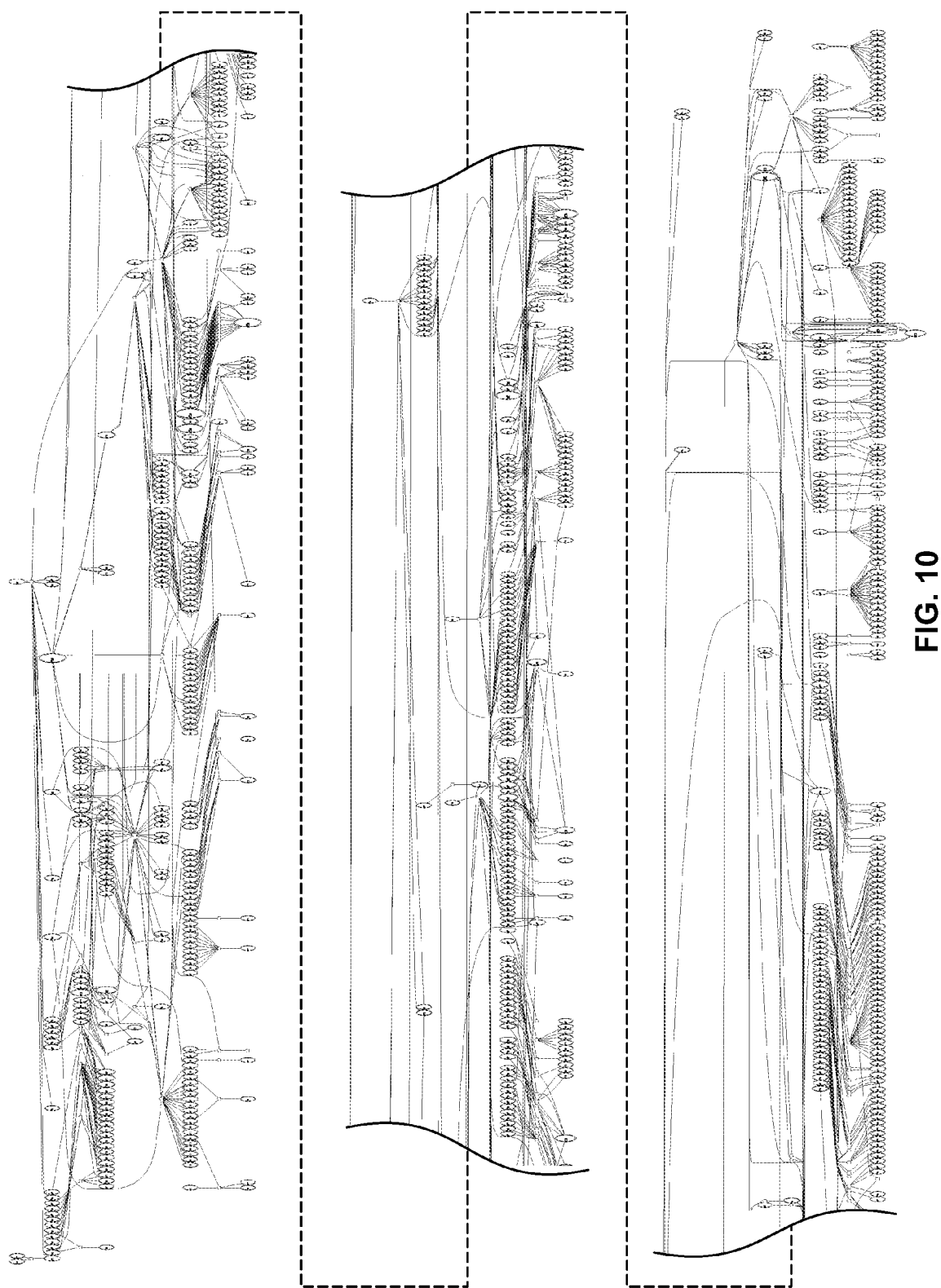
FIGS. 10-30 show flow charts where various determinants were used to illustrate an interaction between two patents in the patent thicket database.

The results of the query of the present invention (at two degrees of chronological separation in Class 977 from IBM to Mr. Nano via the USA) yield approximately 1,200 interconnections or links comprising over 1,000 patents, 208 patents are owned or controlled by the United States of America and are intermediary patents to the patent thickets of IBM and Mr. Nano Tech. Given the large size of the original patent thickets, it is a relatively easy task to examine the 208 patents for specific relevancy with respect to the desired information. To do this online, the user uses the direct URL (uniform resource locator) to a given patent as is provided by the USPTO. For example, U.S. Pat. No. 5,669,672, the URL would be http://patftl.uspto.gov/netacgi/nph-parser?patentnumber=5669762. The diagram shown in FIG. 10 illustrates the points of interconnection or links between the individual patent references to the thickets and small world patent databases created.

EXAMPLE 7

The Exploration of the Relationships Between Two Patent Thickets Traversing Patent(s) Assigned to One or More Assignees, Said Assignees are Represented by a Single Specific Attorney, a Single Firm, or a Single Agent The comparison of three or more patent portfolios where the analysis involves the discovery of interconnections or links between two of the portfolios subject to the limitation the interconnection(s) or link(s) must traverse one or more of the patents of a third patent portfolio where such third patent portfolio comprises the patents of one or more assignee(s) who are represented by a single patent attorney, a single agent, or a single firm.

In this example, a relatively large sized intellectual property law firm, McDonnell Boehnen Hulbert & Berghoff LLP, has been retained to explore the opportunities one clients may have in licensing one of more of their respective patents to IBM.

To do this, an examination of the relationships between a patent portfolio comprising all of IBM's patents that are linked or interconnected to an IBM patent that traverses a second patent portfolio of all of the patents of the law firm's clients on which the law firm is Counsel of Record, which second portfolio patents number in excess of 4,000 patents. Here a large patent thicket of IBM's database portfolio of patents is matched against itself, in conjunction with a smaller but nonetheless formidable patent thicket of the law firm.

The present invention requires the determination of a query to explore the links or interconnections with the IBM patent portfolio, in connection with itself, and the links or interconnections are limited to a connection or link to one or more of the law firm's client patents where said law firm is listed as Counsel of Record.

The initial query is set up for one degree of separation between the law firm's client patents and any IBM patents in the IBM patent portfolio, providing two degrees of separation between the twin IBM patent portfolios. There are 2,716 interconnections or links between the patents of the IBM patent portfolio databases, 1,129 patents of the IBM patent databases and the law firm client database portfolio, 317 patents in the law firm client database have a link or a connection to one of the patents in the IBM patent portfolio database. A further refinement or determination can be made, and may be desirable given the potential upside for one or more of the law firm's clients, the potential upside can be found, for example, if a blocking patent or other synergistic relationship can be discovered between the respective patent they own and an another patent which can be exploited if acquired, purchased, licensed, or otherwise monetized.

For a further refinement of the results, the twin end point portfolios are the patents contained and owned by Mr. Nano, in the Mr. Nano patent portfolio database.

Figure 11:
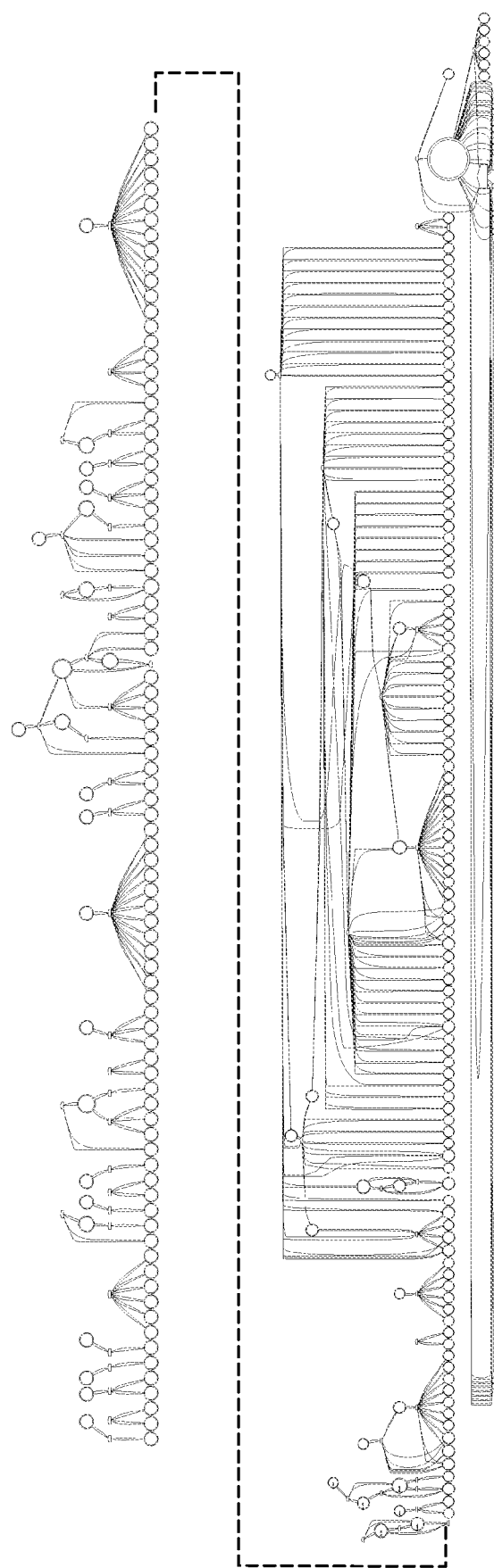

The query, formulated for one degree of separation between the law firm client's patents and any of the Mr. Nano patents in the Mr. Nano patent database (two degrees of separation between the twin Mr. Nano portfolios) illustrates there are 688 interconnections or links, 332 patents which traverse the three patent portfolios, 80 patents of which are owned by the law firm clients. The graph of the results, is shown in FIG. 11. A noticeable small world(s) of patents is illustrated in FIG. 11. The small world of patents illustrates the interconnections or links illustrating the relationships between the Mr. Nano patent portfolio and the law firm clientele portfolio. A more detailed examination illustrates a very highly connected subset of patents from the patent databases to the end point portfolios. This may be interpreted as a measure of the law firm client's patent(s) value.

EXAMPLE 8

The Exploration of the Relationships Between Two Patent Thickets Traversing One or More Patent(s) Assigned to a Specific Assignee, which Assignee Comprises an Institution Such as an Institute of Higher Learning as a University or Research Institute to Direct Further Research, Assess Patent Value and/or Discover Potential Licensing Opportunities Thereof The comparison of three or more patent portfolios where the analysis involves the discovery of links or interconnections between two of the portfolios are subject to a limitation the links or interconnections must traverse one or more of the patents of the third portfolio, the third portfolio comprises patents of a single assignee, where said single assignee is an institution of higher education, such as a research institute or university.

In this example, the Board of Trustees of the esteemed Leland J Stanford Jr. University desires to explore the opportunities one or more of its researchers for licensing one or more of their respective patents to Microsoft. The University is commissioning this work to help support its further research and development activities by obtaining revenues from its patent portfolio.

To do this, the present invention requires queries be defined to determine the relationships between the patent portfolio database comprising all of Microsoft's patents (numbering 10,000+) that are interconnected or linked to another Microsoft patent database that traverses a portfolio of all of Stanford's patents (2,000 or more patents). In this example, an extremely large patent thicket, Microsoft's patent portfolio is matched against itself, in conjunction with the patent thicket of Stanford University.

The present invention employs the same methodology as before, in this case, the initial query will explore the links from the Microsoft patent portfolio to itself, the links or interconnections are limited to the patents connected through one or more of the patents of Stanford University.

Figure 12:
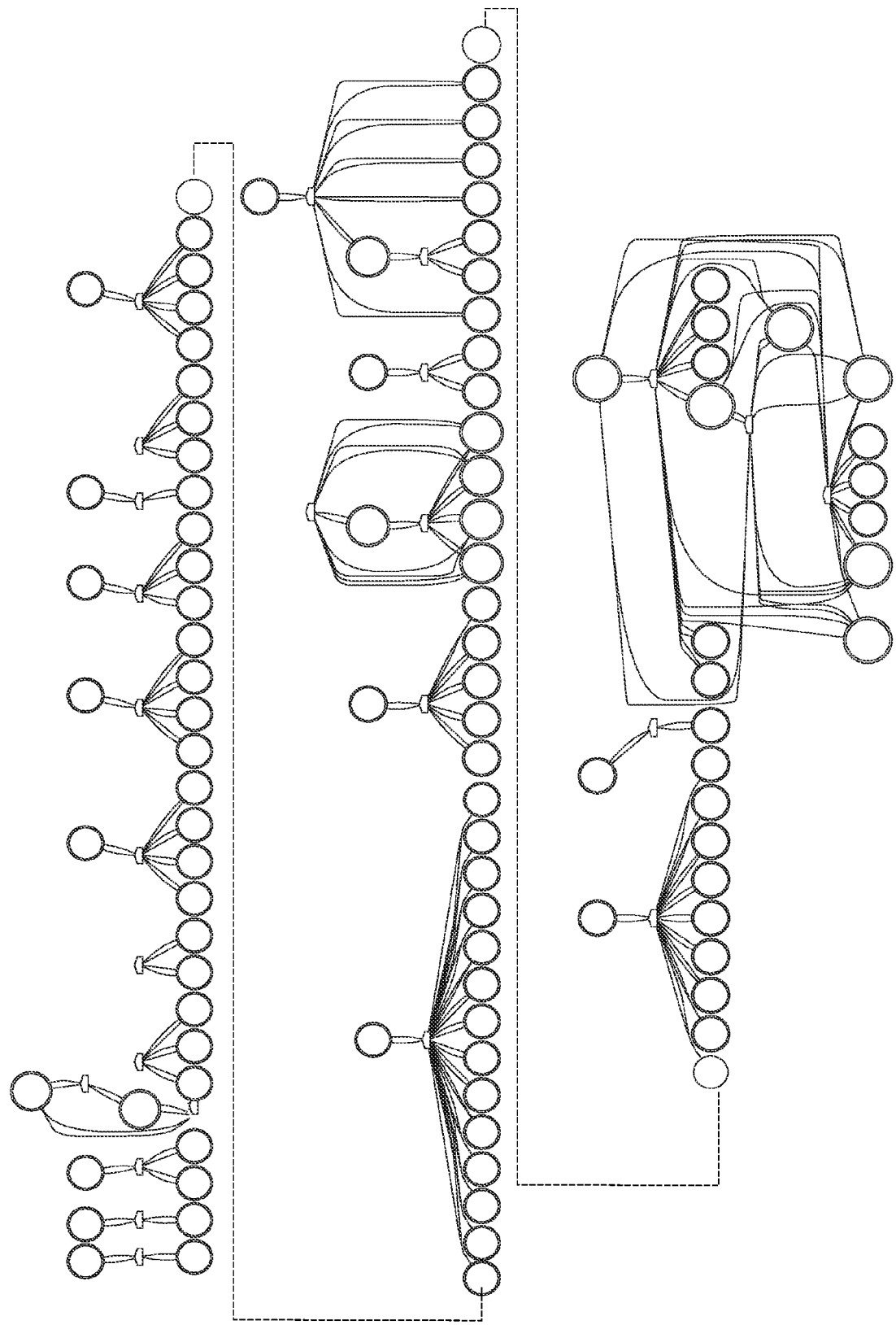

At one degree of separation between the patents of Stanford University and Microsoft (two degrees of separation between the twin Microsoft portfolios) there are 244 interconnections, 127 patents overall, twenty-five patents of Stanford University are found to be relevant or interconnected. A small number of patents were deduced given the massive number of patents searched by the query; these patents represent a potential upside for Stanford University if a blocking patent or other synergistic reference can be discovered. The graph of the results, shown in FIG. 12, note small worlds of patents created by these interconnections or links. As illustrated in FIG. 12, small worlds of the patents of the Stanford University researchers are very highly connected to the end point portfolios. This may be considered a measure of the Stanford University researcher's patent portfolio's value.

It is an object of the present invention to provide an improved systematic and efficient method for analyzing the mutual citation relationship between the patents from a patent database(s) or databases, and provide a graphic or other pictorial of the analyzed results.

EXAMPLE 9

The Exploration of the Relationships Between Two Patent Thickets Traversing One or More Patent(s) Assigned to a Specific Assignee of Interest to an Entity to Discover the Identities of the Inventors Who May be Useful Participants in Future Collaborative Research Activities for Such Assignee or Entity in which the Inventor(s) in Question Possesses Special Interests, Skills, and Experience The comparison of three or more patent portfolios where the analysis involves the discovery of links between two of the patent portfolios subject to the limitation the links must traverse one or more of the patents of a third patent portfolio where such third patent portfolio comprises the patents of one or more inventors, where said inventors have a history of inventing one or more technologies of interest. This analysis is done for the purpose of discovering the identities of said inventors, where in setting up a query the first and third portfolios are identical.

It is important the present invention be recognized for applicability beyond discovering the links or interconnections between patent portfolios and a set of patents. For example, it is desirable to discover people who are skilled in a particular art relating to a given patent portfolio or patent. This is sometimes referred to as an assembly of collaborative resources for innovation. The entity conducting such a search may be initiating or expanding its research and development activities and desirous of obtaining new talent and personnel for said research.

As noted, in the "Future of Tech" section of the Jul. 3, 2006 issue of Business Week Magazine, a profile of a company named Intellectual Ventures ["IntVen"] is described. IntVen was founded by a former Microsoft Corporation Vice-President named Nathan Myhrvold for the purpose of collecting or compiling by invention or acquisition, in simple terms, "innovation" and to secure such innovation whenever possible through patents. The Business Week Magazine article describes how and why Myhrvold often assembles a selected group of experts to work on a specific problem, the experts may work together in a brainstorming or so-called "invention session." The judicious selection of appropriately qualified candidates for invitation to such sessions is a key prerequisite to promoting innovation at the session. The article sheds little light on how to easily obtain a suitably qualified group of participants, the article only notes such groups are somehow 'invited' by Mr. Myhrvold.

In a New Yorker Magazine article, "Annals of Innovation" by Malcolm Gladwell, dated May 12, 2008, once again, there is presented a description of such "invention sessions" conducted by Mr. Myhrvold and the article includes the statement there is a concomitant need for the assembly of a suitable collaborative environment to promote innovation. The New Yorker Magazine article describes various routes to innovation, from the serendipitous to the impliedly deceitful. The central theme of the article is the prerequisite and utility of assembling a qualified group of experts in a single venue for a focused session to invent or innovate. The qualified groups are specially selected by Myhrvold or his staff. No further elaboration on this process is provided in the article.

Employment of the method of the present invention demonstrates a new and useful means of selection of candidates for such invention sessions. The ultimate venue(s) of these invention sessions may be physical or in the virtual world known as the web.

In this Example, Nathan Myhrvold. Myhrvold, founder of Searete LLC the company's apparent purpose is to acquire or develop intellectual property for license to others. Myhrvold recognizes the significant but relatively small patent portfolio of Searete presents some barriers to his vision of controlling certain key technologies.

Myhrvold would like to expand his control over such technologies but he has run into problems locating prospective scientists and engineers who are qualified to participate in one or more invention sessions. The purpose of these invention sessions is to develop the technologies taught in the existing patents of Searete LLC. The Prior Art methods are inefficient and futile in Mr. Myhrvold's opinion.

The present invention is employed to explore the expanse of US Patents related to the current patent portfolio of Searete, LLC ("Searete"). Searete owns or controls nearly 100 patents, which patents encompass 35 principal U.S. Current Classifications. The task is more difficult than the methods the prior art can economically manage such as looking at a citation tree of each of Searete's patents, and then examining each (patent).

The following strategy is employed by the present invention to determine the inventors or researchers Mr. Myhrvold may desire to hire.

A list of the existing issued patents of Searete LLC is created in a patent portfolio. A first approximation of determining a list of patents teaching technologies similar to the technologies taught in the existing patents of Searete LLC. The user of the present invention notes and compiles a list of the first listed US Current Classification from each of the patents (i.e., the "principal class") for each Searete patent. A determination of said technologies finds there are thirty-five such principal classes.

The USPTO (see http://www.uspto.gov/go/classification/) provides a list of all patents classified in any of the aforesaid Searete principal classes (the Searete Prin. Class Patents). The present invention employs the methodology for a query extrapolated from a book titled "*Wisdom of Crowds: Why the Many Are Smarter Than the Few*", wherein it is argued, "A diverse collection of independently-deciding individuals is likely to make certain types of decisions and predictions better than individuals or even experts." The book was published in 2004. ISBN-13:978-0385503860 (http://en.wikipedia.org/wiki/The_Wisdom_of_Crowds).

Therefore, if an invention is at least partially classified by the USPTO, that is, having at least one of its listed classes as being one of the Searete Prin. Classes, there will simultaneously be (a) a more diverse selection of inventions, and inventors discovered, having (b) more than a random selection of the underlying technologies in the Searete Prin. Classes.

Using this analysis methodology, the size of the Searete Prin. Class Patents portfolio comprises nearly 40,000 patents, and totals nearly 60,000 distinct inventors, this is in spite of the fact t the original Searete patents numbered less than 100. The following results provide a patent thicket and an inventor talent pool Mr. Myhrvold, may desire to explore. Mr. Myhrvold even if he wanted to do so, would not be able to screen these potential candidates using the methods and tools of the prior art. The present invention provides an efficient method to make such determinations.

A database is compiled, of three patent portfolios, namely, A first portfolio, Portfolio "A" comprising the Searete LLC patents;

A second portfolio, Portfolio "B" comprising the Prin. Class Patents; and

A "third" portfolio, which is a duplicate of Portfolio "A".

The present invention, utilizes the following queries:

The discovery of all prior art (undirected) with reference links between Portfolio "A" (i.e., the Searete LLC patents) to its duplicate Portfolio "C" (i.e., the Searete LLC patents); and Subject to the limitation, the links must traverse one or more of the patents of Portfolio "B" (i.e., the Prin. Class Patents) for learning the patents, and the associated identities of the inventors in the interconnected or linked patents.

The results of running the above queries provide the information there are only 25 unique patents linked or connected to the Searete patents, and 44 distinct inventors. The word "only" in this context is a good thing, since the objective of this exercise was to focus the search and obtain a manageable number of inventors to contact.

The present invention provides a list of 44 inventors for Mr. Myhrvold to contact, along with corresponding patent numbers, for Myhrvold's further review and determination as to whether such inventors may be appropriate invitees to an invention session. The present invention utilizing the same methodology, supra. would enable a human resources professional, either a so-called head hunter, or an employer's staff member, to discover and aid in the recruitment of high technology talent in an efficient manner.

A slightly broader set of patents for Portfolio "B" can be utilized by selecting them from a set of ALL US Current Classifications of Searete (and not just the Principal Classes).

A further approximation is also available for determining a broader list of patents comprising technologies similar to the technologies of the existing patents of Searete LLC.

EXAMPLE 10

The Exploration of the Relationships Between Two Patent Thickets Traversing One or More Patent(s) Assigned to a Specific Assignee or of Interest to an Entity to Discover the Identities of Inventors Who May be Interested as Participants in One or More Social Network(s) Concerning the Technology in which the Inventor(s) in Question Possesses Special Interests, Skills and/or Experience One of the newer methods of describing and utilizing the interrelationships of entities, whether they are people or organizations is through what is typically called a "social network". In a social network, an entity is related to another entity by similarities in one or more criteria or common traits. For example, people may share similar educational backgrounds, hobbies, friends, professional pursuits, etc.

Most recently, many of these social networks are embodied on websites on the internet. In fact, the website known as "Wikipedia" currently lists many diverse examples of social networking websites (at http://en.wikipedia.org/wiki/List_of_social_networking_websites). Books on the topic of network theory as applied to social networks abound. One example is *Linked: How Everything Is Connected to Everything Else and What It Means* by Albert-Laszlo Barabasi, Professor of Physics at Notre Dame University (ISBN-10: 0452284392).

In the s above referenced book, Barabasi discusses the prior research and work of the late Stanley Milgram, formerly a social psychologist at Harvard University. While at Harvard, Milgram conducted what he called the "small world" experiment. In this experiment, Milgram examined the average path length of connections between entities in a social network composed of people in the Unites States of America. An outgrowth of this experiment, was the conceptual phrase of "six degrees of separation" (although Milgram reportedly may not have ever used that phrase himself, or at least not initially) whereby it was hypothesized that any two given people in the world at large, the world's population itself, constituting a social network, are separated by no more than five other people. Thus if, in a given set of people, Joe knows Bob, and Bob knows Sue, and Sue knows Peter, then Joe is said to be "three degrees" away from Peter.

In a simplified description, Milgram's experiment (which involved the sending and receiving of postal mail communications to and amongst randomly selected people in certain US cities) concluded the average path length between such random people in the experiment was 5.5 (or approximately, six) and thus, in subsequent descriptions of the work, it came to be stated that no two people are separated by more than 'six degrees' from each other.

Returning to the discussion of social networks, one apparently successful social networking site for business professionals is LinkedIn® located at http://www.linkedin.com. LinkedIn Corporation claims to have more than 30 million members in its social network. LinkedIn promotes itself by asserting among other things on its home page that, by becoming a member, one can "find people and knowledge you need to achieve your goals". Thus, the social network presents itself as a means for any given member to efficiently mine and utilize for various and sundry business purposes, the personal and professional data presented by 30 million other members. The present invention provides the same benefit. The present invention results in the efficient exploration of vast "data forests" comprising so-called patent thickets, and efficient exploration of said data to determine the interconnections or links as a cornerstone benefit of the present invention.

Valdis Krebs, the Founder, and Chief Scientist of orgnet. com, and a management consultant states on his website at http://www.orgnet.com/about.html that his company Orgnet. com provides social network analysis software & services for organizations, communities, and their consultants.

In an internet downloadable audio interview, a so-called "podcast", which was distributed by a company called IT Conversations at the URL of http://itc.conversationsnetwork.org/shows/detail3559.htm, Krebs speaks at length about the shortcomings of many of the current online social networks such as LinkedIn.

Among the shortcomings of LinkedIn as identified by Krebs is that the entity (person or organization) wishing to join LinkedIn has to expend significant effort to prepare, and just as importantly, to keep current, its online profile containing its various criteria necessary to link it to other entities in the network. This can be an especially difficult and costly undertaking for entities that have complex backgrounds, skills and objectives.

It is common practice on social networking sites to request access to a newcomer's network by requesting access to the newcomer's private email contact list(s) and matching those private email contacts to the email addresses in the site's database. Krebs also discusses the shortcomings of LinkedIn in terms of privacy. Krebs notes in order to explore and extract or "mine" the data of the social network, one needs to expose oneself to the targets of the data mining which exposure may be problematic for the newcomer should the newcomer ultimately decide not to join the network. To explain this point, Krebs discusses what is sometimes called the "creep factor" (as in 'creepy', i.e., disturbing) that is the case where a person may not ab-initio desire to explicitly become a member of a social network and thereby become harassed by strangers who are wanting to add that person to their respective network for the purposes of mining that newcomer's data, prior to the newcomer fully exploring the environment of the network and its constituents. Privacy is an especially important consideration for companies or groups, which may wish to exploit the benefits of social networking while not sacrificing the privacy in the valuable existing knowledge and contacts they already possess. The contacts a company possesses may have value not only as to how much it cost to obtain them, but also because exposing the contact list to others in a non-confidential environment may in turn expose related confidential information. For example, if one knows company X, a maker of widgets, has a list of 50 nanotechnology experts in its contact list, the natural and likely valid inference is Company X is in the process of developing nanotechnology products, a fact that may not be theretofore publicly known. The uncontrolled divulgence of contact lists can pose harm to the disclosing party.

The present invention avoids the aforementioned drawbacks of social networks by allowing the user to be self-organizing, private, and therefore secure from harassment.

For example, the present invention allows the user to be self-organizing insofar as all inventors, assignees, law firms and other data appurtenant to a given patent or application are known.

A newcomer to the network created by the present invention can review and pick their prospective "friends" or "associates" without exposing their private information to those they do not want to know.

The present invention can identify where in the social network of inventions, the newcomer's skills and interests reside, as an intermediary of all other inventions of the network participants Example 10 of a Social Network, as shown below for one degree of separation. See FIG. 31 for two (2) degrees of separation illustration of Example 10. Searete LLC the holder of approximately 150 patents desires to establish a social network of members involved in nanotechnology, having some relationship by prior art reference to any of Searete's patents. Searete desires to discover these members with minimal effort and no public exposure of Searete's confidential contact list. The present invention may be employed to accomplish this quickly and efficiently.

First, a Portfolio 'A' of Searete's patents is compiled. Next, a Portfolio 'B' of all patents is compiled. Then a query is formulated to discover all patents in Portfolio 'B' that reference any patent in Portfolio 'A' at one degree of separation. This analysis results in a set of 40 patents. Unfortunately, 26 of these are patents of Searete referencing its other patents. However, of the 40 patents, 14 are patents related to nanotechnology of others and therefore candidates for further review for invitation to the new social network. See FIGS. 33-A, 33-B, 33-C, and 33-D.

In the event, the particulars of the patents discovered does not meet the requirements of Searete, a second case can be run using the same methodology and data. The query is run at 2 degrees of separation. The query is to include members involved in nanotechnology having some relationship by prior art reference to any of Searete's patents.

The results of this analysis is a set of 688 patents (this includes the 1 degree of separation subset of 40 patents). Again, many of these are the patents of Searete referencing its other patents. However, of the 688 (including the newest 648) patents, many more are the patents of others and therefore candidates for further review for invitation to the new social network.

Using the present invention minimal effort has been expended by Searete in the compilation of the list of candidates and at no time was the confidential information of Searete exposed. Searete can further pre-screen and evaluate the prospective members without notifying them of its search efforts, unless Searete desires to do so.

The benefits of the present invention as applied to social networks will become further apparent upon review of the following example.

In this example, Microsoft is exploring the feasibility of a new business venture, involving the establishment of its own social networking site for inventors, technology companies, patent investment companies, and venture capital ("VC") investors. Microsoft market research studies have indicated to Microsoft that the primary issues and impediments to such sites include the following:

How to attract enough participants to seed the network in a timely manner and at an acceptable cost. Microsoft knows "to the swift belong the spoils" as the cliché goes. Thus, the social network needs to "self-organize" and at a rapid pace (e.g., see http://en.wikipedia.org/wiki/Self-organization).

To address the privacy concerns of a VC (which VC may have an expressed interest in the social networking concept since VC's are always looking for a means to make timely pre-investment searches for synergistic investments with the VC's present clients or to expand their investment portfolios into new areas), Microsoft does not want the VC's identity exposed to investees (individual inventors or companies) or prospective competitors (other VC's) before such time Microsoft is ready to make their approach to an acquisition target. Moreover, VC's have advised Microsoft that exposing their contacts to competitors can be 'suicidal' from a competitive point of view. Thus, the newcomer VC should not have to expose its private email or other contact list details to the site just to become a member. Microsoft knows from its own experience in recruiting new staff and in expansion and acquisition explorations it is not a trivial task to systematically look for either inventors or companies with inventions that are compatible with and, even better, accretive to, Microsoft's massive existing patent portfolio. To ease the uncertainty of a newcomer to the social network, it is desirable the newcomer, VC, is not required to seek out others that may have compatible interests, but rather have a system in place to discover and propose such prospects to the newcomer VC in a systematic and efficient manner for review by the newcomer.

Patent investment (or invention session) companies such as Intellectual Ventures ("IV"), have expressed concerns that the use of a public social networking site for acquisitions of desirable technology or the recruitment of skilled professionals in symbiotic technologies, cannot only prematurely expose their strategic motives but also invites unqualified applicants. IV, for example, has been searching for such alternatives, and has not found an alternative network, and therefore joined the public site ILinkedIn.com finding no other viable choices (e.g., see IV Linked-In page at http://www.linkedin.com/companies/intellectual-ventures). Ideally, the patent investment or invention session companies desire to operate at times in a "stealth" mode. These companies prefer to do their prospecting in relative privacy, and only expose their interest in a prospective company or individual at a time of their choosing.

EXAMPLE 11

The Exploration of the Relationships Between Two Patent Thickets Traversing Patent(s) Assigned to One or More Specific Assignee(s) to Determine if any of Such Assignee(s) or the Specific Patents of Such Assignee(s) May Comprise a Prospective Acquisition Target This example explores the use of the methods of the present invention in the analysis by one entity of the intellectual property consequences of the prospective corporate takeover of a second entity by yet a third entity.

Our analyst has been now been retained by Oracle International Corporation, a developer and licensor of database software products, owning more than one thousand US patents.

Oracle management has learned through the public media that International Business Machines Corporation ["IBM"] is attempting to acquire the corporate assets of Sun Microcomputers Inc. ["SUN"] for over seven billion dollars.

Oracle management is caught off-guard by the announcement and is concerned with the consequences of such acquisition and in particular, the combination of the SUN portfolio of thousands of US patents, together with the IBM portfolio of tens of thousands of US patents, to impair, dilute or defeat the strength of the Oracle patent portfolio. Oracle, knowing that the three entities, SUN, IBM and itself each holding many thousands of patents, constitute a patent thicket, in fact three patent thickets, making the exploration of such patent domains impractical if not impossible using the tools and methods of the prior art, at least within the time frame demanded by the present situation. Thus, Oracle has retained the analyst to explore situation and to evaluate the potential risks in a systematic and timely manner.

The analyst employing the method of the present invention visits the USPTO website and determines the problem can be organized as follows:
Portfolio "A" of IBM>50,000 patents
Portfolio "B" of SUN>7,000 patents
Portfolio "C" of Oracle>1,000 patents Next the analyst uses the same hardware, software and methodology as in the above examples to determine which of the patents residing in Portfolio "A" (IBM) refer (as reported on the face of the patents in question) to which patents residing in Portfolio "C" (Oracle) such that the path of the references must traverse one of the patents residing in Portfolio "B" (SUN).

The analyst determines in a matter of a couple of minutes that more than 5,700 connections occur between "A" (IBM) and "C" (ORACLE) through "B" (SUN), comprising approximately 3,400 patents, of which 520 patents which are assigned to SUN lie on the path between the patents assigned to IBM and Oracle (thus, two degrees of separation from IBM to Oracle). Even though a graphical representation of these results is obtained, given the number of intermediary patents and the overall size of the thicket, the analyst decides to present the results in other than a graphical format that is to first obtain and compile (hard copy or image) for review the front page of each of the 520 patents. This is easy since the analyst knows that these images are available from private companies such as Thompson & Thompson as well as at the USPTO website for review, downloading or printing. Although 520 patents is a formidable number it was far fewer than the number of patents in any of the individual Portfolios "A", "B" or "C", and thus a manageable number of patents to have the Oracle patent department and outside counsel review.

At any rate, the significant number of such intermediary patents demonstrates to the analyst and to its principal, Oracle, how intertwined the portfolios of the three companies are. Given the multi-billion dollar transaction contemplated, the man-hours to review each in detail is justified to see if Oracle would be wise to propose its own counteroffer for SUN.

Should this review result in the identification of one or more key patents of SUN or Oracle (or identification of one or more key US Current Classifications), the method can be repeated with a new more focused set of data, Portfolio B-1 (SUN) and/or C-1 (ORACLE), comprising those patents as intermediaries or end points, respectively, in which case the results in graphical form may be more meaningful.

The analyst also recognizes that the same methodology would prove highly useful to the United States Department of Justice and the applicable department(s) of the European Union in ascertaining and determining the impact on an acquisition of SUN by IBM, Oracle or others.

EXAMPLE 12

The Batch-Wise and Real-Time Exploration of the Relationships Between Two Patent Thickets Traversing a Known Set of Issued or Pending Patent(s), Such as the Known Set of Issued or Pending Patent(s) Contained in an Information Disclosure Statement and/or Patent Search Report, and Relating to a Patent Undergoing Prosecution by a Patent Examiner to Aid and Assist the Examiner in Identifying and Reviewing Relevant Patent Prior Art Even though our analyst is not employed by the USPTO, the analyst has discovered a way that the method of the present invention could be used by the USPTO to assist the examiners there in the discovery of relevant prior art. Since the examiners are (in other than the re-examination or re-issue proceedings) dealing with other than an issued patent, the use of the present invention in such context is slightly different from the methods otherwise described in the foregoing examples.

As is well known, unless and until a patent application issues as a patent, there is no final determination of prior art references and by definition there are no formal forward citations, since the forward citations require the prior art to be published. Therefore, the tools and methods of the prior art citation tree analysis are not useful to the examiner or at least not as useful as the methods of the present invention. Thus, the method that the USPTO uses relies on the Information Disclosure Sheet of the applicant (IDS), if any, as well as on the services and expertise of the USPTO in-house search professionals to discover prior art typically using classification and keyword search criteria. The result of each case is a list of potentially relevant patents, which all need to be reviewed in detail by the examiner. In such case, many person-hours are expended compiling the in-house search.

Often the results of such methods of the prior art are less than satisfactory (as evidenced by the explosion in the number of patent disputes, reexamination and reissue proceedings in recent years) and as such there is a need for a new method that will draw upon the information discovered by the prior art method and utilize it as a means to employ the methods of the present invention as an means to improve upon the methods of the prior art in a systematic and cost-effective manner.

The analyst knows that it can synthesize a first approximation of a prior art citation list of a given application by assembling:

All of the references contained in the IDS; and
Either all of the references of the USPTO search report; or
All of the references of the search report that the examiner deems relevant.

Once the cited cases are discovered, the Examiner can compile either of two sets of patents based thereupon, namely:

"Classmates" (see definition in examples, infra.) of all patents in the first approximation of a prior art citation
A list of all of patents using any of the keywords that the examiner deems relevant from the review of the USPTO in-house search report.

Once the above cases are assembled, the analyst can quickly employ the method of the present invention as follows:

Case I
Portfolio "A"—All of the Classmates of the approximated citation list
Portfolio "B"—A Pseudo Patent ('pseudo' in the sense that it is a patent application—transformed—into a patent by the addition of a synthesized list of references) having all of the patents in the approximated citation list as its cited prior art.
Portfolio "C"—All of the Classmates of the approximated citation list
Case II
Portfolio "A-1"—All of the patents using any of the keywords that the examiner deems relevant
Portfolio "B"—A Pseudo Patent having all of the patents in the approximated citation list as cited prior art.
Portfolio "C-1"—All of the patents using any of the keywords that the examiner deems relevant

EXAMPLE 13

The Batch-Wise and Real-Time Exploration of the Relationships Between Two Patent Thickets Traversing a Known Set of Issued or Pending Patent(s), Such as the Known Set of Issued or Pending Patent(s) Contained in an Information Disclosure Statement and/or Patent Search Report and/or from Some Other Contributed Source, and Relating to a Patent Undergoing Review by an Online Community of Paid or Volunteer Reviewers, Such as Members of a Patent Review Community Commonly Referred to a "Peer-to-Patent", to Aid and Assist the Reviewers in Identifying and Reviewing Relevant Patent Prior Art Recently an initiative has been launched by the USPTO in collaboration with the New York University Law School in the so-called "Peer to Patent Project" to attempt to expedite the review and prosecution of patent applications. The details of the project can be found at http://dotank.nyls.edu/communitypatent/about.html ("Peer2Patent"). In brief, the project solicits prior art references from the supposedly specially qualified members of the public to aid the USPTO in its review of the given set of pending applications. The participants are given the application and any available IDS to aid them in their review. As a participant finds art that they deem relevant, that art is published to the Peer2Patent website and made available to all subsequent search activities and participants. In this way, it is felt that the collective input from the public at large, (thus the so-called "wisdom of the crowds") will aid the examiner at the USPTO in the search for prior art.

The Peer2Patent project has its shortcomings insofar as it relies on the benevolence of unpaid and unproven members of the public to donate their time to the search and review activities. The method is still largely un-automated other than for accumulating allegedly relevant prior art from the participants.

As in the case of the foregoing example in connection with the USPTO patent examiner, the participants in the Peer2Patent project are relying on their ability to use whatever lists of prior art that are made available to them (i.e., in the case of the USPTO, from the IDS and the in-house searcher; and in the case of the Peer2Patent participants, the prior art seeded by the Peer2Patent project which sometimes includes an IDS as well as all subsequent Peer2Patent participants' suggested additions thereto.

Thus, in sum, the Peer2Patent is merely a means to draw upon the labor of a larger set of patent searchers and the supposed benefit to the USPTO is that they are doing the searching at no cost to the USPTO.

Since determining the real benefit to the USPTO is more complex than just counting the added information that is supplied to it by the labor cost free Peer2Patent participants, the USPTO desires to automate the review of information supplied to it by the Peer2Patent project in the same manner that the information supplied to it in-house is reviews by the analyst employed by the USPTO in the prior example.

In this case, however, the method of the present invention is especially helpful since the systematic and automated method is especially prone to integration into the Peer2Patent project as a feedback procedure. For example, in the prior art Peer2Patent methodology the following steps occur:

A new case is posted by Peer2Patent for assistance, with whatever proposed prior art that Peer2Patent has knowledge of, e.g., from the USPTO IDS;

The Peer2Patent participants respond by posting their proposed prior art citations to the Peer2Patent website for other Peer2Patent to examine; and The Peer2Patent cycle repeats.

The analyst proposes a new Peer2Patent enhanced embodiment based upon the methods of the present invention. Specifically, as soon as a case is posted at the Peer2Patent website and then as each new piece of prior art is received, a Peer2Patent participant suggests art, the method of the present invention may be executed and the results thereof may be supplied in near real-time to all Peer2Patent participants for review. The vast number of Peer2Patent participants in the review process is leveraged in the review of such results. Thus, the steps of the preferred new embodiment are as follows:

A new case is posted by Peer2Patent for assistance, with whatever proposed prior art that Peer2Patent has knowledge of, e.g., from the USPTO IDS;

The Peer2Patent participants respond by posting their proposed prior art citations to the Peer2Patent website for other Peer2Patent to examine;

Along with the new case, the website also publishes at the same time, in graphic and tabular formats, the results of the following analysis Case I Portfolio "A"—All of the Classmates of the approximated citation list based upon the original Peer2Patent proposed prior art as updated by the Peer2Patent participants' most recent analysis.

Portfolio "B"—A Pseudo Patent having all of the patents in the approximated citation list as it's cited prior art references.

Portfolio "C"—Comprising the same patents contained in Portfolio "A"; and/or Case II Portfolio "A-1"—All of the patents using any of the keywords that the Peer2Patent participants deem relevant Portfolio "B"—A Pseudo Patent having all of the patents in the approximated citation list as it's cited prior art.

Portfolio "C-1"—Comprising the same patents contained in Portfolio "A-1" The Enhanced Peer2Patent cycle repeats.

As the analyst explains to the USPTO, the improved system can be made to execute the method of the present invention automatically as soon as new prior art is posted for the case in question on the Peer2Patent website, depending upon computer resources available to the Peer2Patent website operators. The advantage to the USPTO of this enhanced Peer2Patent system is that along with the leveraging of the Peer2Patent participants' labor in the review of the initial and updated manual prior art citation postings, the Peer2Patent participants will also be improved by giving them the perspective of the context of the patent application (i.e., as it is transformed continually into the most current version of the pseudo patent) in question vis-à-vis the relationship thereof to all other patents having similar features or nomenclature.

EXAMPLE 14

The Exploration of the Relationships Between Two Patent Thickets Traversing a Third Set of Patent(s) Owned or Controlled by a Specific Entity, which Entity is Intending to Offer Such of its Patents for Sale to Discover Prospective Buyers Thereof and/or to Assess Potential Value of the Patent of Interest for Furnishing to the Prospective Buyers of the Patent in the Course of Such Offering Often a patent holder will decide for any number of reasons that it is time to try to divest itself of one or more of its patents. Various venues for such sales exist, such as auction sales.

Figure 13:
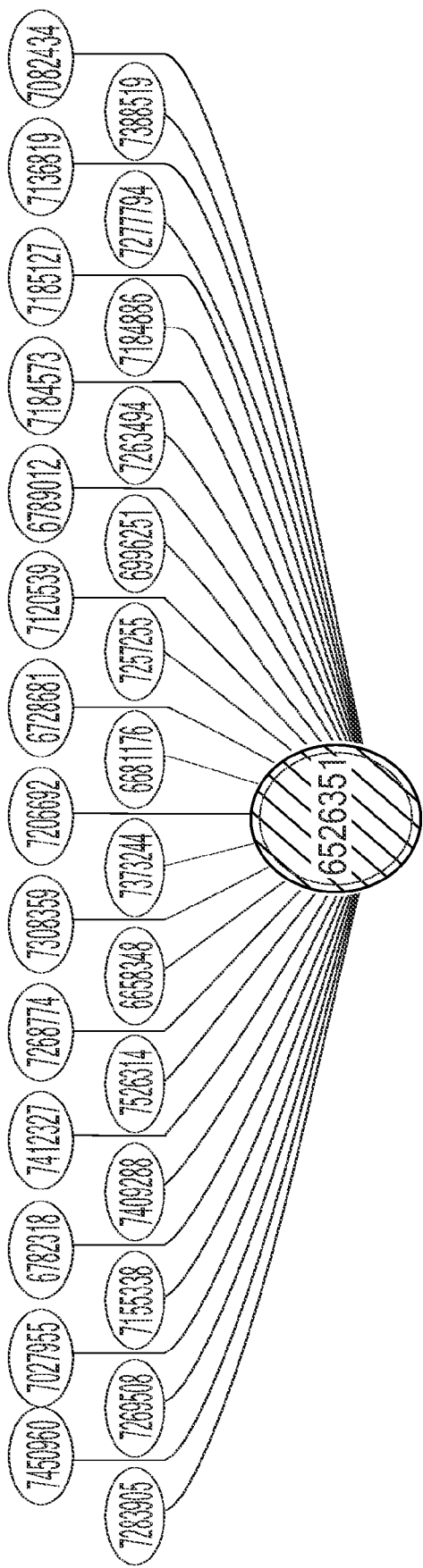

One such popular auction venue is operated under the name OCEAN TOMO (see http://www.oceantomo.com). The common operational mechanism employed by such venues is typically to obtain prospective bidders to the sale by invitation often with a substantial attendance fee and usually to publish in advance of such sales, a catalog of the various "lots" or patents for sale. Sometimes a given lot will comprise more than one patent under common ownership and typically somehow involving related technologies. An example of a page from an Ocean Tomo auction catalogue is shown in FIG. 13.A Ocean Tomo uses a common method of implying value to the offered patent lot by the posting of a "Sample Forward Citation Analysis" in such lot catalog. As has been explained, supra. this method involves obtaining a list of subsequent patents that list the patent in the lot as prior art. An example of the forward citations relating to the above referenced page from the Ocean Tomo action catalogue as referred to in FIG. 13A is shown in FIG. 13.

Ocean Tomo presumes these forward citations as an indication of value in the patents offered for sale insofar as the latter patents discovered are deemed evidence to Ocean Tomo of continued developmental or commercial interest in the technology in question and the citation link is evidence of relevancy.

In this example, our analyst has been retained by the operators of the Ocean Tomo auction house because Ocean Tomo has discovered to its dismay that despite having upwards of one hundred patent lots at a given auction, there are typically only a small number of these lots that result in actual auction sales and those that do sell thereby do not result in the revenue that the Ocean Tomo would have obtained if a sale had occurred. Thus Ocean Tomo would like to see if the analyst can discover more relevant art so as to (1) increase consummated sales which in turn would add to Ocean Tomo's profitability and (2) discover new patent bidders for participation in its events.

The analyst believes that one likely reason for the small "sales to offering ratio" is that Ocean Tomo's method of using the prior art Sample Forward Citation Analysis method is deficient in at least two respects. First, it does not identify all of the potential buyers for a given patent lot and second, it does not identify to the invited bidders the full context in which the offered patent lot resides. Together these deficiencies combine to make the offering less attractive to the universe of prospective bidders, some of which may not have ever been invited to the sale since Ocean Tomo had no knowledge of their potential interest in the patents being offered.

Thus the analyst decides to employ the new method of the present invention to provide a more rational, systematic and useful means of (1) developing a prospective bidders list and (2) demonstrating the context of the patents being offered for sale relative to the technology either of interest to or having to do with the patents owned by the prospective bidders, all in all thereby assisting those bidders to ascertain a prospective value of the offered patent lot, which new method is more fully explained below.

It is well known that appearing on each U.S. patent application when published and each patent when issued, is one or more technology classifications of the USPTO to which the patent in question is assigned (the coverage of such assignments may be adjusted periodically thereafter as the classification definitions change, i.e., the "current classification" of the patent in question is the then current assignment). These classification assignments comprise at least one so-called 'principal classification and sometimes one or more additional other classifications. Classifications are meant to organize the patents by features of the inventions therein disclosed.

These initial classifications appear on the face of the patent in question and whether later changed or not, at any time the then current "current classification" may be obtained from the USPTO website for the patent in question.

It is therefore possible to obtain and compile these classification data from the respective location for any given patent. The analyst assigns a nomenclature to assist in this analysis as follows:

"Classmates" (of the original patent under study, that is the patent offered for sale)—The set of patents that is assigned to a classification that is the same as the principal classification of the original patent under study. Note that the principal classification of the Classmate in question may or may not be the same as the principal classification of the original patent under study; and "Schoolmates" (of the original patent under study, that is the patent offered for sale)—The set of patents that is assigned to a classification that is the same as any of the classifications of the original patent under study.

The analyst believes that it is more logical when exploring for potential acquirers of a given patent to first look for patent holders possessing patents having similar features (e.g., sharing one or more classifications) and in addition to discover those of such set which have one or more referential relationships (in this case by and undirected citation path) to the patent being offered for sale, rather than just looking at patents that happen to reference the patent without regard to classification.

Moreover, the analyst believes that it is important to examine the CONTEXT of all such patents, that is, to discover those cases in which the patent under study (i.e., which is being offered for sale) is juxtaposed as an intermediary patent in a map of the other patents of the set in question (i.e., the patents of the prospective acquiring entity) irrespective of the direction of the time path between any two nodes (patents) in the graph, since if the patent under study is so positioned relative to the patents of the prospective acquiring entity, it is more likely that it will be more valuable to the prospective acquiring entity.

Furthermore, the number of interconnections traversing the patent under study is an indication of the value of the patent that is, the more links that traverse the patent under study from the patents of others, the more valuable the patent under study may be, since it is more centralized in the small world of patents discovered. This is in contrast to Ocean Tomo's undue reliance on forward citation analysis, which merely examines the number of latter-issued patents that cite the patent in question as prior, art, in chronological order; hence, Ocean Tomo's is a directed analysis. On the contrary, the analyst explores patents that involve the patent in question irrespective of directionality, that is, the links between the patent in question and other references need not be via a continuous direction, but rather that links may or may not vary between latter and earlier dated patents so long as the chain of links is unbroken. Thus is the patent for sale is X, it may be linked to patents A, B, C, & D; and although patents A & C may be newer than X, B & D may be older patents which do not cite X directly but do cite A and/or C, which in turn cite X directly. Thus the 'network' of patents in which X resides includes 4 patent, two of which would not be found in the two patent network discovered by the prior art forward citation method heretofore employed by Ocean Tomo.

Once the analyst discovers this set of the patents of the prospective acquiring entity, these data may be used to (1) contact the prospective acquiring entities for invitation to the auction and (2) present to any and all attendees via the auction catalogue the data set as further evidence of the claimed value of the patent lot in question.

In either case should a greater number of such relevant patents be discovered as compared to the prior art method of Sample Forward Citation Analysis there is a benefit to the analyst's client, Ocean Tomo in the promotion and conduct of its auction and prospective revenues it will derive.

Accordingly, using this nomenclature and rationale, in the context of the present invention, the analyst is able to perform an analysis organized in two cases as follows:

Case I. The objective is to select a set of patents that share similar features of U.S. Pat. No. 6,526,351 (the '351 patent) and are linked through a closer relationship (in this case, via an undirected one degree of separation prior art citation) to the '351 patent, by only examining relationships to its Schoolmates:

Create a Portfolio "A" which is comprises the Classmates of the '351 patent
Create a Portfolio "B" which consists of the '351 patent
Create a Portfolio "C" which is identical to Portfolio "A"
Case II—The objective is to select a set of patents that share similar features of the '351 patent and are linked through a broader relationship (in this case, via an undirected one degree of separation prior art citation) to the '351 patent, by examining relationships to its Schoolmates.

However, the analyst believes that Case II, which exploration implicitly includes the study of Class I Classmates, and is therefore likely to discover more patents and/or assignees, may nonetheless suffer in maintaining technological relevancy, due to the fact that the broader selection of classes studied (i.e., including classes other than the principal class of the patent under study):
Create a Portfolio "A" which is comprises the Schoolmates of the '351 patent
Create a Portfolio "B" which consists of the '351 patent
Create a Portfolio "C" which is identical to Portfolio "A"

Figure 14:
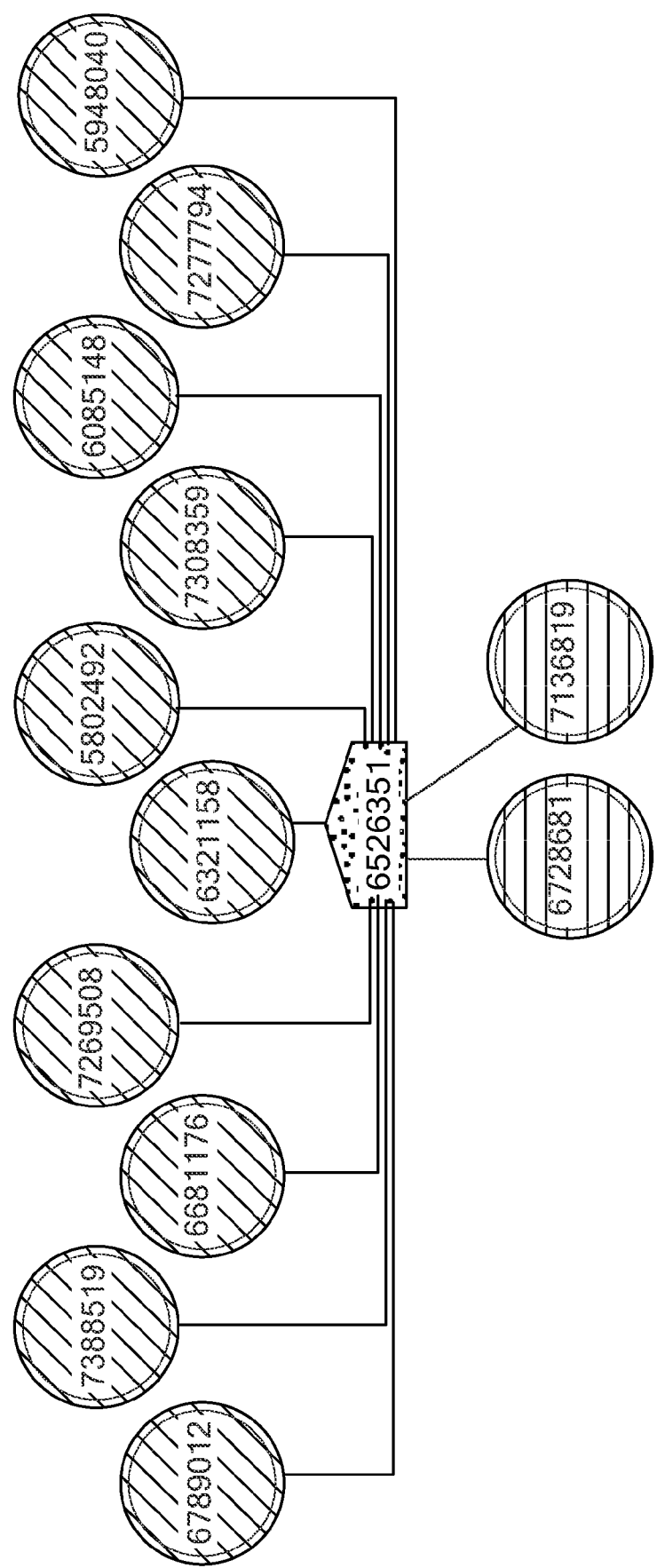
Figure 15:
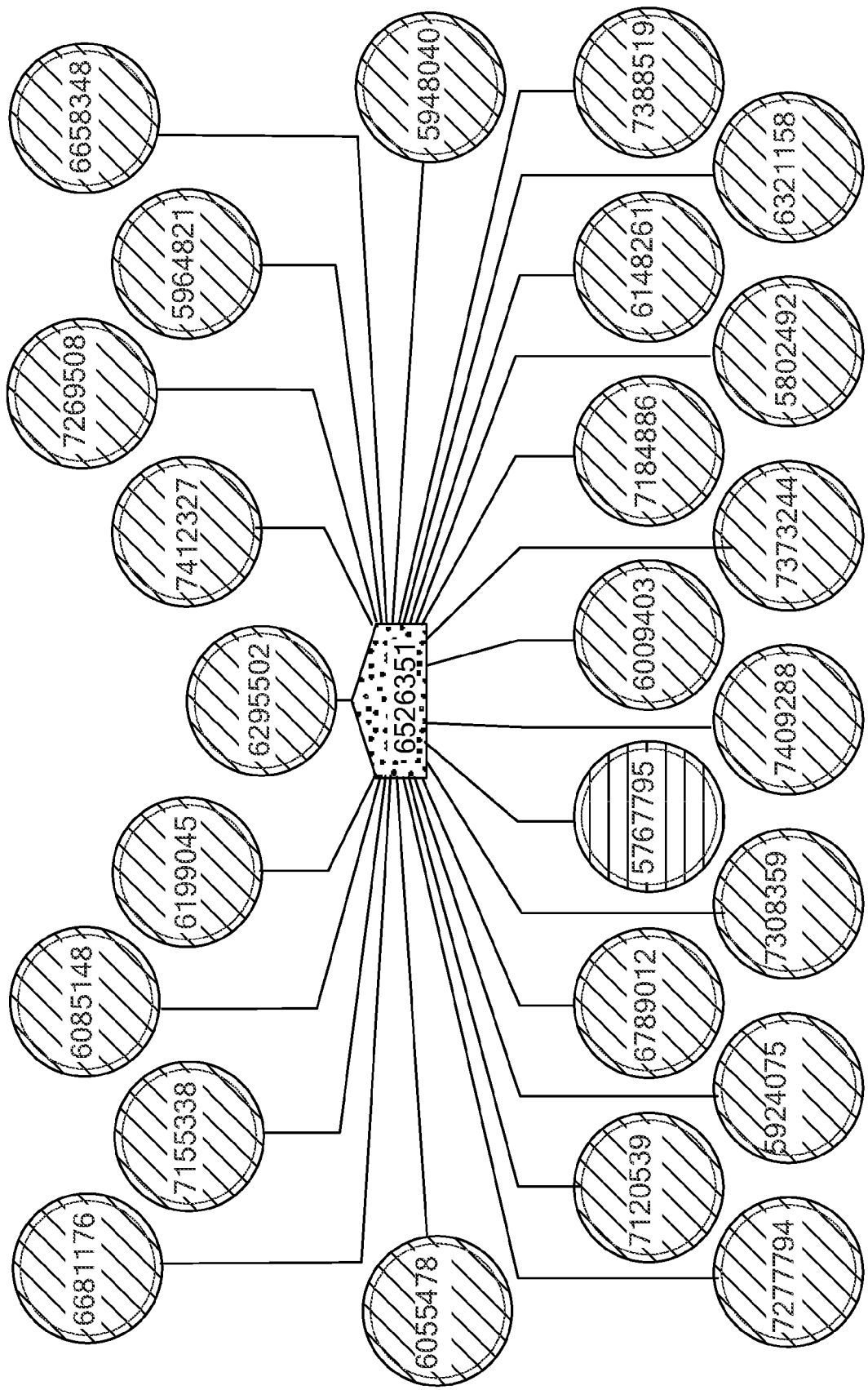

In any event, the analyst is confident that since the prior art method of Forward Citation Analysis being used by Ocean Tomo ignores classification entirely, that either of the two Cases I or II as presented here will produce more highly relevant results Now, performing an analysis using the method of the present invention, in each of the above Cases I and II, to locate all patents from the respective Portfolios "A" and "C" which traverse the respective Portfolio "B", yields two sets of patents, shown graphically as FIGS. 14 and 15, respectively. The analysts goal here is to obtain a larger number of patents and/or assignees thereof, who may therefore have an interest in the acquisition of the '351 patent. It should be mentioned that if data is available to the auction house as to the prices paid (and dates sold) for past patent acquisition, then such data, preferably adjusted to a common basis taking into account inflation, may be correlated or overlaid onto the respective plots to inform the sellers and buyers of the relative prices for each patent so presented in the figure.

Comparing the results of the above Cases II, and II, we have the following results

|  | Case I Classmates Method | | Case II Schoolmates Method | |
| --- | --- | --- | --- | --- |
| Degrees of Separation (distance) from the '351 Patent to the Discovered Patent(s) | 1 | 2 | 1 | 2 |
| Number of Unique Patents Found | 13 | 233 | 26 | 641 |
| Number of Unique Patents Found which would not be have been discoverable using Forward Citation Analysis | 4 | 123 | 12 | 313 |

'351 Students vs. '351 Students via 6,526,351 - Assume forward cites are valid but not good enough measure of value

EXAMPLE 15

The Exploration of the Relationships Between Two Patent Thickets Traversing a Third Set of Patent(s) Owned or Controlled by a Specific Entity which Entity is Intending to Offer Such of its Patents for Sale to Discover Prospective Buyers Thereof and/or to Assess Potential Patent of Interest to the Patent Seller for Furnishing to the Prospective Sellers of the Patent in the Course of Such Offering Finally in the context of the Ocean Tomo auction sale, the analyst proposes either (i) as an initial bidder prospecting tool or (ii) as an additional so-called "up-sell" product to be offered by Ocean Tomo to its prospective sellers and/or bidders is to process their subset of patents (either patents they own, control or otherwise expect to obtain) through the method of the present invention such that the relationships between that subset to each of the patents to be offered for sale in the auction in question. The analyst proposes such a method would discover latent relationships the prospective bidder would not have otherwise discovered.

For a demonstration of this embodiment to Ocean Tomo, the analyst proposes that Ocean Tomo may have been wise to invite Google to its auction for the '351 patent (Note that GOOGLE was not listed in the Ocean Tomo catalogue under the Sample Forward Citation Analysis section so the analyst reasonably considers that the GOOGLE was not considered by Ocean Tomo to be a serious bidder prospect). The analyst selected Google as a candidate at random, based solely upon common public knowledge that Google has some websites devoted to mapping technology (see, http://maps.google.com/maps). The analyst's conclusion, that GOOGLE INC may indeed have wanted to bid on the '351 patent if it were (1) made aware of the sale and (2) given some reasonable justification of the reason why it should want to bid on the '351 patent, is best illustrated by a simple application of the method of the present invention as follows:
Create a Portfolio "A", which comprises the patents assigned to GOOGLE INC.
Create a Portfolio "B" which consists of the '351 patent
Create a Portfolio "C" which is identical to Portfolio "A"

Figure 16:
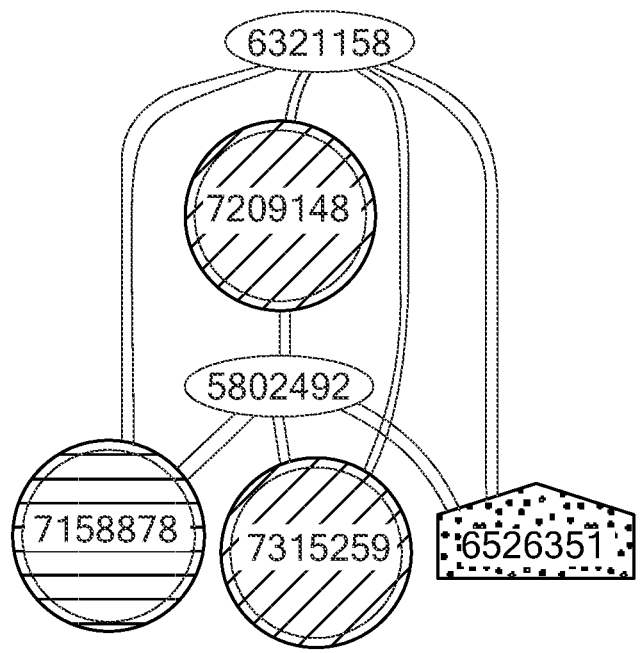

The results of this analysis which surprise Ocean Tomo, shows that at four degrees of separation between Portfolios "A" and "C" subject to the constraint that the path between them traverse Portfolio "B" (i.e., the '351 patent), show that three patents assigned to Google are present in the network of patents which network consists of the '351 patent, the three Google patents along with two patents assigned to Delorme Inc., which was in fact listed in the Sample Forward Citation Analysis as a prospective relevant technology and likely intended invitee to bid. The actual results are shown in FIG. 16.

The analyst points out to Ocean Tomo that this brief analysis using the method of the present invention accomplishes two distinct beneficial results, namely, (1) it has identified Google as a theretofore uninvited prospective bidder and perhaps just as importantly, (2) If Ocean Tomo entices Google to the auction and/or demonstrates to all prospective bidders the relationships identified in the study, that not only the sale may be more likely to consummate but also that the purchase price obtained therein may be higher that would otherwise be the case, each of circumstance would benefit Ocean Tomo.

EXAMPLE 16

The Batch-Wise or Real-Time Exploration of the Relationships of One or More Patent Thickets which Traverse a Set of One or More Patents in Connection with the Reissue, Re-Examination and/or Litigation of Such One or More Patents Microsoft Corporation has retained the services of a patent analyst to assist it in discovering relevant patent prior art. The prior art to be discovered is in connection with Microsoft's defense in a patent infringement lawsuit being brought by certain owners of U.S. Pat. No. 5,787,449. Some commentators refer to the plaintiff in such a case as a so-called "patent troll" insofar as the plaintiff does not itself apparently practice the invention (otherwise sometimes commonly referred to as a "non-practicing entity") of the '449 patent but only obtains revenue there from by licensing its rights to such patent to others. Microsoft expects that the damage award in the lawsuit could approach hundreds of millions of dollars, so Microsoft is quite keen on discovering relevant prior art both before and during the trial.

Our analyst believes that the method of the present invention provides a means to discover prior art in a systematic and efficient manner using the search for patent relationships in which the '449 patent is an intermediary and in which the features of the related inventions are similar would assist Microsoft in this matter. 5 To do this, the analyst constructs three patent portfolios as follows:

Portfolio "A" which is comprises the "Classmates" of the '449 patent comprising in excess of 450 patents (i.e., U S Class 715/203)

Portfolio "B" which consists of the '449 patent

Portfolio "c" which is identical to Portfolio "A"

Figure 17C:
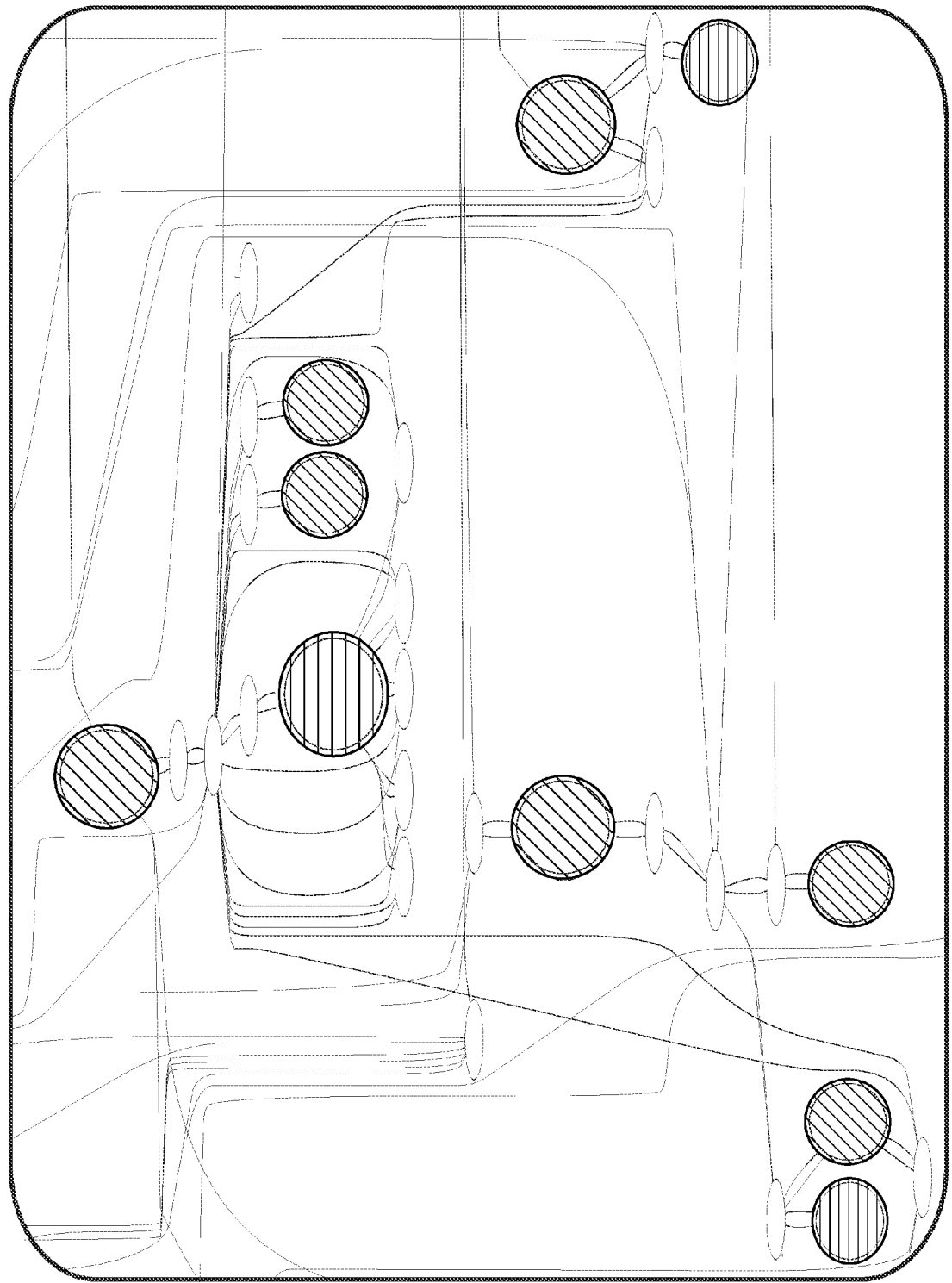

The analyst uses the method of the present invention to locate all patents from the respective Portfolios "A" and "c" which traverse the respective Portfolio "B" and finds that there aren't any at two degrees of separation (from "A" to "C") through "B". In fact, the analyst finds that there are no such occurrences at up to and including three degrees of separation, either. Undaunted, the analyst runs additional cases, taking many minutes but still a manageable time, until reaching five degrees of separation and surprisingly finds that indeed there are, all of a sudden, 850 distinct relationships found, comprising 201 patents, as shown graphically as FIGS. 17A, 17B, and 17C.

Figure 18:
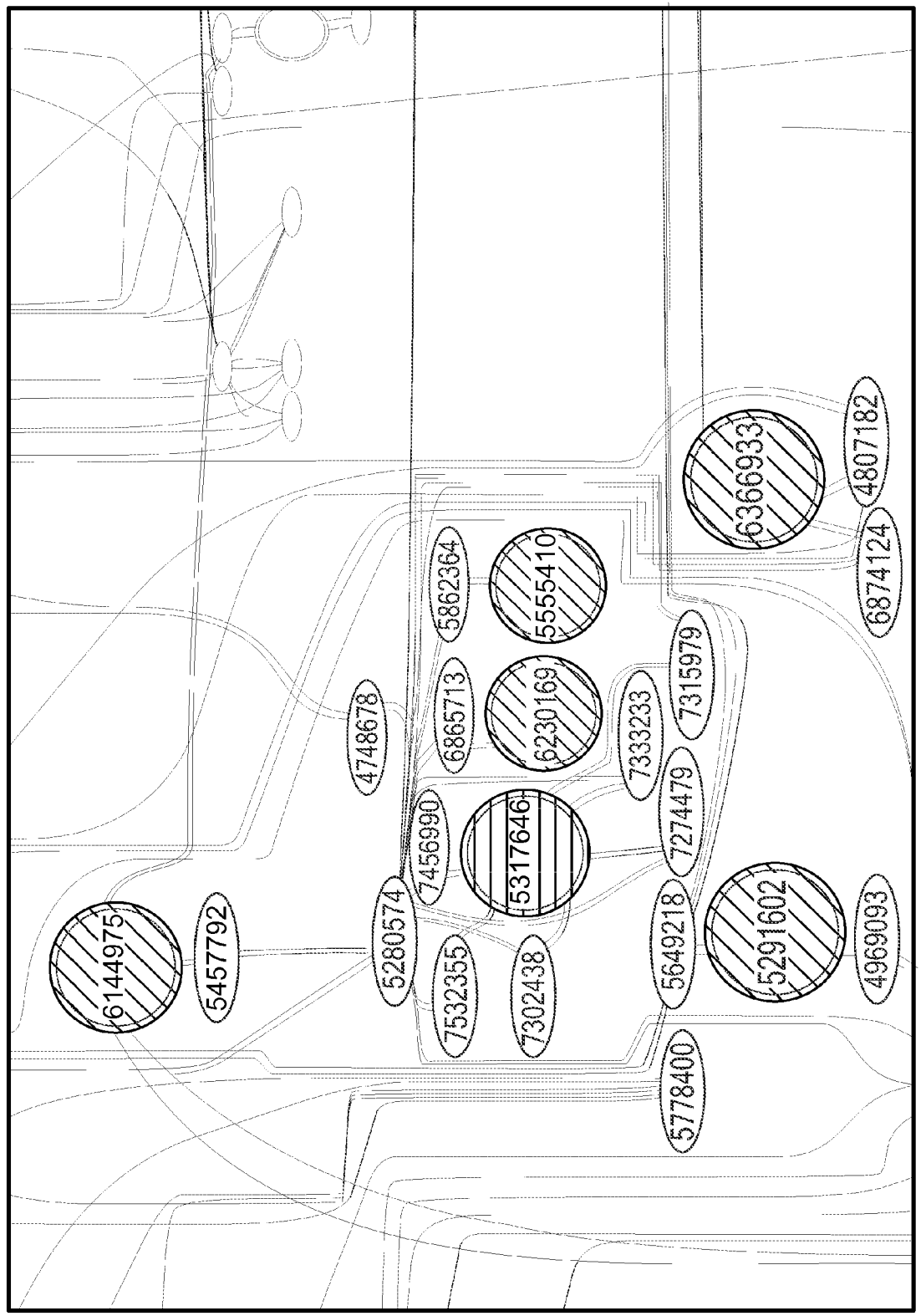
Figure 19:
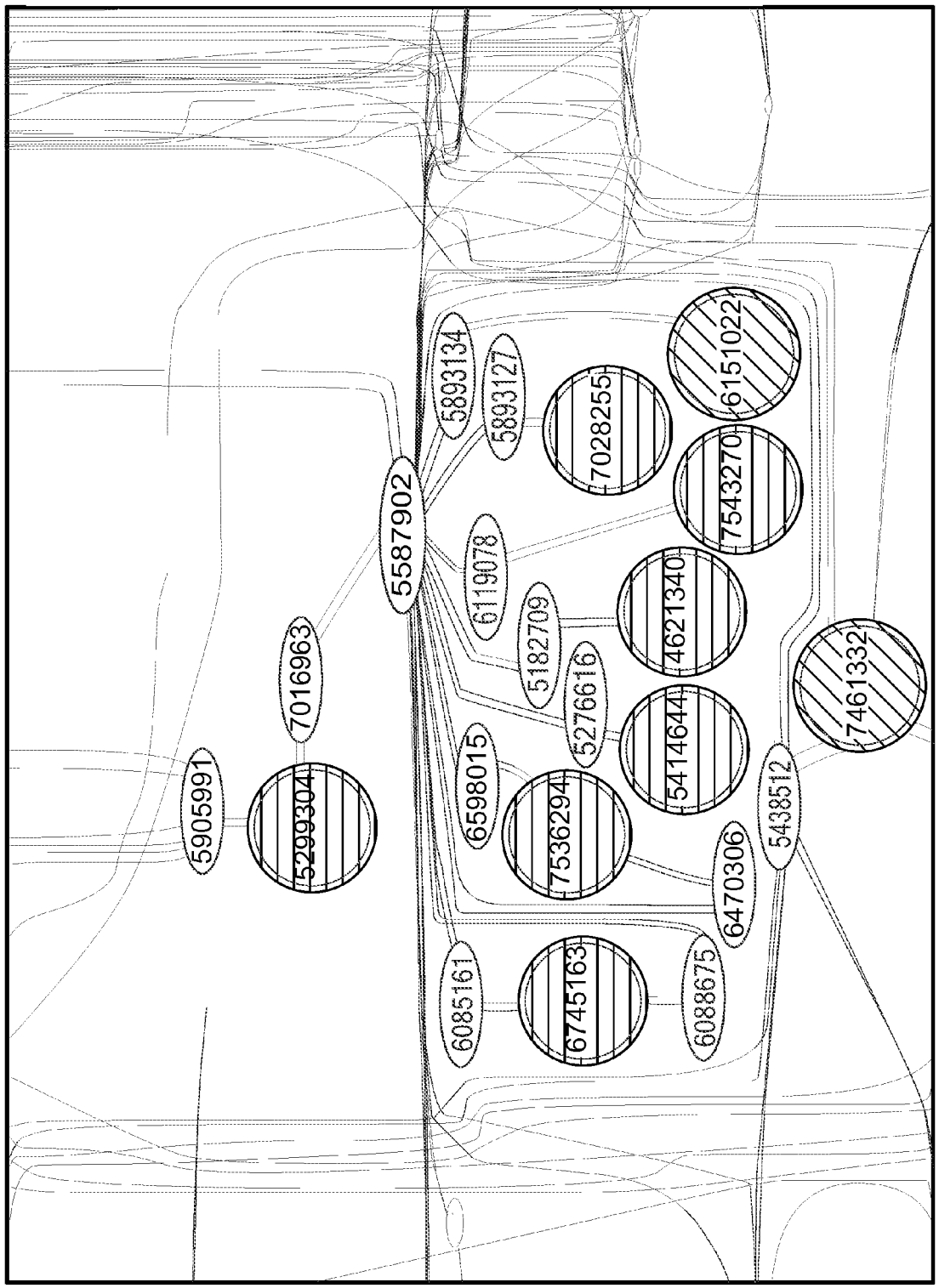

In addition, as shown in the figure, there are contained in the comprehensive graph which itself appears to be somewhat chaotic, what appear to the analyst to be numerous so-called sub-networks or "small worlds" of patents, the context of which small worlds the analyst believes may have special significance in the course of the dissection of the relevance of the prior art of the '449 patent. Two of such small worlds shown graphically as FIGS. 18 and 19.

Without the method of the present invention, the analyst recognizes that it would be difficult to perform this search even at two degrees of separation and it would be impossible to do so at the higher distances required, i.e. >=5 degrees of separation.

As an alternative embodiment still using the methodology of the present invention, the analyst recognizes that since the '449 patent relates to so-called Extensible Mark-up Language (commonly referred to by those skilled in the art as "XML") technology, that it may also be useful to explore relationships between the '449 patent and all other patents using the term "XML" in the claims of such other patents. To do this, the analyst constructs three patent portfolios as follows:

Portfolio "A", which is comprises the set of all other patents using the term "XML" in the claims (approximately 2,700 patents)

Portfolio "B" which consists of the '449 patent

Portfolio "C" which is identical to Portfolio "A"

Figure 20A:
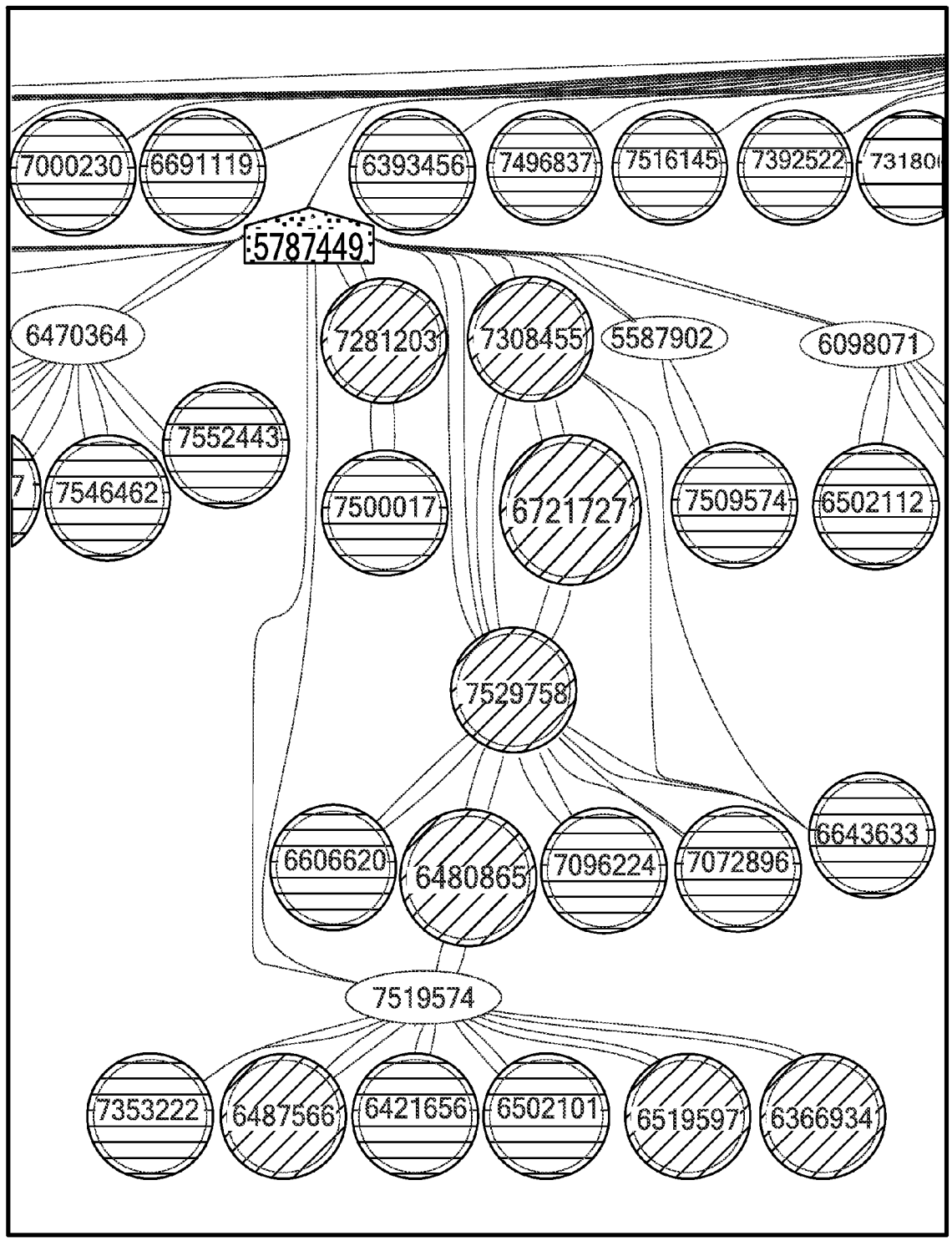

The analyst employs the method of the present invention and discovers that at three degrees of separation there are 73 patents that relate to the '449 patent, a graphical representation of these results being shown in FIG. 20. If the detailed review of these patents does not result in the discovery of the desired prior art, then it is clear that the analyst could increase the degrees of separation further, that is beyond three, to expand the breadth of the search and obtain more patents. As a first approximation however, the analyst tries to minimize the scope of the search.

In each case the analyst's goal is to obtain a set of one or more patents and/or assignees thereof, who may have published information about art that would be prior to the filing date of the '449 patent and could therefore be argued to have anticipated the invention claimed in the '449 patent.

As the pre-trial discovery runs its course and as the trial commences it is known to the analyst that often new prior art emerges (or is discounted) that needs to be reconciled with the existing knowledge base of patents theretofore discovered. The analyst advises Microsoft counsel that during such periods, it would be a simple task to add (or subtract) prior art references to the portfolio matrix used in the method of the present invention and re-execute the method, repeatedly during such period in real time.

EXAMPLE 17

The Exploration of the Relationships Between One or More Patent Thickets which Traverse a Set of One or More Patents in Connection with the Review of the Merit of Paying a Maintenance Fee Thereon or Alternatively Allowing Said Patent(s) to Abandon As observed by Kimberly Moore (see, Moore, Kimberly A., "Worthless Patents" July 2004. George Mason Law & Economics Research Paper No. 04-29), " . . . 53.7% of all patentees allow their patents to expire for failure to pay maintenance fees". Thus, the author contends that many patents are abandoned for failure to pay maintenance fees after a determination, rightly or wrongly, that the patent in question is not worth the continuing investment in fees.

The present invention comprises a means to assist the patent owner in ascertaining a relative value of a given patent in advance of the time that the decision to pay the maintenance fee or allow abandonment needs to be made. The means to do this will be described by the following synthetic example.

BP Amoco Corporation ["BP"] is a large multinational oil company holding thousands of patents, including U.S. Pat. No. 6,695,983 (which patent teaches a method of producing a crude synthetic gas or "syngas" product stream or a syngas product stream by further processing of the crude syngas product stream) which issued Feb. 24, 2004, and which was due for its first maintenance fee payment during the time period commencing Feb. 26, 2007. Up until the present, the '983 patent has not generated any direct revenue for BP, a common and primary measure of the patent's worth to a company.

BP knows that if the patent is not likely to generate revenues, it may be more economically prudent from an overall corporate return basis not to pay the scheduled maintenance fee allowing the patent to abandon, thereby freeing up the capital that would have gone to the fee payment for other more productive use. In the past, BP has made such determinations in an industry standard way, that is, by convening one or more meetings of ad hoc committee(s) of its scientists, engineers, patent attorneys and corporate licensing executives to review the particulars of the patent in question including any past and/or anticipated revenues expected there from, to discuss and provide opinions as to the value of such patents in order to provide a basis for determining the merits of paying the maintenance fees in question.

BP's experience has been that the tangible results of such committee sessions have been mixed (and in any event quite expensive) since most of the determinations have been made based upon known relationships of the patents in question to the patents of others already known to BP. Typically the basis of these relationships involved the discussion of anecdotal evidence provided by the committee members, occasionally supplemented by the use of some forward citation tree diagrams for the patents in question. In addition, there are always the risk to a patent holder abandoning a patent too soon. The patent holder may learn to their dismay that without the patent rights still viable other unknown patents may adversely affect the patent owner to their detriment. In fact, BP has no real evidence that the decisions made heretofore have been valid.

Since BP has thousands of such decisions to make each year in the US and other countries, it is clear that there is a present commercial need for and BP is looking for a more methodical and cost effective method to determine valuation and therefore whether or not to pay the fee. The following examples will describe the use of the present invention to address such present commercial need.

Case I—Relationship within the Patent Thicket of the '983 Classmates

An analyst is retained by BP prior to the maintenance fee due date, to assist BP in gathering information to ascertain the relative value of the '983 patent. The analyst will accomplish this task using the methods of the present invention. The analyst believes that the method of the present invention can provide insight into the latent as well as overt relationships between the '983 patent and its peers, thereby providing information to BP as to the value and potential uses of invention claimed in the '983 patent and in turn guidance as to whether or not it would make sense to pay the maintenance fee. Thus, to discover and explore these relationships, the analyst organizes the subject patent and its peers as follows.
Portfolio "A" Classmates of '983 patent—(US Class 252/373) Comprising approximately 1,500 patents
Portfolio "B" comprising the '983 patent
Portfolio "C" is identical to Portfolio "A"

As a first case, the analyst 'maps' portfolio "A" on to "C" via "B" (i.e. the analyst is looking for undirected citation tree link chains from 'A' to 'C' constrained by the requirement that each chain must at some point traverse the patent of 'B') at up to three degrees of separation (the analyst uses more than the minimum 2 degrees of separation to broaden the search scope, which the analyst often finds in studies such as that described in the instant example, is more productive in discovering latent relationships) depending upon how highly congested or connected the patent under study is relative to the universe of patents in the study.

Figure 21:
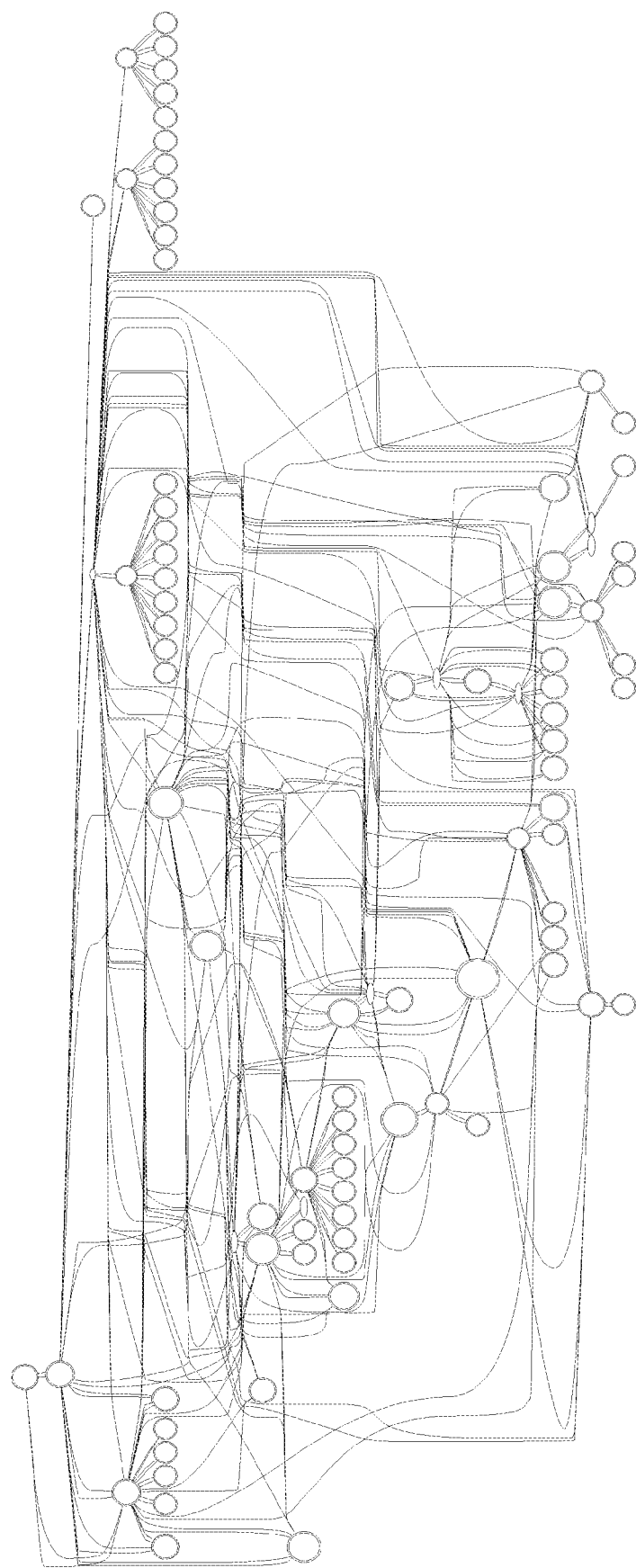

The results of the exercise are presented as FIG. 21. The analyst finds 91 patents are presented through 312 paths with 23 patents being connected as intermediates to the end point patents and at the same time including a path through the '983 patent.

In fact upon further initial exploration, the analyst reports that some of the patents that fall into the intermediate set are assigned to what BP would have considered an unlikely entity, General Motors Corporation, a company outside of the main business circle of BP and heretofore outside of consideration by BP as a potential licensee or assignee of the '983 patent.

Armed with the list of patent numbers, the analyst is able to download the patents from the USPTO website and produce a concise briefing book for all committee members to review in advance of the meeting describing his findings.

Case II—Patent Thicket of the Closest Friends Patents.

The analyst also believes that there is some merit in starting with the simple citation tree of the prior art of the '983 patent, but instead of using the results of the prior art method directly to deduce value as is done in the prior art methodologies, the analyst will use the initial results to compile a new patent thicket of broader but still likely relevant art for further processing with the method of the present invention. In this instance, a new term is introduced by the analyst, "Close Friends" of a given patent, that is, the set of all the forward and backward citations of a given patent at a specified number of degrees of separation.
Portfolio "A" Three Degree Close Friends of U.S. Pat. No. 6,695,983—Comprising 23 patents
Portfolio "B" comprising U.S. Pat. No. 6,695,983
Portfolio "C" identical to Portfolio "A"

As a first case, the analyst maps portfolio "A" on to "C" via B<=3 degrees of separation (the analyst uses more than the minimum 2 degrees of separation to broaden the search scope, which the analyst often finds in cases such as that described in the instant example, is more productive in discovering latent relationships).

Figure 22:
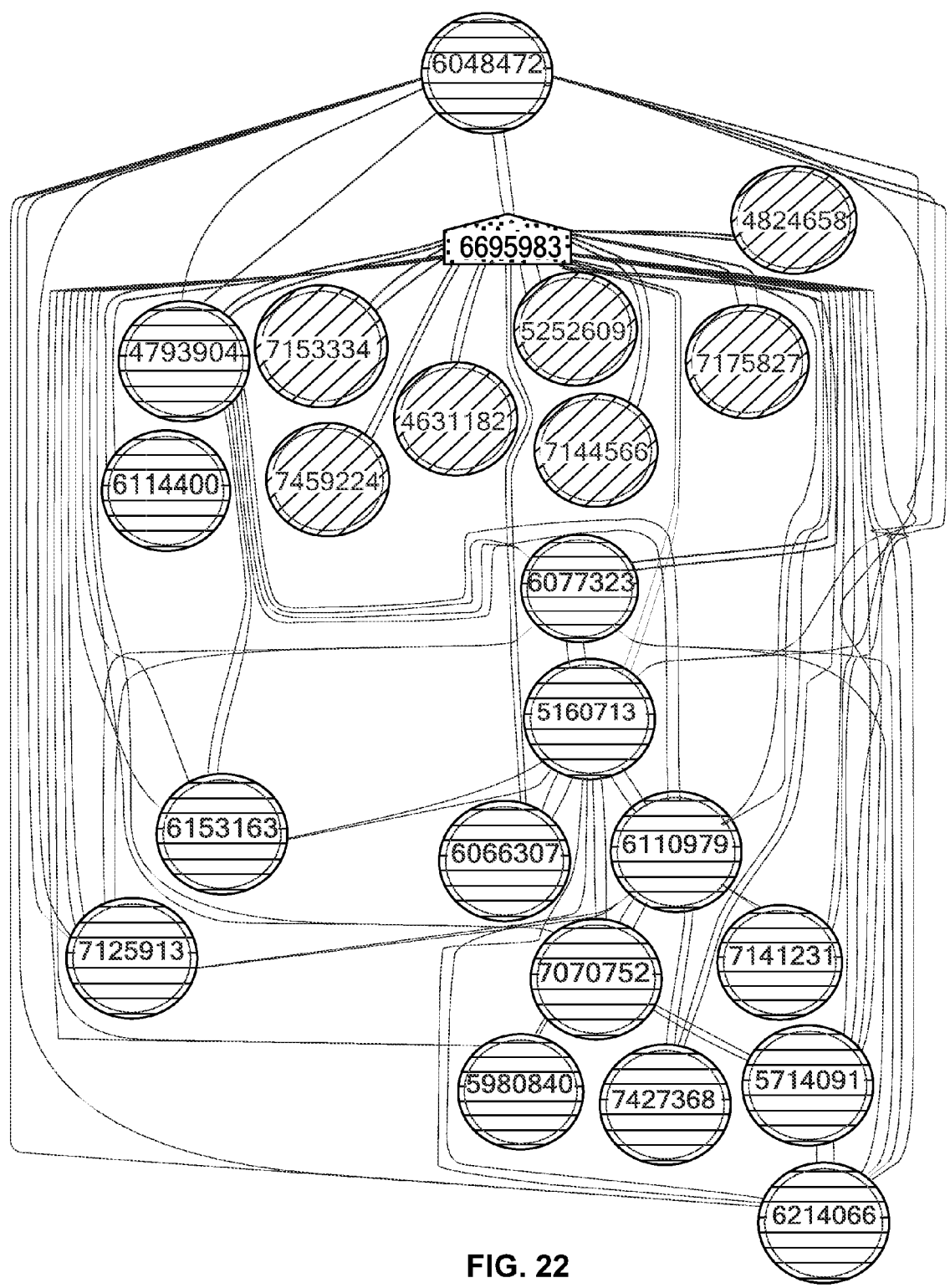

The results of the exercise are presented as FIG. 22. The analyst finds 23 patents are presented through 92 paths being connected as intermediates to the end point patents and at the same time including a path through the '983 patent. Armed with the list of patent numbers, the analyst is able to download the patents from the USPTO website and produce a concise briefing book for all committee members to review in advance of the meeting describing his findings Case III—Patent Thicket of the Principal Classes of Closest Friends Patents.

Finally, just to make sure that the search for art is broadest while still relevant, the analyst once again starts with the principal classes of all patents in the patent thicket created in Case II, immediately above, but using the results of which to compile a second patent thicket of likely relevant art for further processing with the method of the present invention comprising those patents residing in the principal classes of all such constituents of the synthesized patent thicket.
Portfolio "A" the Principal Class of Three Degree Close Friends of U.S. Pat. No. 6,695,983 comprising approximately 8,000 Patents
Portfolio "B" comprising U.S. Pat. No. 6,695,983
Portfolio "C" identical to Portfolio "A"

As a first case, the analyst 'maps' portfolio "A" on to "C" via B<=4 degrees of separation (the analyst uses more than the minimum 2 degrees of separation to broaden the search scope, which the analyst often finds in cases such as that described in the instant example, is more productive in discovering latent relationships).

Figure 23:
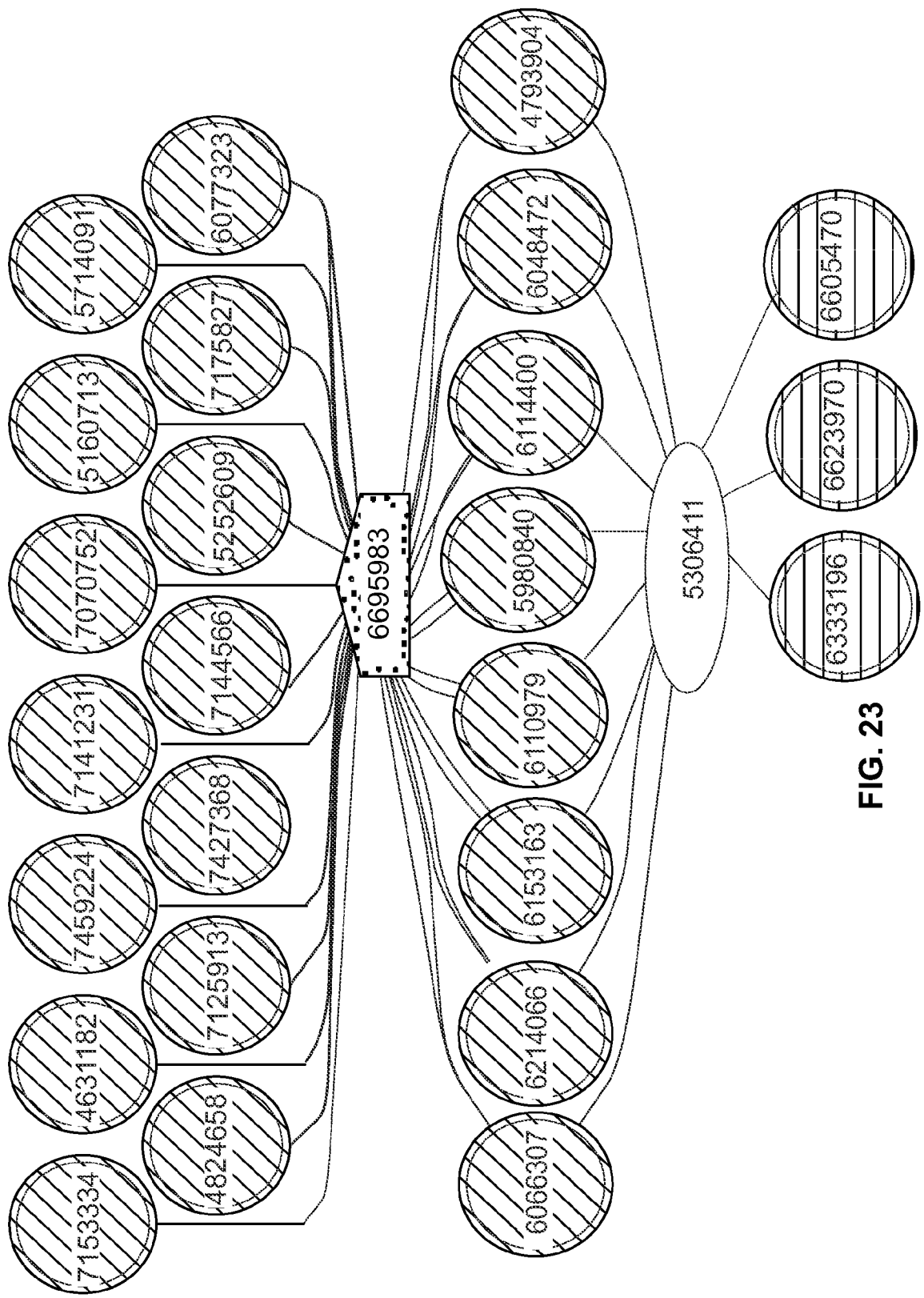

The results of the exercise are presented as FIG. 23. The analyst finds 27 patents are presented through 43 paths and at the same time including a path through the '983 patent. Armed with the list of patent numbers, the analyst is able to download the patents from the USPTO website and produce a concise briefing book for all committee members to review in advance of the meeting describing his findings.

EXAMPLE 18

The Batch-Wise or Real-Time Exploration of the Relationships Between Two Identical Patent Thickets Each Thicket Comprising the Set of all Issued and Pending Patents Prosecuted by a Specific Attorney, Firm or Agent in Connection with Discovery, Disposition and Future Avoidance of Ethical Conflicts of Interest by Such Attorney, Firm or Agent A major Canadian law firm, Smart & Biggar/Fetherstonhaugh ("SBFH") bills itself as "Canada's largest firm practicing exclusively in intellectual property and technology law". The law firm also represents its clients before the USPTO. SBFH like most law firms probably likes to keep up with the latest technologies in running its practice.

An intellectual property analyst recognizes that one problem law firms in general have, and large law firms in particular have, is that given the volume of patent prosecutions that these firms have and the number of patent professionals that they employ, it is increasingly difficult to monitor and control potential conflicts of interest as new clients come on-board adding to the pool of intellectual property already compiled by existing or former clients. The analyst contacts SBFH about a new means of discovering potential conflicts of interest using the method of the present invention, namely, discovering and exposing circumstances in which SBFH attorneys may be prosecuting patent applications before the USPTO on behalf of a current SBFH client and in the course of such representation, are citing the patents or applications of another current or former SBFH client. As the analyst knows, since an attorney has a number of duties to each of its present and former clients, without going into the nuances of the problems of such a situation, the analyst knows that specifically in this context, the latter patent prosecution may operate to the detriment of the former patent's value and hence pose harm to the former or other current client.

Thus, the analyst proposes that it perform an introductory study for SBFH in that it creates two portfolios, as follows:
Portfolio "A"—All of the patents in which SBFH was attorney of record at issuance;
Portfolio "B"—Identical to Portfolio "A"

The analyst then queries the database used in all of the prior examples to discover all cases in which a patent in Portfolio "A" cites a patent in Portfolio "B", thus, at one degree of separation from "A" to "B". The query takes a few seconds to run.

Figure 24:
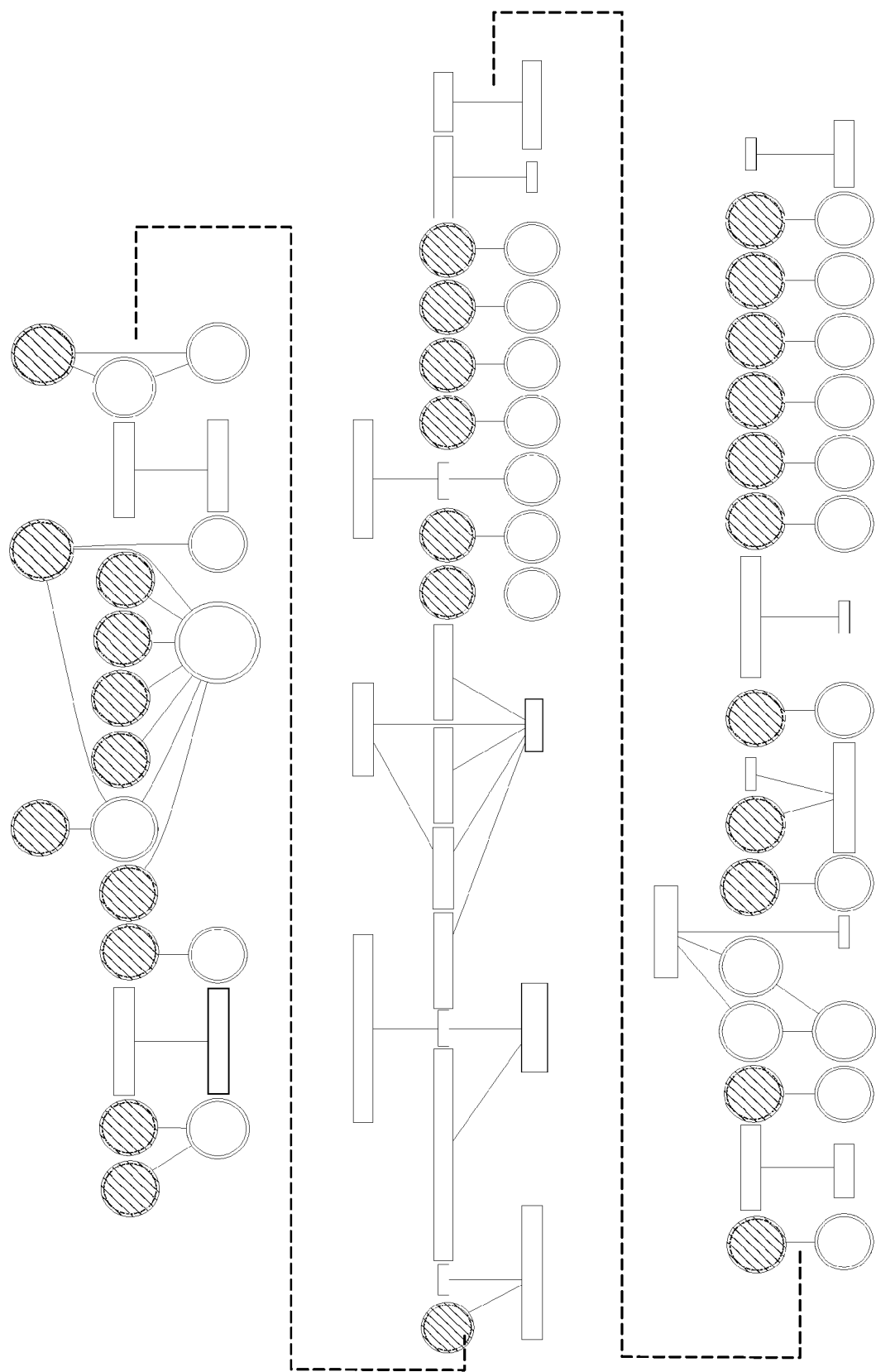
Figure 25:
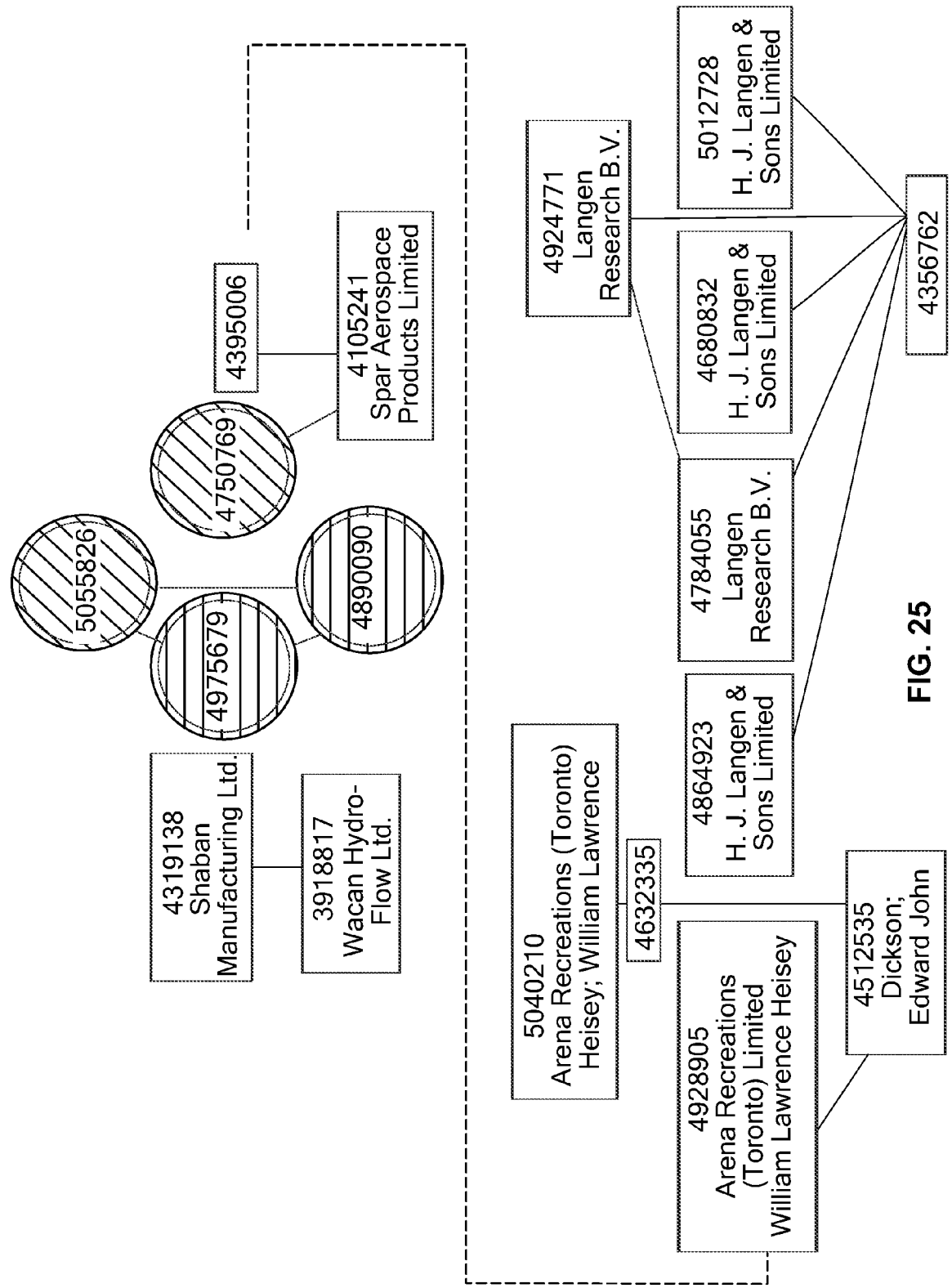

The results of the exercise are presented as FIG. 24 (and in the zoomed in view of a section of the FIG. 24 as FIG. 25). The analyst finds 88 patents are presented through 59 paths. Moreover, the results presented in the attached figures are presented with a color coding to represent instances in which the assignee of record of each patent is identified when the assignee of the Portfolio "A" instance is not the same as the assignee of the Portfolio "B" instance, that is, when an SBFH attorney cited a patent for a assignee of the Portfolio "A" client against a patent for a different record assignee of the Portfolio "B" client. The results presented in the figures are striking and quite unexpected by SBFH given the great lengths SBFH takes as all competent law firms take to avoid conflicts. The analyst recognizes that the data presented by his analysis is but the first step in exploring a possible conflict of interest, given that the assignees of record may have consented to the dual representation and/or the assignees of record although having different names, may now be or formerly have been under common ownership or control, thus potentially mitigating or negating the effect any ethical conflict.

More specifically, as clearly shown in the zoomed-in view presented in FIG. 25, in the case of U.S. Pat. No. 4,319,138 (shown on the face of the patent being assigned to Shaban Manufacturing Inc.) and U.S. Pat. No. 3,918,817 (shown on the face of the patent being assigned to Wacan Hydro-flow Ltd.). Moreover, the most recent assignment of the patents in question is available from the USPTO website and such latest data may or may not affect the ethical issues described herein depending upon the dates of such latter assignment if any.

In any event, since this result is 'after the fact' in that the prosecution has already occurred, the ethics partners at SBFH now likely have to explore each prospective case which has been clearly identified by the method of the present invention in FIG. 24 to ascertain if any real prejudice to one or both clients' patents has occurred and to determine what further steps need to be done to remedy any problems caused thereby.

The analyst notes and informs SBFH that in addition to the prior 'after the fact' example, that this analysis can, however, be done 'before the fact', that is in real time during a prosecution, as prior art is developed both by the as filed Information Disclosure Sheet or by USPTO examiners in the course of the Office Actions by adding such new art to the respective portfolios and re-executing the query. Thus, the analyst advises the SBFH ethics partners this efficient method should be added to the SBFH conflicts clearing operations immediately. The ethics partners at SBFH advise the analyst that they will discuss the matter at an upcoming partners' committee meeting and consider the licensing and implementation of the method.

EXAMPLE 19

The Exploration of the Relationships Between One or More Patent Thickets Owned or Controlled by a First Entity Such that the Relationships Between Such Patents Traverse the Patent Thickets Owned or Controlled by a Second Entity for the Purpose of Determining the Prospective Costs and Benefits of Entering into a Field License with Such Second Entity Relating to Such Patents As a further example of the method of the present invention addresses the problem of many companies which have incomplete knowledge of both (a) their own patents as well as (b) the patents of their competitors in a given technology. Often, as referred to in detail supra., when confronted with a perceived or actual threat of a patent infringement claim, a large company may opt to deal itself out of a potential problem by just trying to bury its head in the sand and 'punt' the problem by offering to cross-license its own technologies to its competitor. In addition, typically the patent portfolios of parties to such transactions comprise patent thickets, either in terms of absolute numbers of patents or at least with respect to the numbers of patents in the area of technology in question.

Obviously ignoring an issue in such a pig-in-the-poke licensing scenario exposes each cross-licensor to the problem of potentially over-paying for the licensed patents of the other cross-licensor as neither licensor knows what exposure they have or what they are really getting in return. The method of the present invention provides a better alternative to discover and decipher the interconnections of the thicket.

On Sep. 17, 2001, prior to the availability of the present invention it was announced that Rambus Inc. and Intel Corporation signed a comprehensive patent cross-license agreement. (See http://www.design-reuse.com/news/424/rambus-intel-sign-comprehensive-patent-cross-license-agreement.html). The analyst knows cross-licensing arrangements (as a means to settle litigation) are not uncommon in the semiconductor industry. Therefore, the analyst believes that there is a current need for a more methodical means of determining whether it makes sense to fight a patent suit rather than giving up potentially much more value in a quick cross-licensing deal.

The analyst contacts Intel to explain that Intel should be cautious in cross licensing transactions given its huge portfolio of patents (and especially when the cross licensee has a significantly smaller patent portfolio) and before doing so, Intel as the predominant cross-licensor should be aware that there is a better way to go about this decision process. To make the point, the analyst uses the now consummated transaction as an example by creating three patent portfolios constituting a thicket for analysis as follows:
Portfolio "A" Patents assigned to Intel Corporation (more than 17,000 patents)
Portfolio "B Patents assigned to Rambus Inc (approximately 700 patents)
Portfolio "C" is identical to Portfolio "A"

Figure 26:
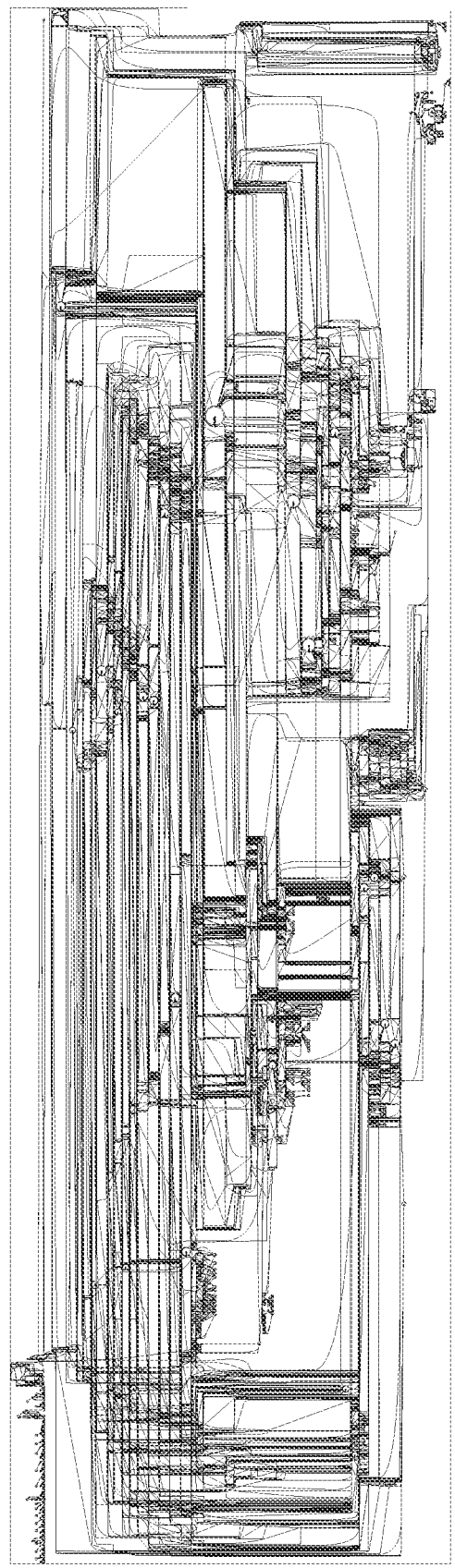

As a first case, the analyst 'maps' portfolio "A" on to "C" via "B" at two degrees of separation and the results of the exercise are presented as FIG. 26. The analyst finds 742 patents are presented through 3,000 paths with 296 patents being connected as intermediates to the end point patents and at the same time including a path through a patent assigned to Rambus Inc.

Figure 27C:
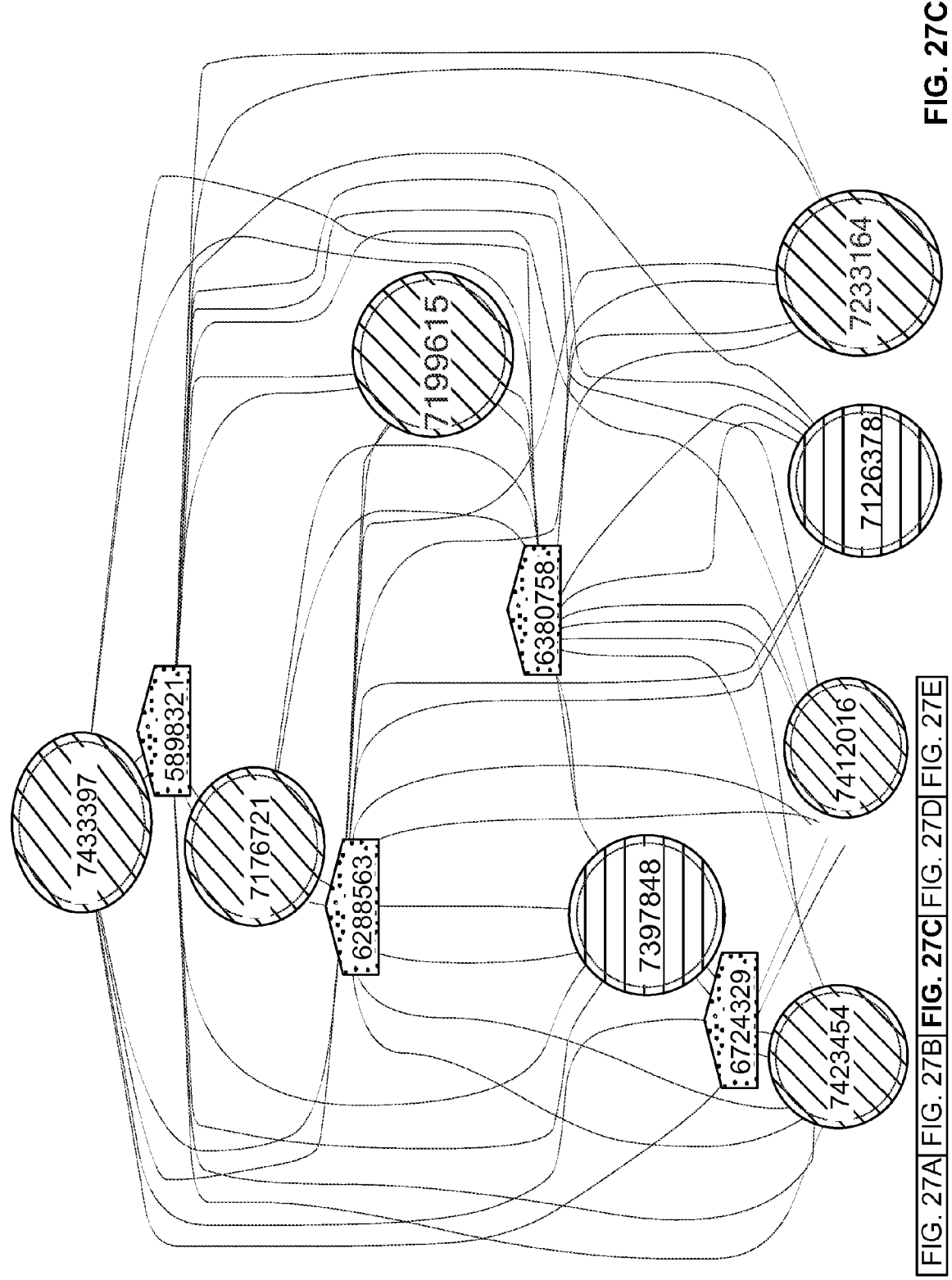

As a second case, using the same data sets as in the first case of this example, the analyst maps portfolio "B" on to "B" via "A" at two degrees of separation and the results of the exercise are presented as FIG. 26. The analyst finds 608 patents are presented through 2,760 paths but, this time with only 23 patents being connected as intermediates to the end point patents and at the same time including a path through a patent assigned to Intel Corp. Moreover, as shown in FIG. 27, there appear to be an unexpected set of small worlds of patent connections, which together with the data of the first case of this example may indicate that there was more for Rambus to gain than Intel in the broad cross-licensing arrangement. In any event, a relatively small numbers of patents was discovered and could be easily reviewed by Intel's Intellectual Property professionals to make a reasoned judgment as to the action to take.

The analyst explains to Intel that in the future it may be wiser for Intel to explore the interconnections of the patents of its thicket and the thickets of others before launching headlong into a broad cross-license.

EXAMPLE 20

The Exploration of the Relationships Between One or More Patent Thickets Owned or Controlled by a First Entity Such that the Relationships Between Such Patents Traverse the Patent Thickets Owned or Controlled by One or More Other Entities for the Purpose of Determining the Potential Feasibility of Such First Entity's Either Commencing, Defending or Avoiding a Patent Dispute in Order to Facilitate the Entering into of a Patent License or Defense with Such Other Entity Relating to Such Patents Although the two cases presented in this example concern business models that are in practical terms diametrically opposed in commercial purpose (i.e., one company may be labeled a so-called "patent troll" and the other company may be labeled as a "patent troll-buster"), they are both nonetheless and somewhat surprisingly subject to analysis by similar methodology by application of the methods of the present invention. In each case, the process is two-fold:
Construct identical portfolios of patents Portfolio "A" and Portfolio "C" each comprising the patents assigned to one entity and then explore the relationships between Portfolios "A" and "C" at a DIRECTED (i.e., a constant chronological citation chain) distance of two degrees of separation to obtain a first approximation list of intermediary patents assigned to one or more other entities, such obtained patents being then used to construct a Portfolio "B"; and then
Explore the relationships between Portfolios "A" and "C" that also traverse the aforesaid Portfolio "B" at an UNDIRECTED (i.e., ignoring constancy of the chronology of citation chain) distance of at least two degrees of separation to obtain a list of potential new clients, where the degree of separation chosen will depend upon the scope and extent of the results desired by the client.
Case I. Acacia Patent Holdings Corporation (Non-Practicing Entity)

An analyst has recently been hired by a noted patent investment company, Acacia Patent Holdings Corporation (sometimes referred to as a "non-practicing entity" or a "patent troll" since they derive their revenues from the exploitation of patents that they have acquired for the sole purpose of charging licensing fees to others as a result of successful litigation or sometimes only the threat thereof), in connection with exploring the universe of patents for potential patent licensing revenue opportunities. Specifically, as a further example of the method of the present invention the analyst is furnished with a set of approximately 100 of the totality of patents that have been assigned to Acacia.

The analyst constructs two patent portfolios as follows:
Portfolio "A"—The approximately One Hundred Acacia Patents under study
Portfolio "C"—Identical to Portfolio "A"

Figure 28A:
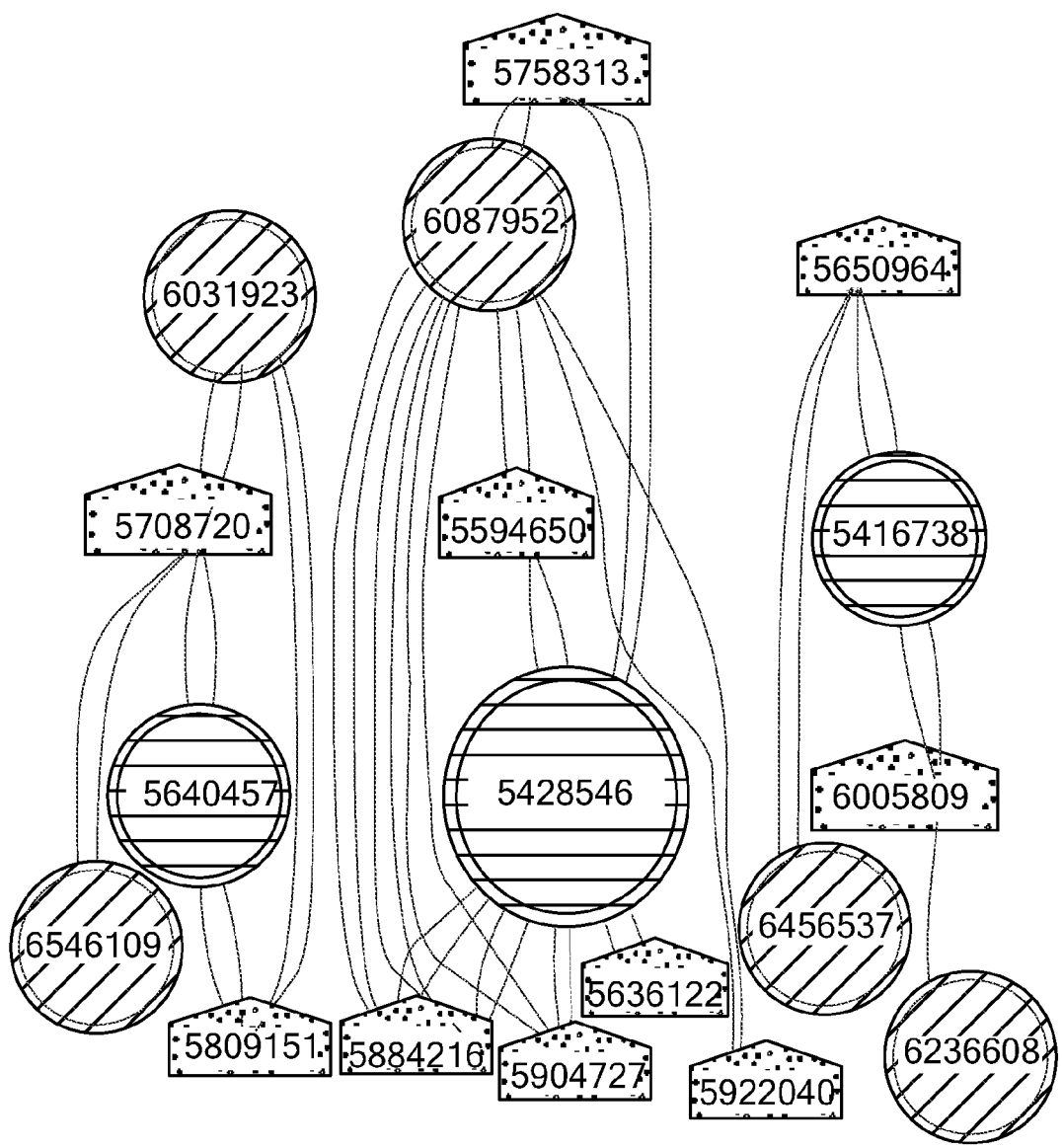
Figure 28B:
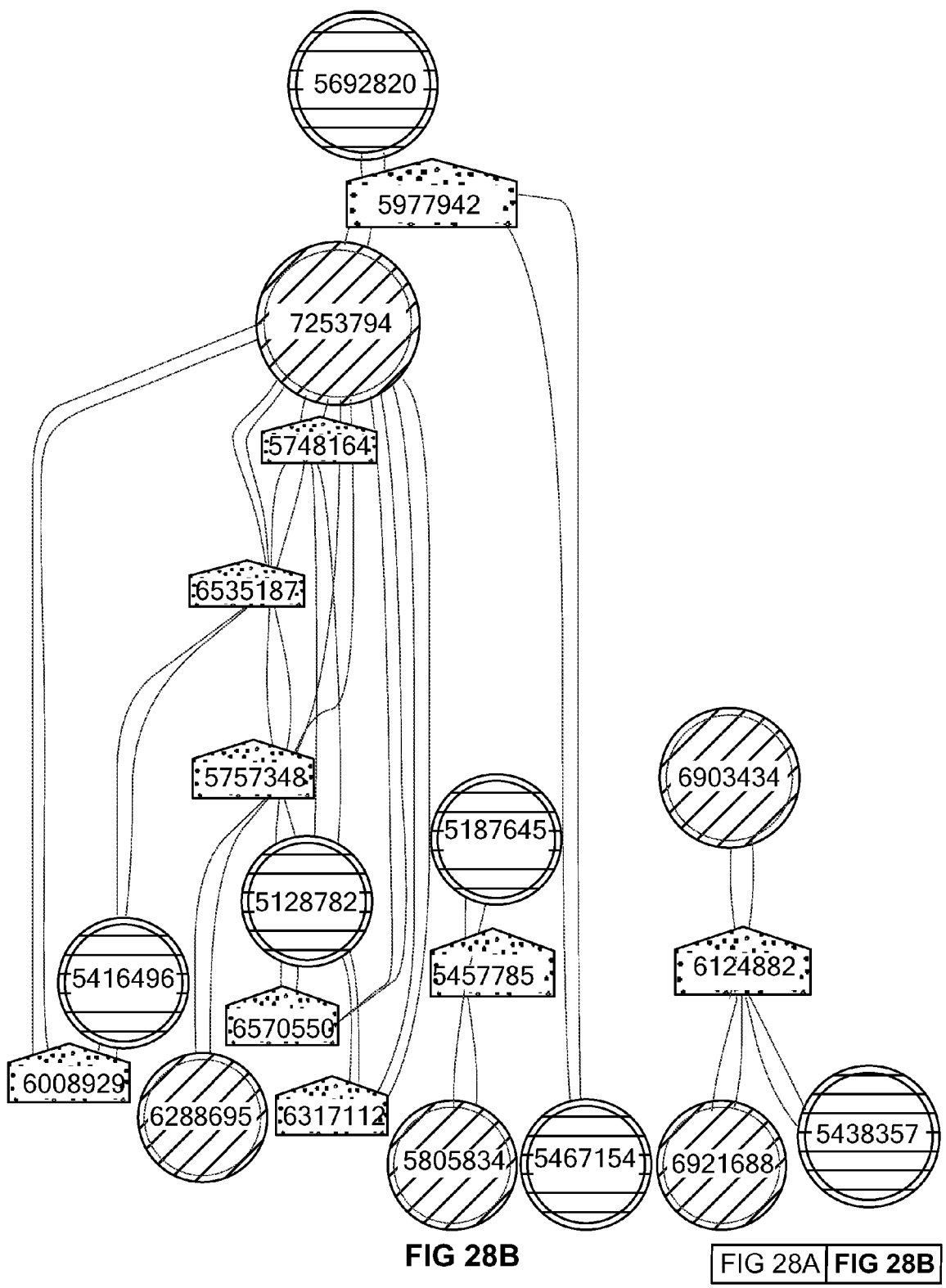

The analyst then uses the method of the present invention as described, supra., to expose the relationships between Portfolios "A" and "C" at a DIRECTED distance of two degrees of separation and thereby to obtain a first approximation list of intermediary patents assigned to one or more other entities. This exercise results in the discovery of 88 paths between the Portfolios "A" and "C" comprising a totality of 38 patents of which 19 are intermediary, with the graphical representation of the results is shown in FIG. 28.

The analyst explains to Acacia that as a first approximation of the totality of the patents of interest that this set of nineteen patents should be examined in detail. The expansion of the exploration to further degrees of separation can be easily accomplished thereafter as desired.

The Analyst then uses this list of nineteen intermediary patents to construct a new portfolio, Portfolio "B". Although these intermediary patents may be of interest to Acacia, as a first approximation, the analyst further employs the method of the present invention at an UNDIRECTED distance of THREE degrees of separation to obtain a more extensive list of potential Acacia clients by operating on the three portfolios as follows:
Portfolio "A"—The One Hundred Acacia Patents under study
Portfolio "B"—The 19 Intermediate Patents discovered
Portfolio "C"—Identical to Portfolio "A"

Figure 29:
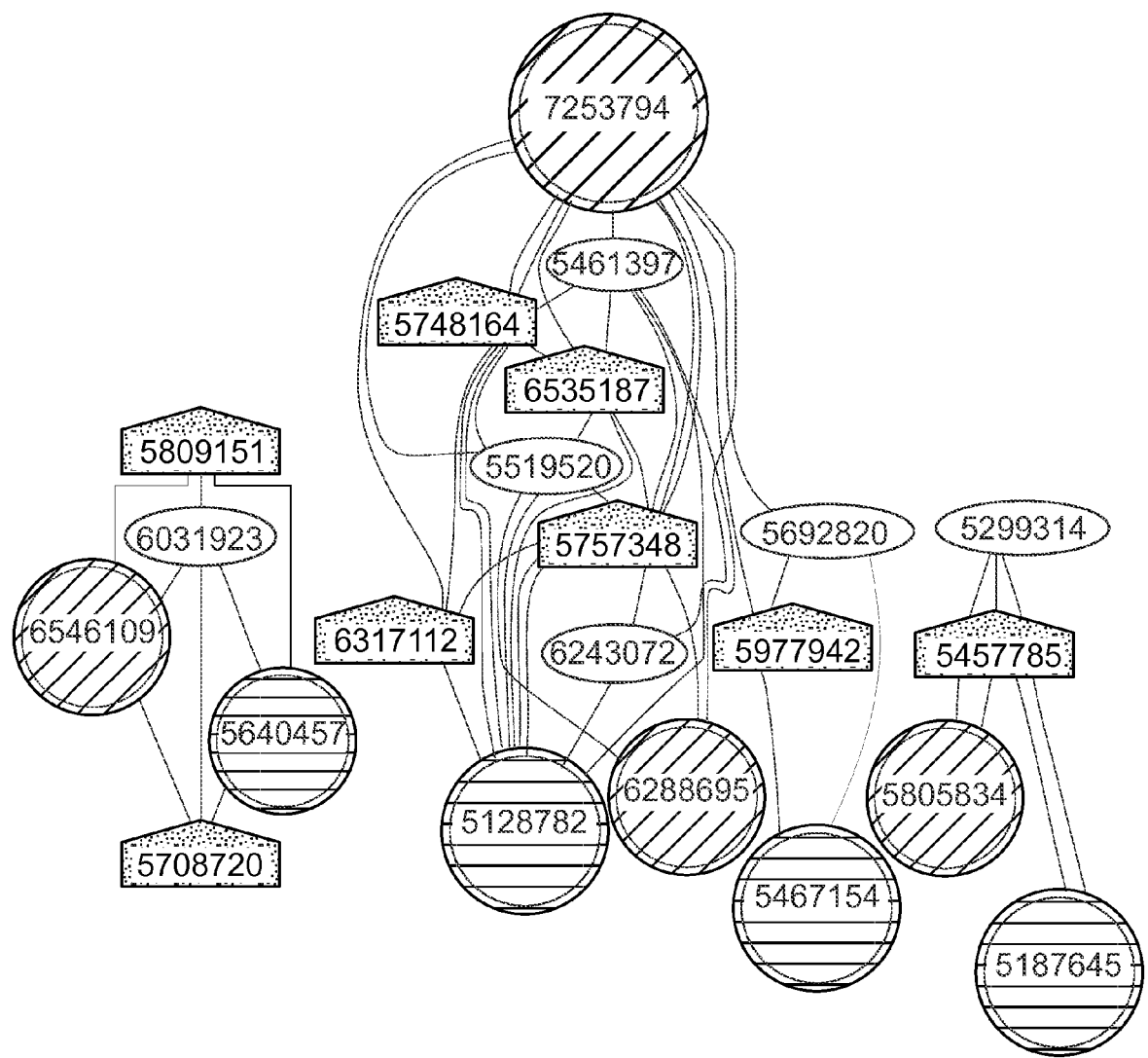

This exercise results in the discovery of 1,962 paths between the Portfolios "A" and "C" comprising a totality of 308 patents of which 296 are intermediary. The results are quite extensive so in order to simplify the review process, the analysis is also done at a DIRECTED distance of THREE degrees it results in the discovery of 50 paths between the such Portfolios "A" and "C" comprising a totality of 22 patents of which 14 are intermediary, with the graphical representation of the results is shown in FIG. 29. The analyst prepares both lists for review by Acacia's professional staff.
Case II—RPX CORPORATION (Troll Defense)

The same analyst has recently been hired by another noted patent investment company, RPX Corporation (see http://www.rpxcorp.com) a company whose purpose is to defend against the efforts of other companies such as the aforesaid "non-practicing entities" or "patent trolls" and to protect against the efforts of such other companies as they attempt to extract monies from RPX's customers.

At the same time, since RPX is always seeking out new clients to offer "protection" to, the analyst was hired by RPX in connection with exploring the universe of patents for potential revenue opportunities in offering RPX's patent litigation risk management services.

Using a set of approximately two hundred patents assigned to RPX (even though the number of patents that RPX has rights to, by virtue of its agreements with its clients, likely far exceeds this number), the analyst constructs a test case using two portfolios as follows:
Portfolio "A"—The RPX Patents under study
Portfolio "C"—Identical to Portfolio "A"

The analyst then uses the method of the present invention as described, supra., to expose the relationships between Portfolios "A" and "C" at a DIRECTED distance of two degrees of separation and thereby to obtain a first approximation list of intermediary patents assigned to one or more other entities. This exercise results in the discovery of 1,010 paths between the Portfolios "A" and "C" comprising a totality of 143 patents of which 61 are intermediary a significant although manageable quantity.

The analyst explains to RPX that as a first approximation of the totality of the patents of interest that this set of sixty-one patents should be examined. Although the expansion of the exploration to further degrees of separation can be easily accomplished thereafter as desired, RPX decides to first examine the sixty-one patents found in detail then to expand the search, as desired.

Figure 30:
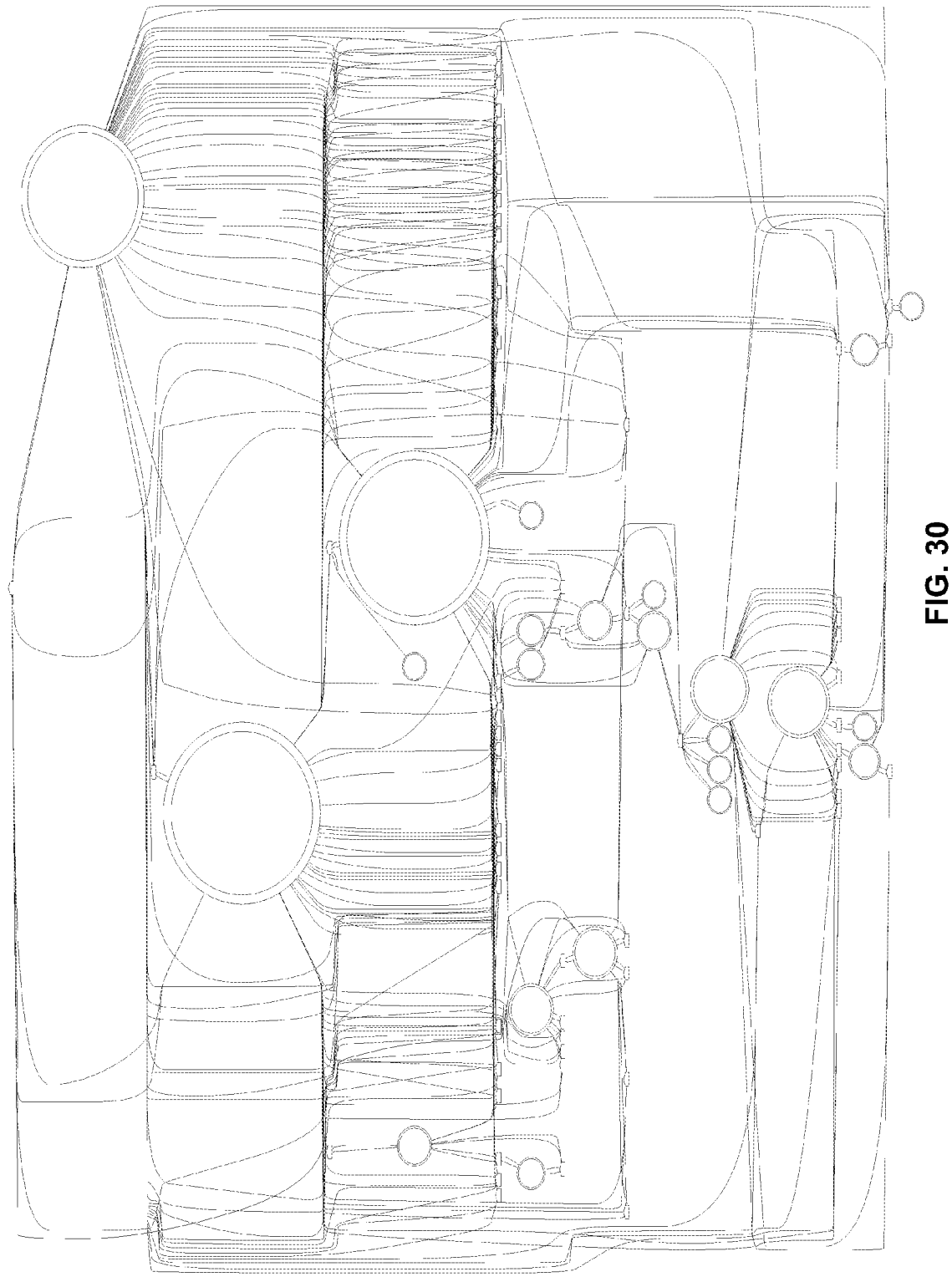
Figure 31A:
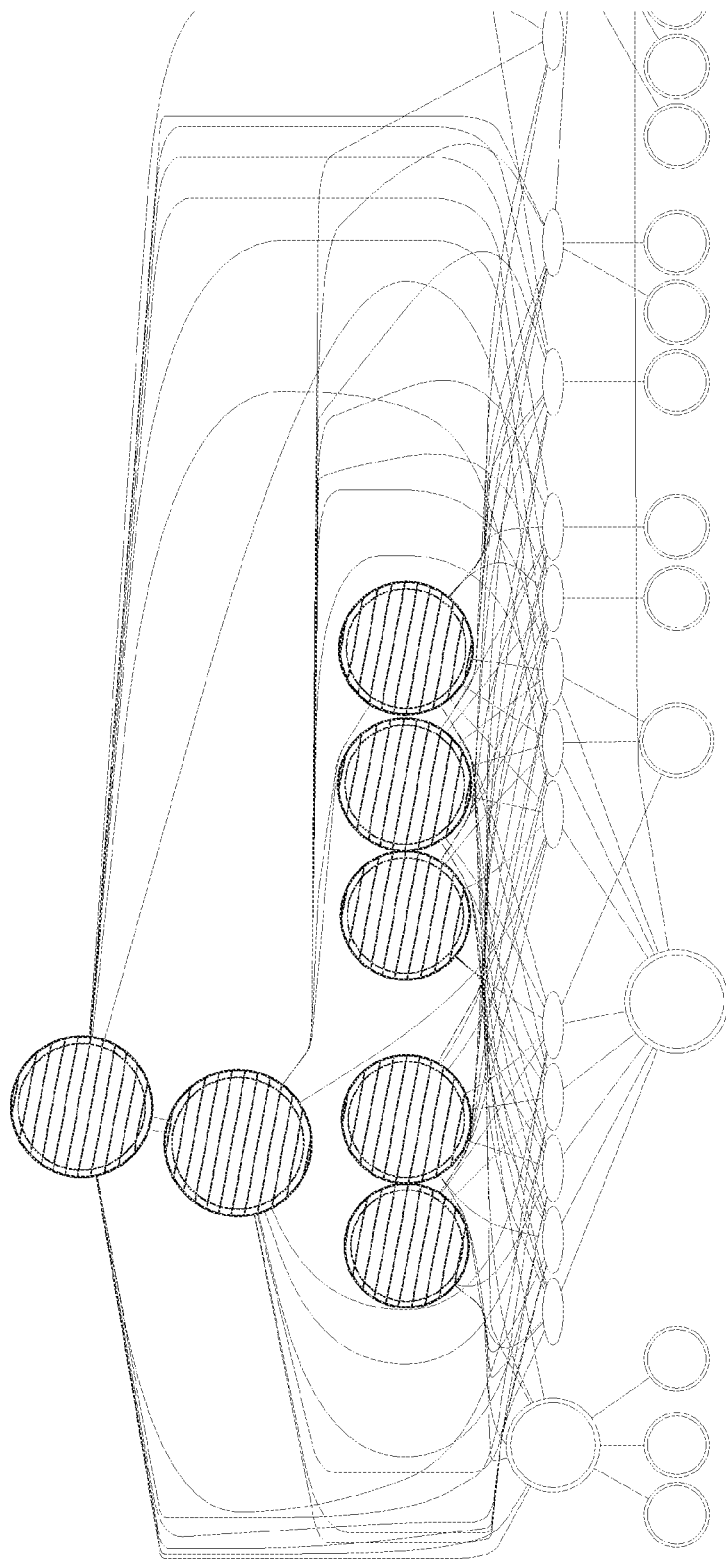
FIGS. 31A through 31X are an illustration of the expanded Social Network Results at two (2) degrees of separation corresponding to the social networking explanation as set out in Example 10.
Figure 31C:
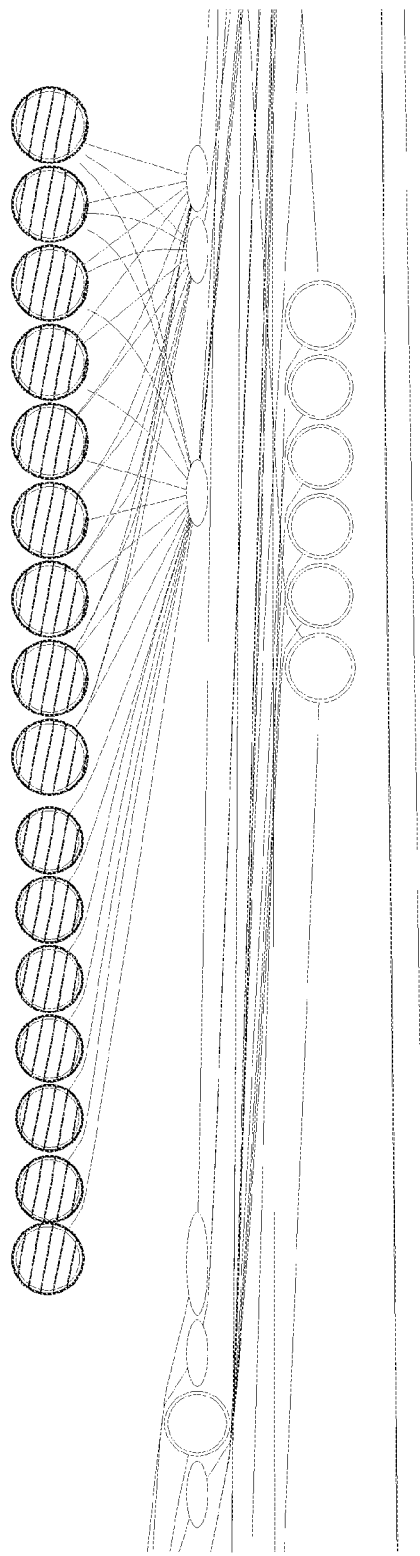
Figure 31D:
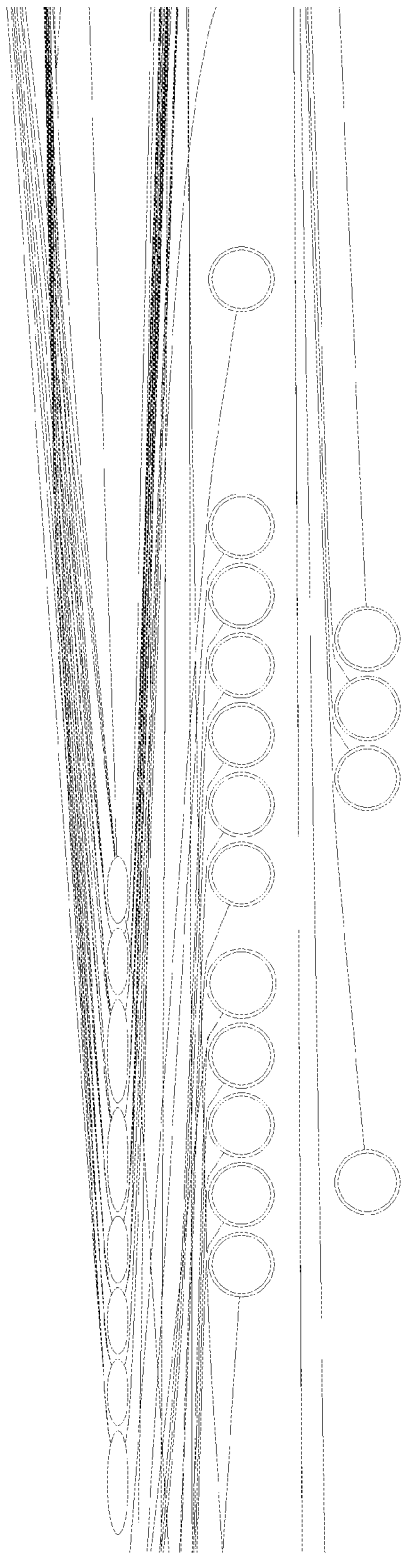
Figure 31E:
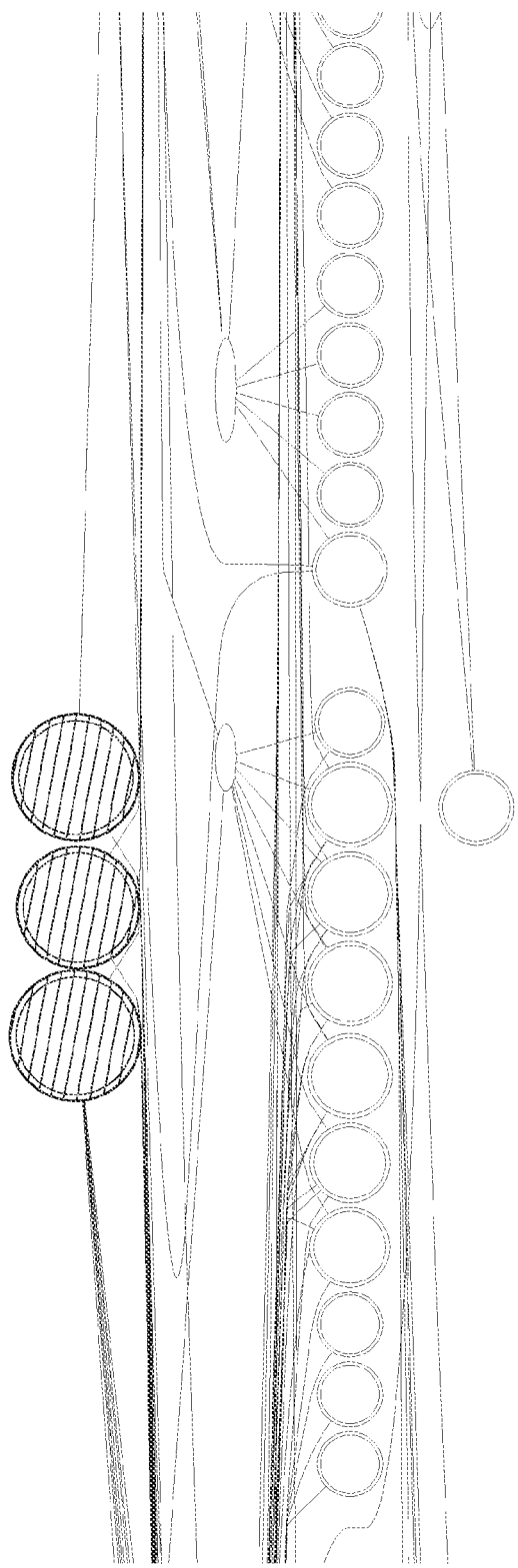
Figure 31F:
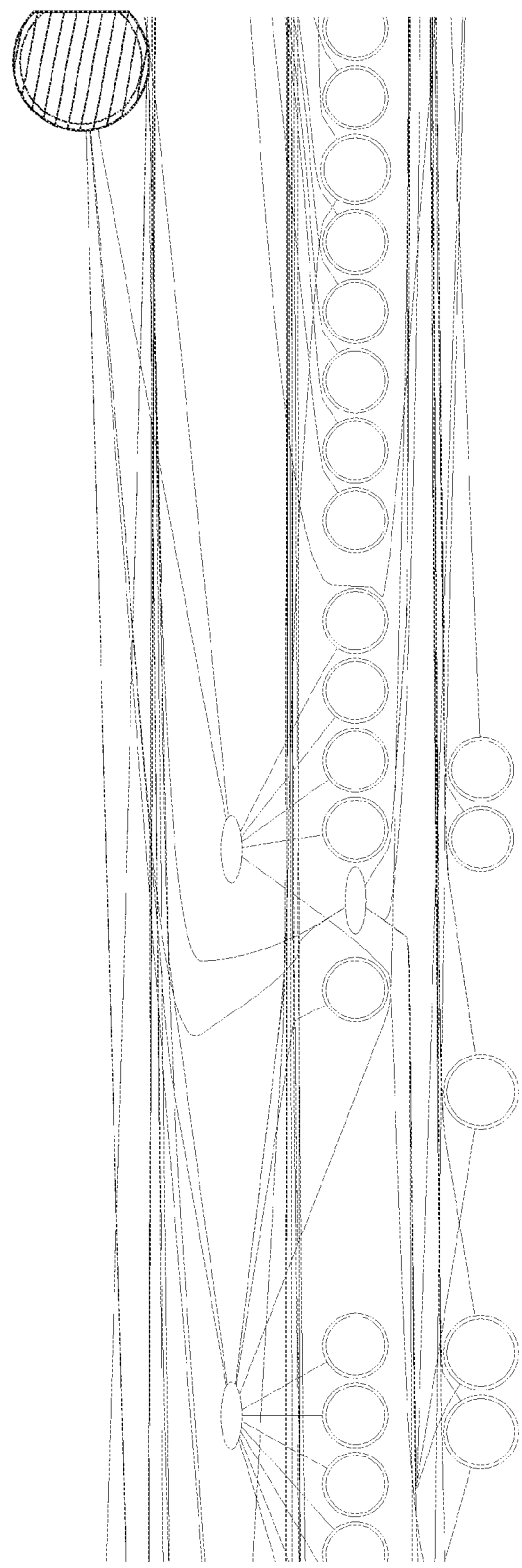
Figure 31G:
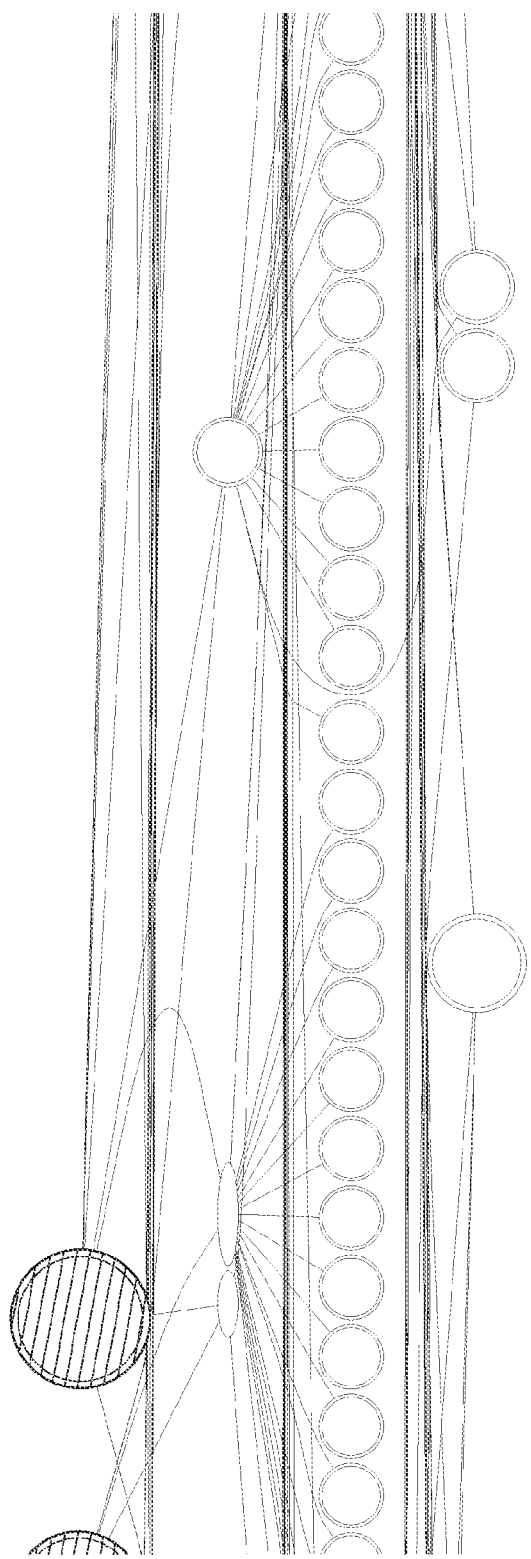
Figure 31H:
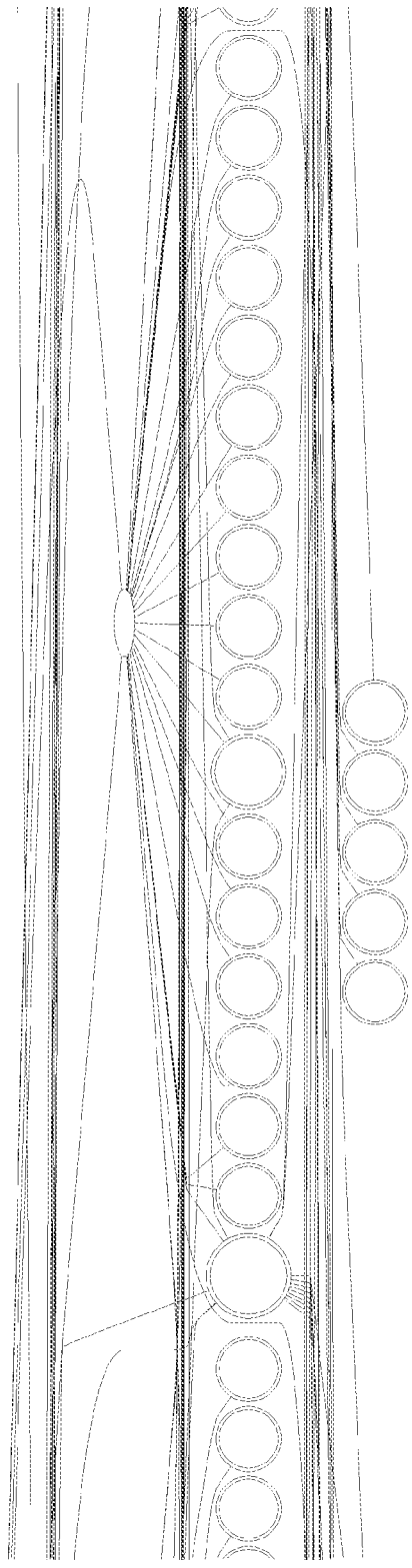
Figure 31I:
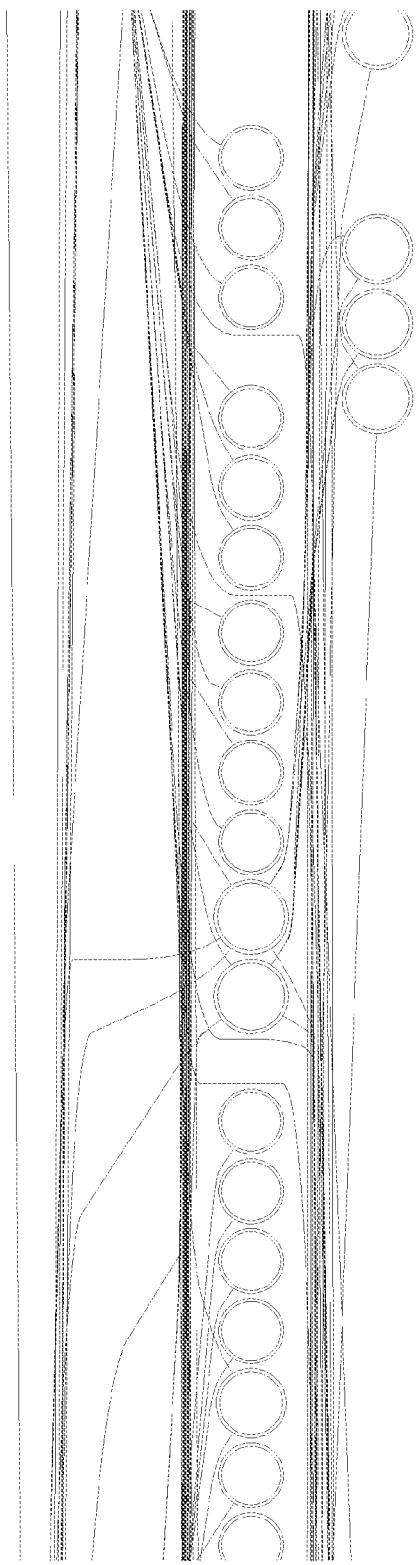
Figure 31K:
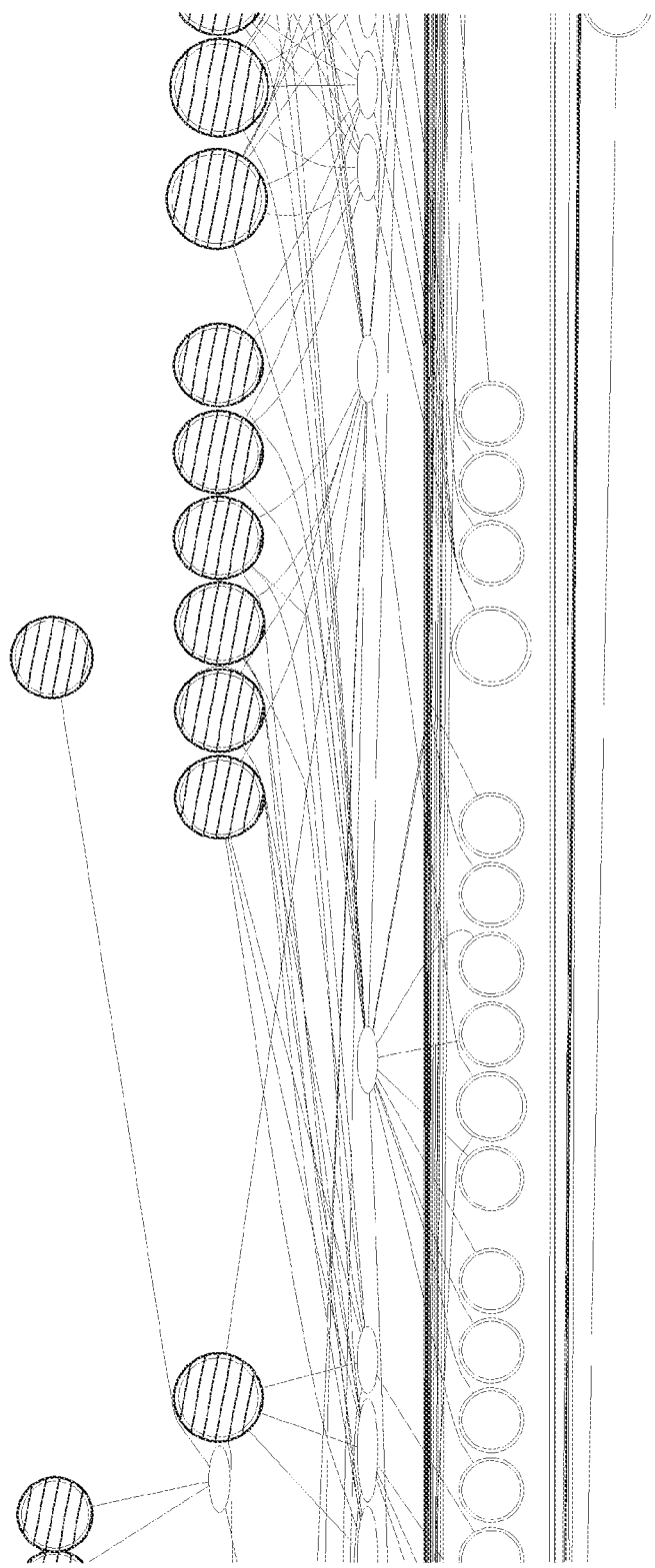
Figure 31L:
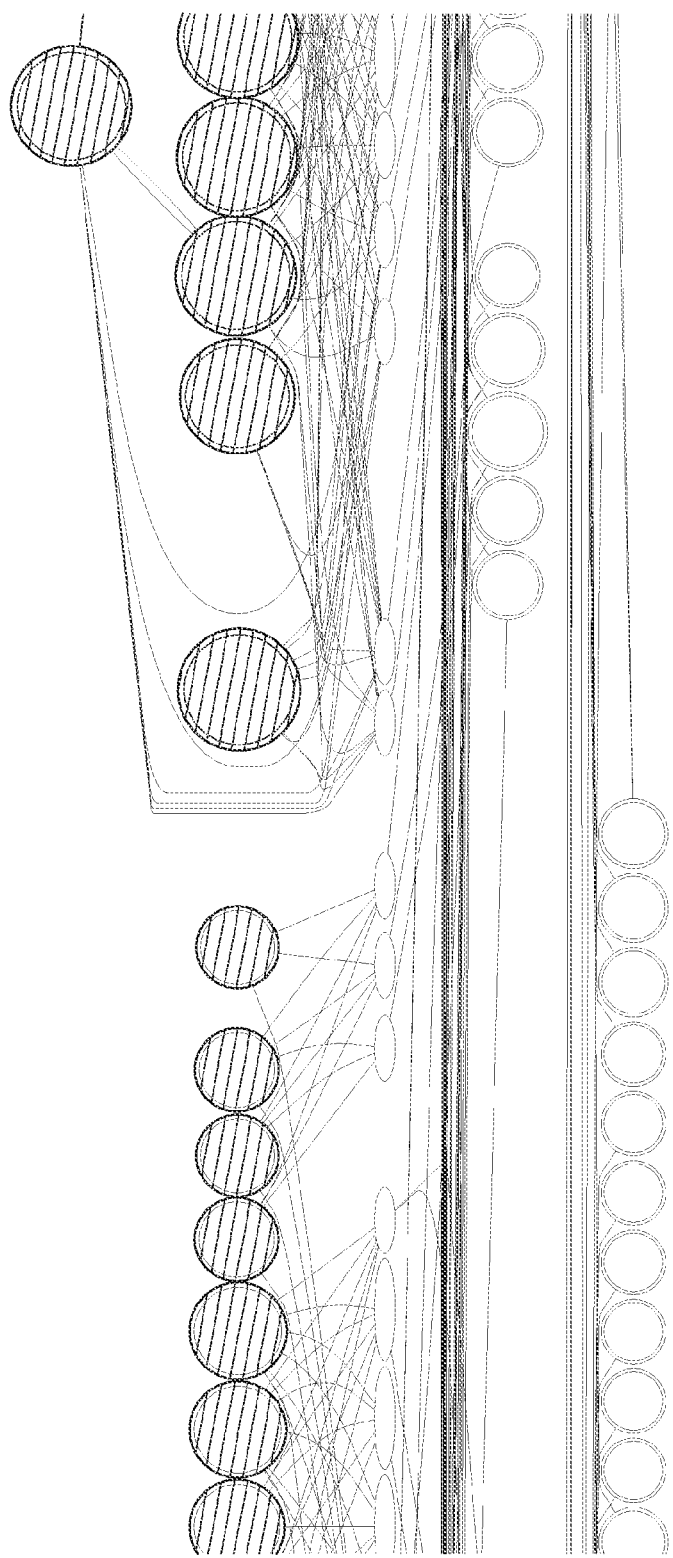
Figure 31M:
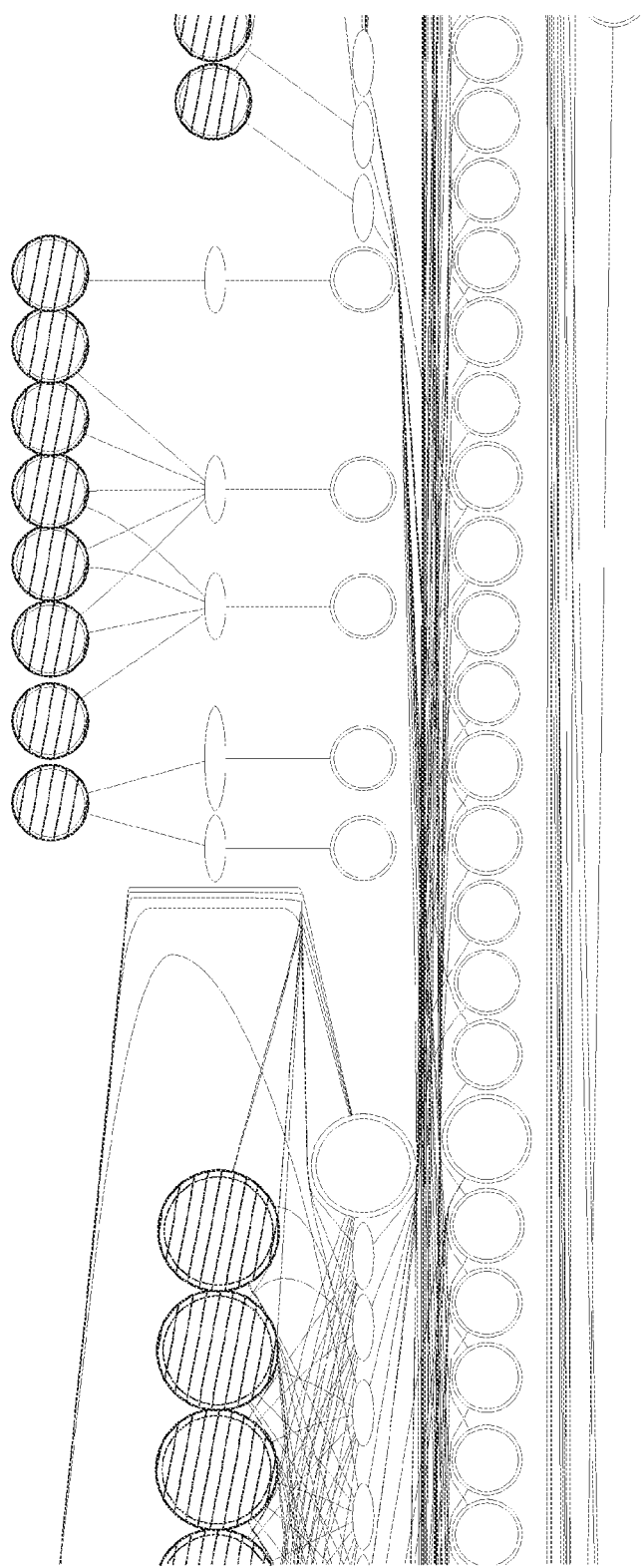
Figure 31N:
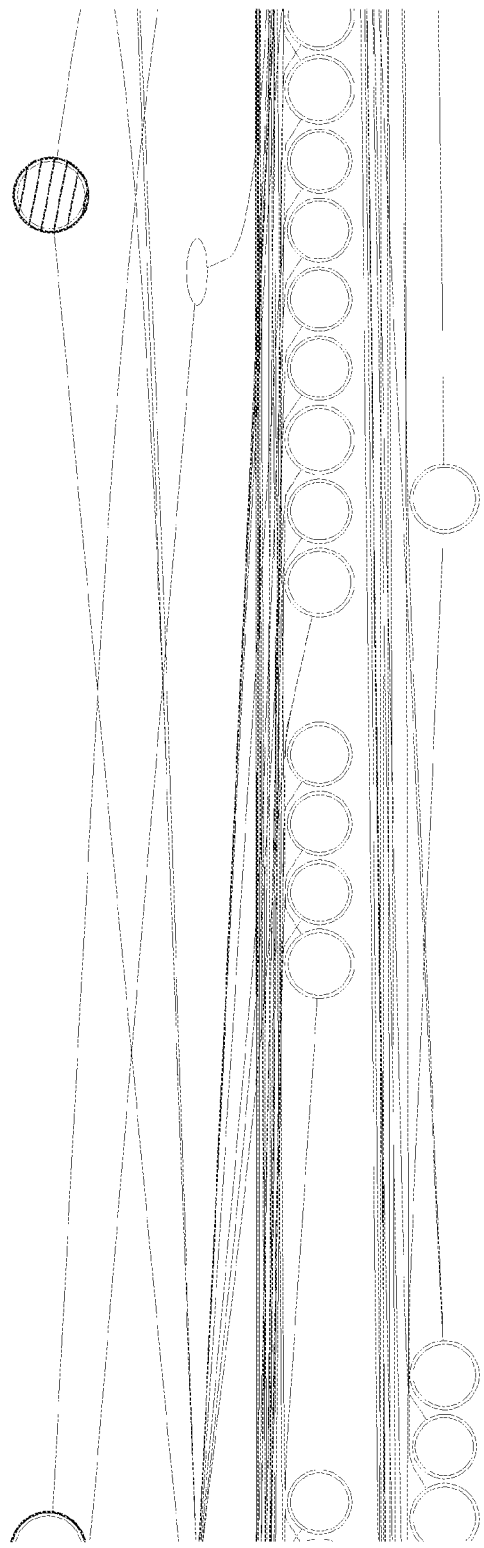
Figure 31O:
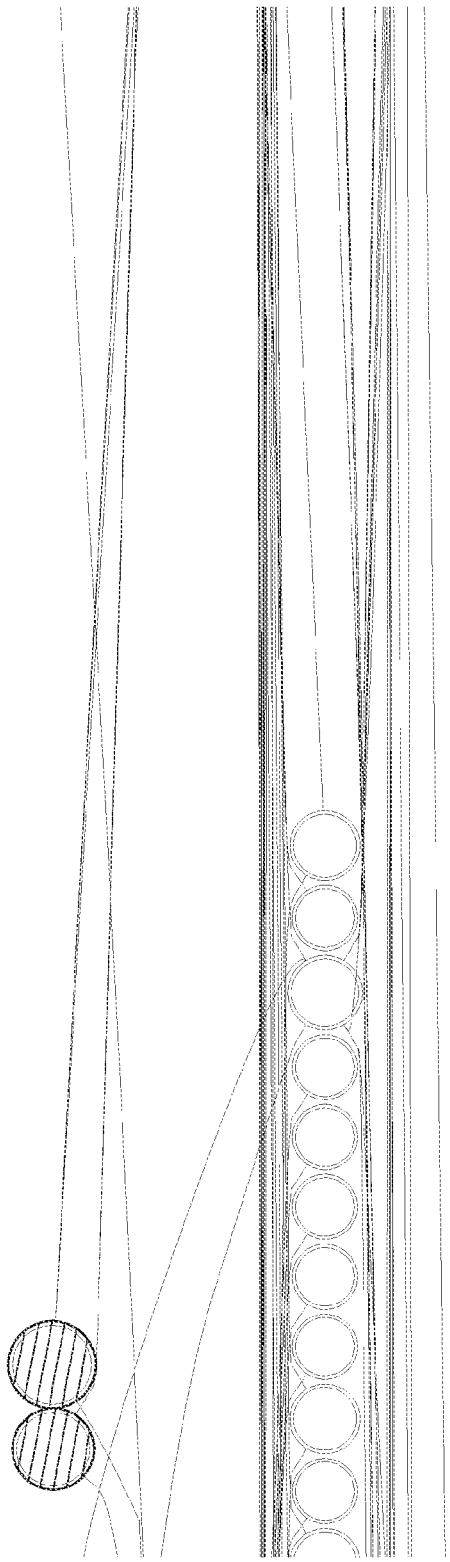
Figure 31P:
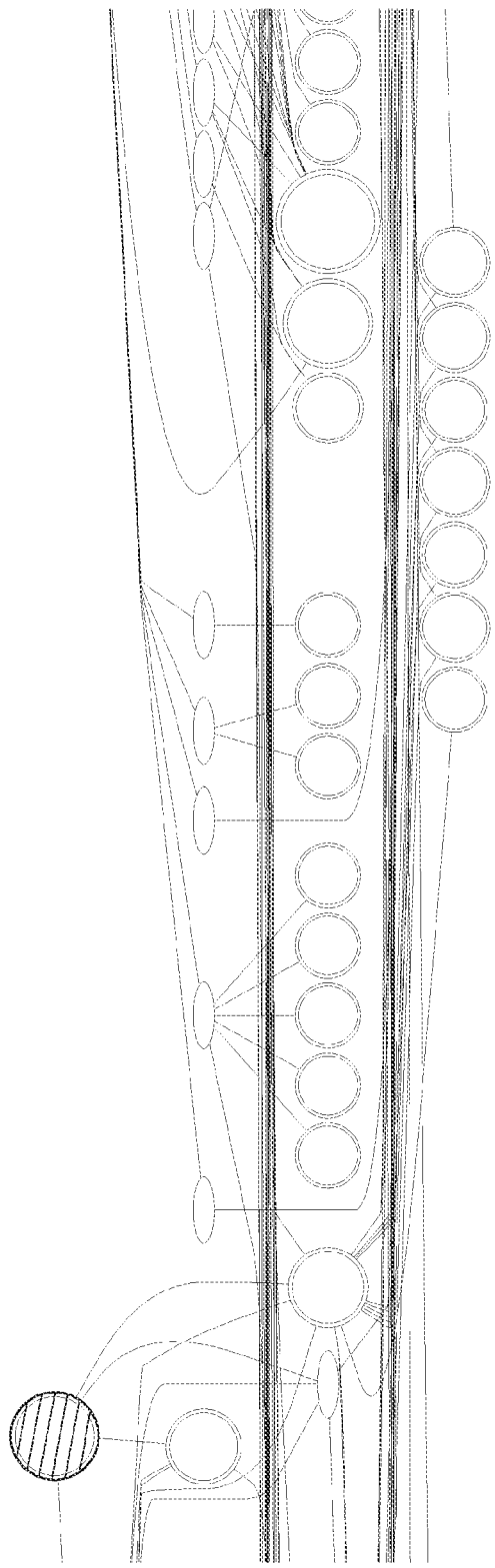
Figure 31Q:
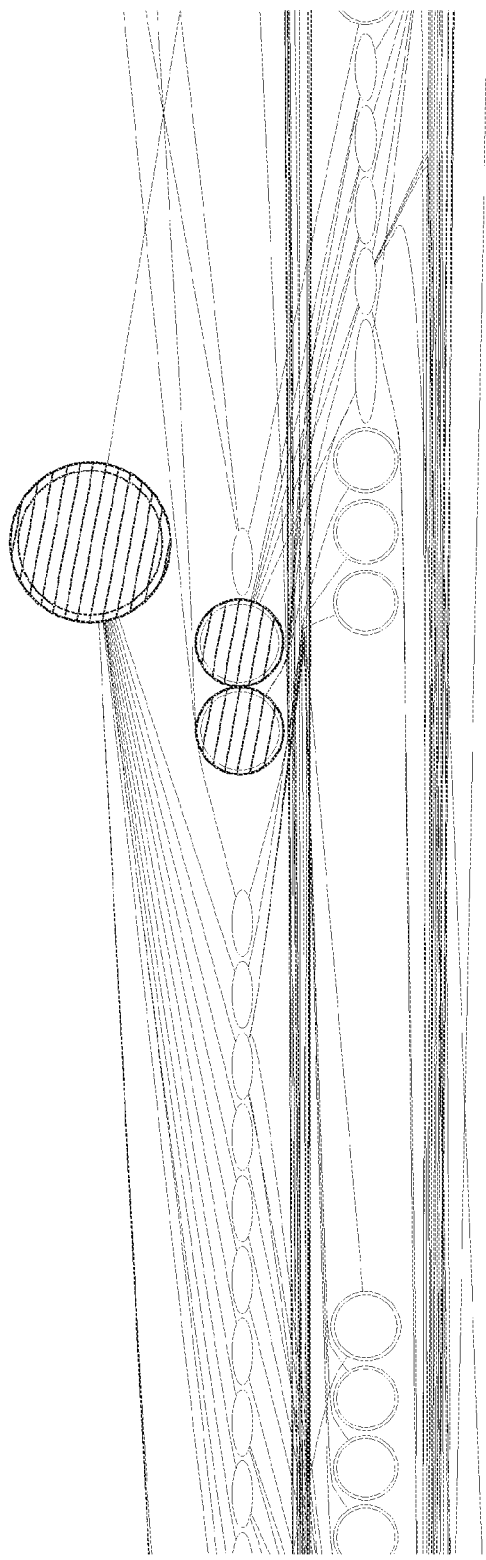
Figure 31T:
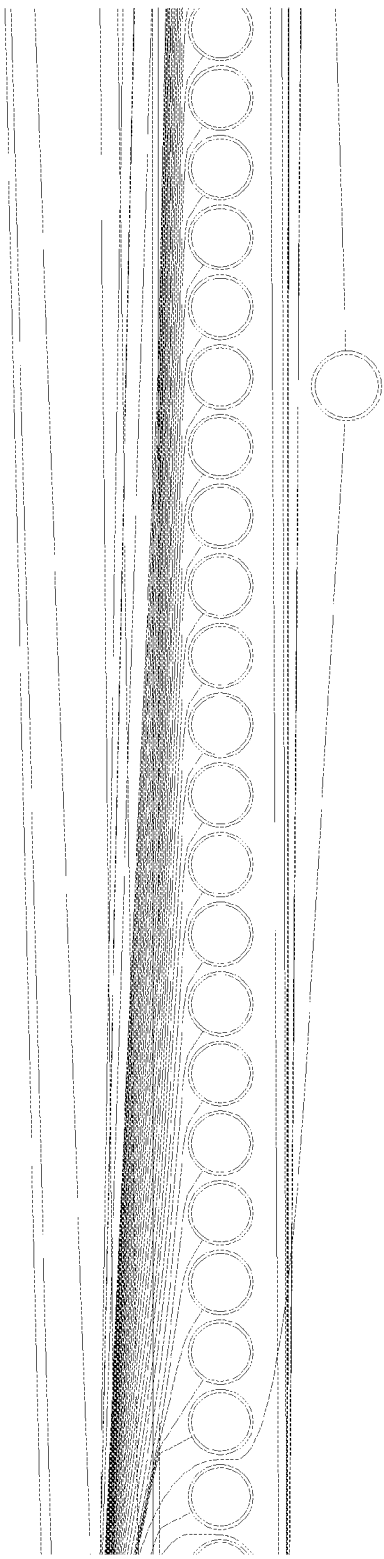
Figure 31U:
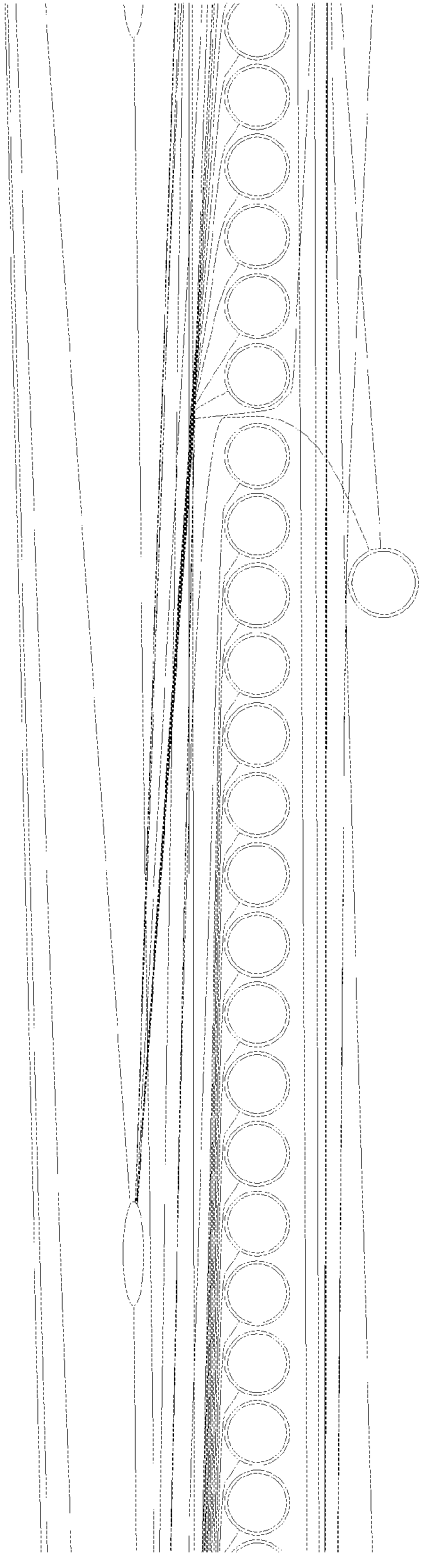
Figure 31V:
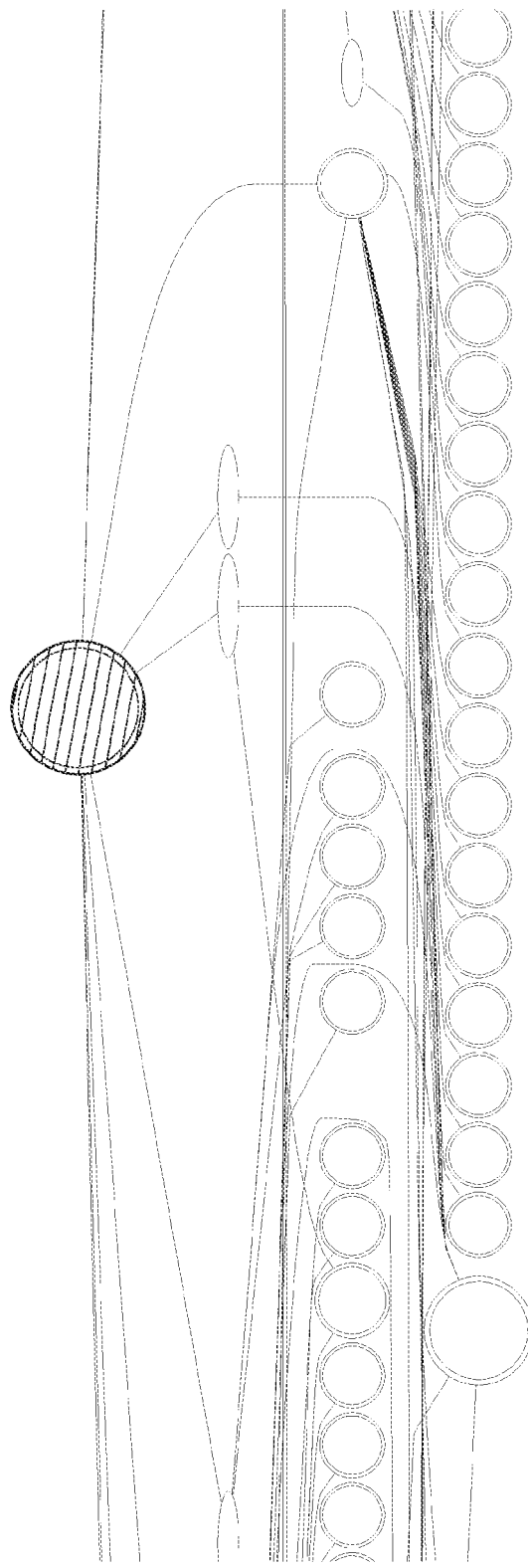
Figure 31W:
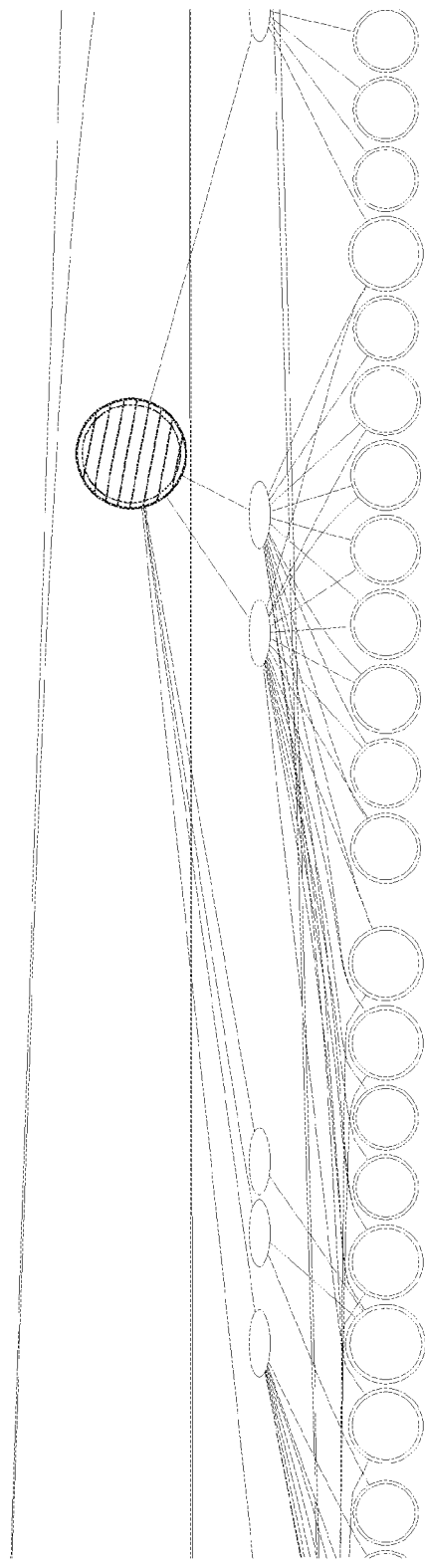
Figure 32:
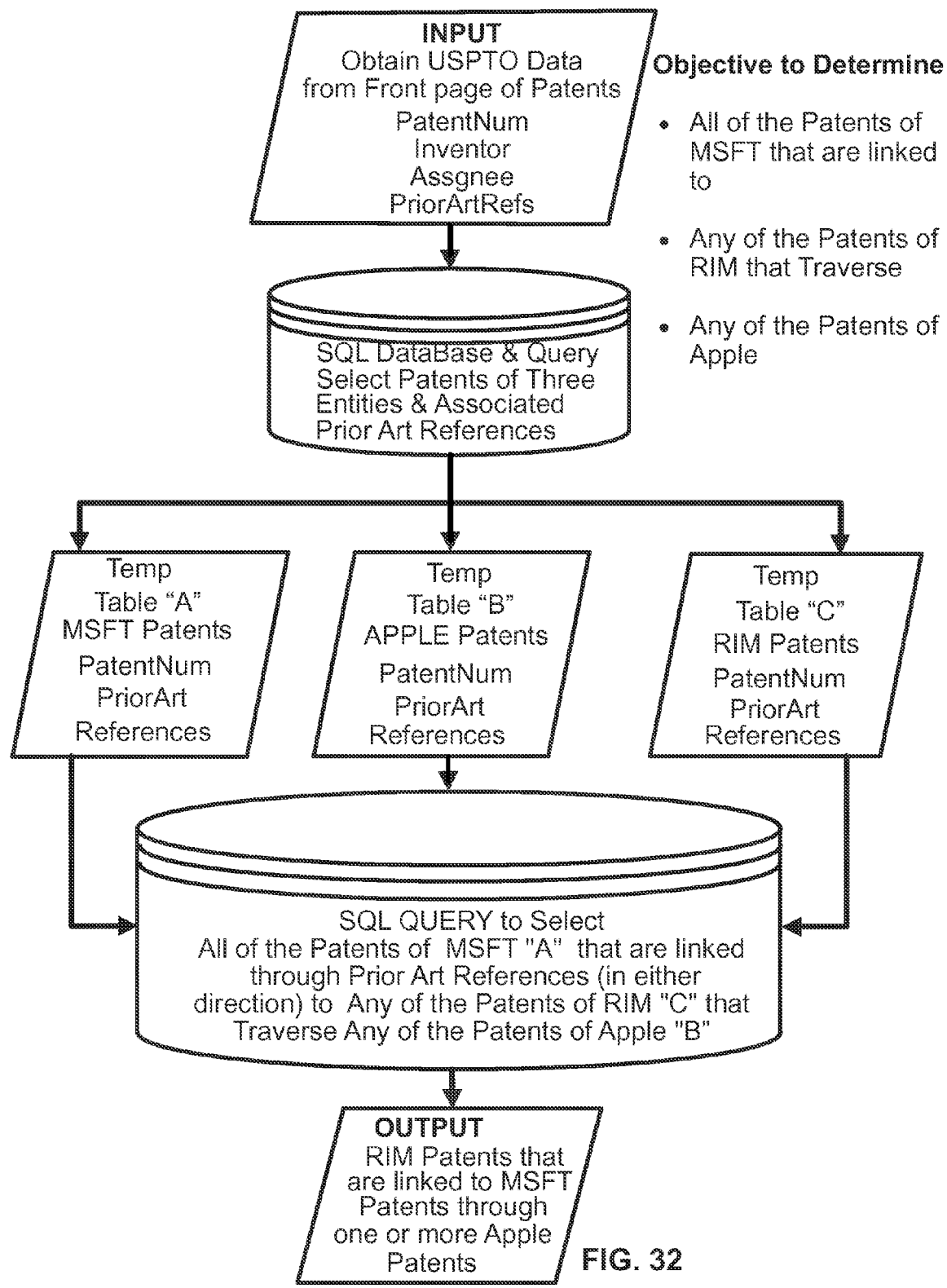
FIG. 32 is a flowchart presenting an overview of a preferred embodiment of the present invention.
Figure 33A:
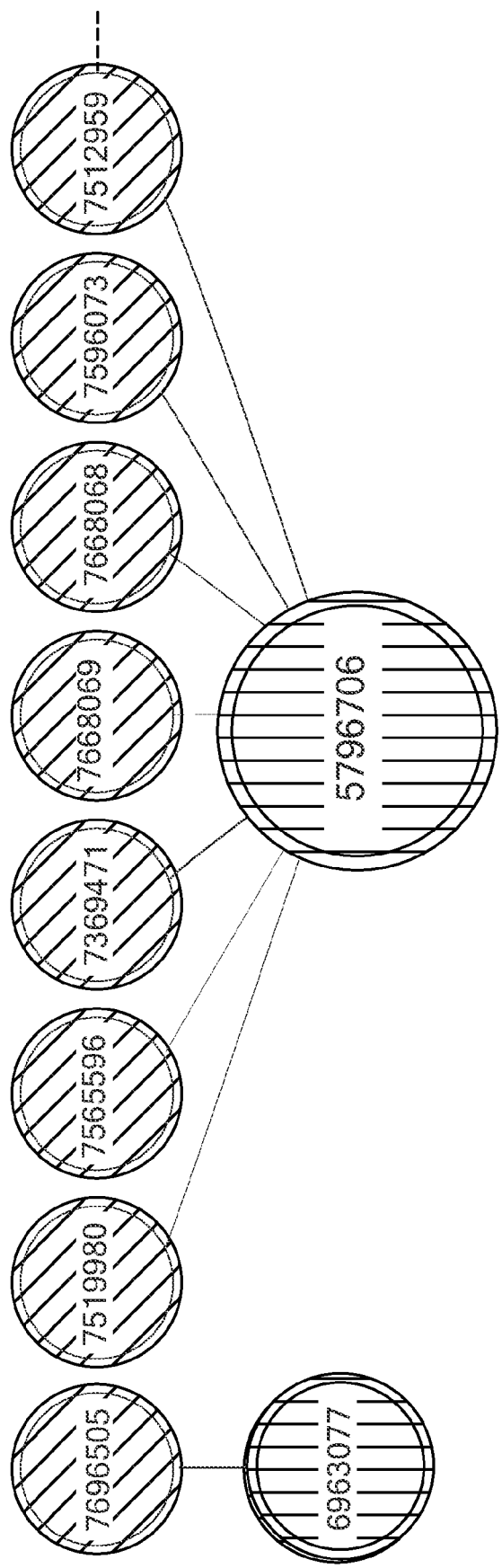
FIGS. 33A-33D show unique links between U.S. Pat. No. 5,796,706 and the selected patents of Searete LLC.
Figure 33B:
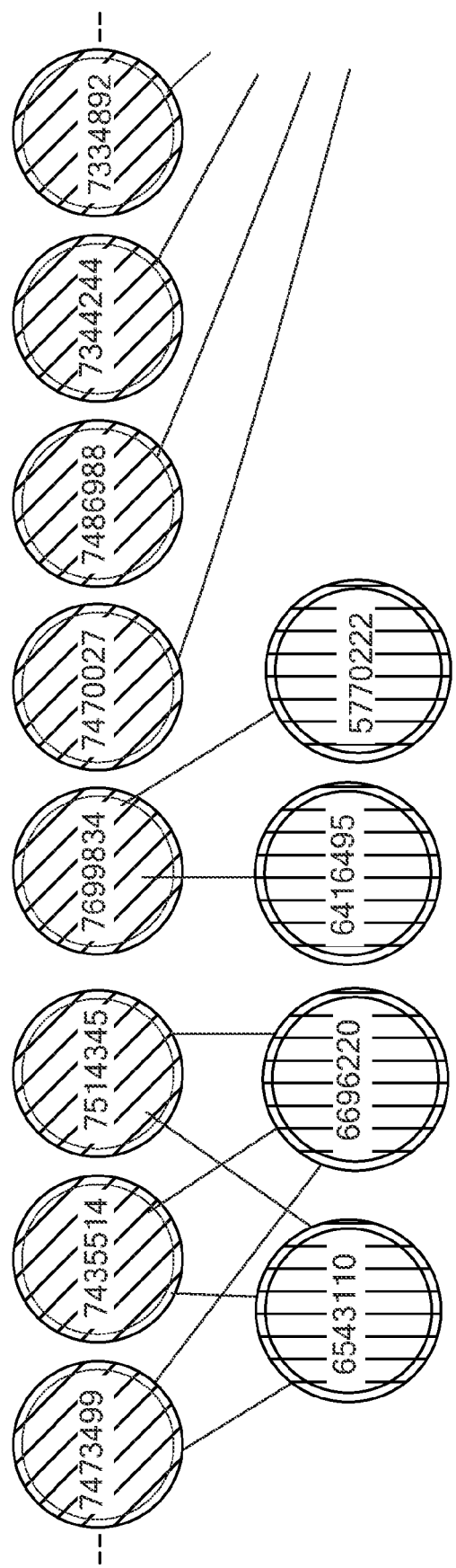
Figure 33C:
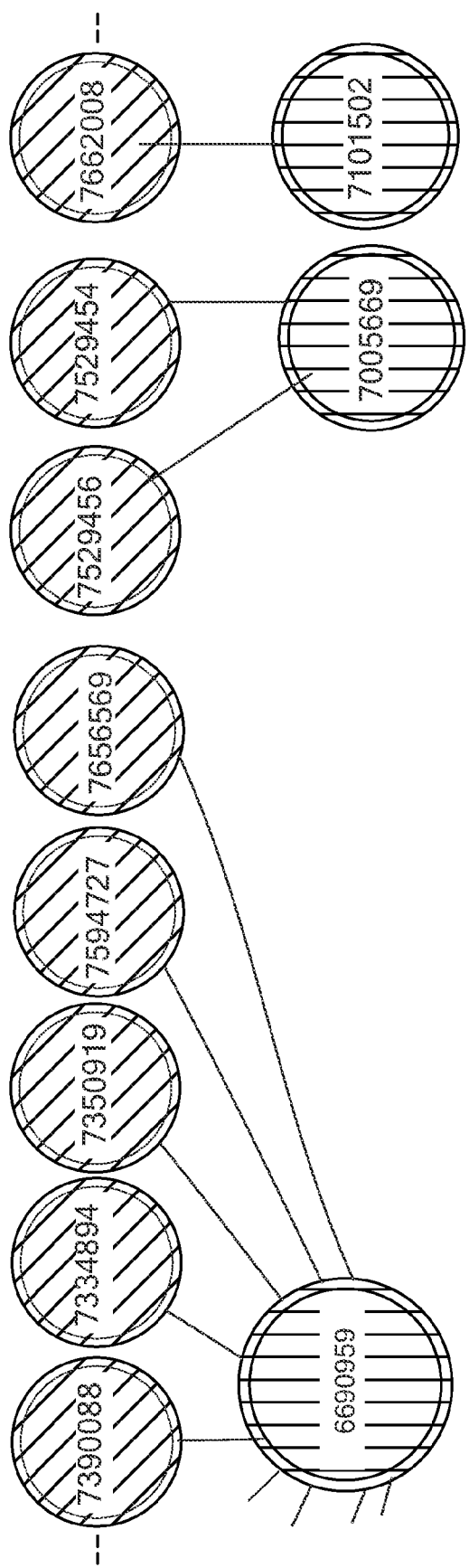
Figure 33D:
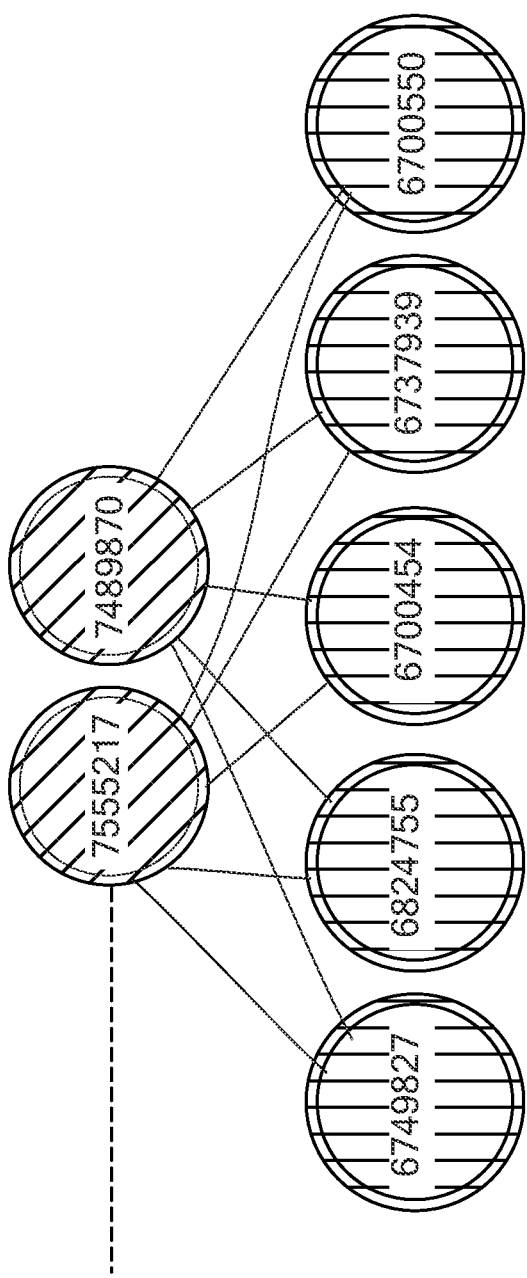

The analyst while reviewing these patents with RPX, notes and mentions to RPX that a non-client of RPX, Digimarc Corporation, the holder of hundreds of patents, is one of the companies listed as assignee of some of the sixty-one patents identified in the pre-screening stage. The analyst also recalls a recent, Jul. 7, 2009, news item about Digimarc that it was commencing an active process to license its approximately one thousand patents (see http://www.thedeal.com/corporatedealmaker/2009/07/digimarc_rides_patents_and_par.php. Thus, RPX commissions the analyst to examine the synergies or conflicts between the patent portfolios of Digimarc and RPX, using the methods of the present invention, by operating on three portfolios as follows:

Portfolio "A"—The RPX Patents under study
Portfolio "B"—The Patents assigned to Digimarc Corporation
Portfolio "C"—Identical to Portfolio "A",
at an UNDIRECTED distance of two degrees of separation from a patent in Portfolio "A", to a patent in Portfolio "B", and traverse the portfolios, with one or more patents in Portfolio "C", and obtain a list of intermediary patents assigned to one or more other entities. This exercise results in the discovery of 352 paths between the Portfolios "A" and "C" comprising a totality of 87 patents of which 64 are assigned to Digimarc as an intermediary. This is a surprisingly high number of patents, which results are also shown in FIG. 30. The analyst compiles the list of intermediaries, and visiting the USPTO website is able to obtain copies thereof for furnishing to the client, RPX.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A computerized method that uses a computer for retrieving interrelated patent documents from a database portfolio that comprises patent data corresponding to one or more patent documents that include patents and patent applications, said method comprising:
   a) constructing, as input to a computer, at least a first end point portfolio, a second end point portfolio, and a middle portfolio with all such portfolios associated with at least one patent document that provides patent data from each patent document with the number of such patent documents in each portfolio fixed prior to the entry of portfolios into the computer, each patent document in an end point portfolio providing end point data as part of its patent data and each patent document in the middle portfolio provides middle point data as part of its patent data, the patent documents of the end point portfolios are potential end point nodes located at the start and end of a potential end point chain consisting of links in a node and link arrangement having a node at each end of a link which is in common with an adjacent link with at least two links connecting a node in the first portfolio with a node in the second portfolio through a node in the middle portfolio;
   b) using the constructed end point portfolios and the middle portfolio as input to a computer;
   c) using the computer to process the input data to find any end point chains wherein a patent document in the first end point portfolio and a patent document in the second end point portfolio provide the nodes at the opposite ends of each end point chain with a patent document in the middle portfolio providing a node through which an end point chain must pass, and any intermediate patent document that provide additional nodes between the end points of an end point chain;
   d) retrieving output from the computer comprising a finding that no end point chains exist or output including at least one of: i) at least one intermediate patent document, ii) the links and nodes of the end point chains as described in step c), iii) the links connecting at least one first end point portfolio patent document with at least one second end point portfolio patent document and, iv) at least one middle portfolio patent document linking patent documents of the first end point portfolio with patent documents of the second end point portfolio; and,
   e) assembling from output retrieved under any of item ii) to iv) of step d a limited list of patent documents comprising less documents than the number of patent documents in the first end point portfolio, the second end point portfolio or the middle portfolio for review of the relevance of those documents with respect to the first end point portfolio, the second end point portfolio or the middle portfolio for identifying patent documents of interest to a user of the results of the method.

2. The method of claim 1 wherein the patent documents of at least one of the first end point portfolios, the second end point portfolio and the middle portfolio consist of a subset of all the patent documents in the database portfolio.

3. The method of claim 2 wherein the database portfolio comprises all of the patent documents of at least one of: all of the patents of at least one country, all of the patents of a company or corporation; and all of the patents in at least one of a patent office classification of patents.

4. The method of claim 3 wherein the patent database portfolio consists of all available patent documents from United States Patent and Trademark Office and the first end point portfolio comprises a first subset of the patent database portfolio and the second end point comprises a second subset of the patent database portfolio.

5. The method of claim 1 wherein the first end point portfolio is the same as the second end point portfolio.

6. The method of claim 1 wherein at least one of the first end point portfolio, the second end point portfolio and the middle portfolio consist of only one patent document and optionally one of the first end point portfolios, the second end point portfolio, and the middle portfolio consist of a patent thicket.

7. The method of claim 1 wherein the patent documents of the middle portfolio consists of one patent document and optionally at least one of the end point portfolios consists of a patent thicket.

8. The method of claim 1 wherein the degree of separation is undirected such that the linkages between patent documents are not time dependent and can travel backward and forward in time from node to node for one of: patent application filing date, patent issuance date, and patent application publication date; and, the number of documents in the first and second end point portfolios remain unchanged through all degrees of separation and regardless of the number of linkages that exist between patent documents in traveling either forward or backward in time.

9. The method of claim 8 wherein an input to the computer limits the allowable undirected degree of separation provided by the links between the first and the second end point portfolios wherein the degrees of separation equals at least the number of links.

10. The method of claim 1 wherein the links are directed such that the linkages between patent documents are time dependent and travel either backward or forward in time relative to at least one of the first and second end point portfolios for one or more generations according to one of: the patent application filing date, patent issuance date, and patent application publication date; and, the number of documents in the first and second end point portfolios remain the unchanged through all degrees of separation and regardless of the number of linkages that exist between patent documents in traveling either forward or backward in time.

11. The method of claim 10 wherein an input to the computer limits the directed degree of separation from any patent document in the middle portfolio to any patent document in either of the first and second end point portfolios.

12. The method of claim 1 wherein at least one of the first portfolio, second portfolio and the middle portfolio comprise a patent thicket.

13. The method of claim 1 wherein the patent classification system of the United States Patent Office is used at least in part to assemble at least one of the end point portfolios and the middle portfolio such that at least one of said portfolios contains: i) patent document classmates classified in a patent classification corresponding to a primary classification of at least one patent document, or ii) patent document schoolmates classified in a patent classification corresponding to any patent classification assigned to at least one patent document.

14. The method of claim 1 wherein: i) the first and second portfolios are analyzed to find intermediate patent document relationships at one degree of separation; and ii) the intermediate patent documents found in the previous step i) are used as a middle portfolio with the first and second end point portfolios within the method of claim 1 at an least two undirected degree of separation of at least two.

15. The method of claim 1 wherein it is applied to at least one of: patent monetization; social network formation; mergers and acquisitions; patent portfolio maintenance fee reviews; law firm conflicts; personnel recruitment; USPTO and Peer-To-Patent Patent Prosecution; anti-trust investigations; patent auctions; patent litigation assistance at trial and discovery; commencing, defending, or avoiding a patent dispute by facilitating entry into of patent license that resolves the dispute; and, at least one of the middle and end point portfolios comprises data from patent documents of at least one of: patent document assignees; parties representing the owner of a patent document; at least one patent document that is the subject of at least one of patent litigation, patent reexamination, and patent reissue; at least one database of specific patent documents; patent documents by selected inventors or key words; patent documents contained in at least one of a United States Patent Office Inventor Disclosure, a search report, combinations thereof, portions thereof; and combinations of at least a portion thereof.

16. The method of claim 1 wherein in step c) the computer processing finds at least one patent document in each of the end point portfolios that does not serve as a node in an end of an end point chain.

17. The method of claim 1 wherein the patent documents of at least one of the first endpoint portfolio, the second end point portfolio, and the middle portfolio contains at least one patent document comprising a pseudo patent consisting essentially of a patent application transformed into a patent by the addition of a synthesized list of references having all of the patents in the approximated citation list as its cited prior art.

18. A computerized method for retrieving interrelated patent documents from a database portfolio that comprises patent data for multiple patent documents and each patent document comprises at least one of patents and patent applications related documents, wherein the method comprises:

a) constructing, as input to a computer, a first end point portfolio and a second end point portfolio, wherein each end point portfolio is fixed at the input stage and through all computer processing steps as to patent documents contained therein and defines at least one patent document that contains end point data as part of its patent data;

b) constructing, as input to a computer, a middle portfolio fixed at the input stage and through all computer processing as to the patent documents contained therein and having at least one patent document that contains middle point data as part of the patent data and that differs from the patent documents of the end point portfolios and having a potential relationship to one or more patent documents in the first and the second end point portfolios;

c) inputting the end point portfolios and the middle portfolio into a computer and formulating a query for a computer to find intermediate patent documents that can connect at least one continuous path through at least one end point chain that comprises a series of links, each link having a node representing a patent document at each of its ends with each link connected to another link by a common node and each end point chain starting from a patent document in the first end point portfolio, ending with to a patent document in the second end point portfolio and passing through a series of unique links that are connected through a patent document in the middle portfolio by data from the patent documents to create an end point chain containing at least one intermediate patent document found by the computer from the database portfolio;

d) executing the query on the computer to find any patent documents linked by an end point chain as described in step c); and, e) retrieving output from the computer comprising a finding that no first end point patent document is linked to second end point document or at least one of: i) one or more intermediate patent documents, ii) finding patent documents of the first end point portfolio that are linked to a patent documents of the second end point portfolio via a continuous path as described in step c), iii) the links connecting at least one patent document of the first end point portfolio with at least one patent document of the second end point portfolio, iv) middle portfolio documents that serve as links in end point chains that link the first end point portfolio with second end point portfolio and each end point chain having nodes represented by patent documents at each end of the links with the links serving to link patent document in the first and second end point portfolios files; and f) assembling from output retrieved under any of item ii) to iv) of step d a limited list of patent documents comprising less documents than the number of patent documents in the first end point portfolio, the second end point portfolio or the middle portfolio for review of the relevance of those documents with respect to the first end point portfolio, the second end point portfolio or the middle portfolio for identifying patent documents of interest to a user of the results of the method.

19. The method of claim 18 wherein it is applied to at least one of: patent monetization; social network formation; mergers and acquisitions; patent portfolio maintenance fee reviews; law firm conflicts; personnel recruitment; USPTO and Peer-To-Patent Patent Prosecution; anti-trust investigations; patent auctions; patent litigation assistance at trial and discovery; commencing, defending, or avoiding a patent dispute by facilitating entry into of patent license that resolves the dispute.

20. The method of claim 18 wherein in step c) the computer processing finds at least one patent document in each of the end point portfolios that does not serve as a node in an end of an end point chain.

21. A computerized method for retrieving interrelated patent documents comprising patents and patent documents applications, wherein the method comprises:

a) constructing as input to a computer, a first end point portfolio and a second end point portfolio, wherein each end point portfolio contains end point data that is fixed with respect to the patent documents it contains at the computer input stage and through all computer processing;

b) constructing, as input to a computer, a middle portfolio that is fixed at the input stage and through all computer processing as to the patent documents contained therein and having at least one patent document that contains middle data as part of the patent data and that differs from the patent documents of the end point portfolios;

c) inputting the end point portfolios and the middle portfolio into a computer and formulating a query for a computer to find from the United States Patent Office portfolio any intermediate patent documents that can connect at least one continuous path through an end point chain that comprises a series of unique links each link having a node representing a patent document at each of its ends with each adjacent link connected by a common node and each chain starting with a patent document in the first portfolio, ending with a patent document in the second portfolio through a series of unique links that are connected passing through a patent document of the middle portfolio and having at least one intermediate patent document at a specified undirected degree of separation to create the end point chain wherein the intermediate patent documents consists of patent documents within the database portfolio and do not include any patent document in the end point portfolios or the middle portfolio;

d) executing the query on the computer to find any patent documents from the first end point portfolio that are linked by an end point chain to a patent document in the second end point portfolio in the manner described in step c), and to find at least one patent document in each of the end point portfolios that does not serve as a node in an end point chain;

e) retrieving output from the computer including at least one group of patent documents containing multiple unique end point chains of links that connect to intermediate patent documents and that collectively comprise a patent thicket; and, f) presenting the first and second end point portfolios, the middle portfolio, and the intermediate patent documents in a visual form that displays the links between all of the patent documents and the patents in each portfolio member in a unique format with respect to the members of other portfolios and the intermediate patents; and, g) assembling from output retrieved under any of item ii) to iv) of step d a limited list of patent documents comprising less documents than the number of patent documents in the first end point portfolio, the second end point portfolio or the middle portfolio for review of the relevance of those documents with respect to the first end point portfolio, the second end point portfolio or the middle portfolio for identifying patent documents of interest to a user of the results of the method.

* * * * *